United States Patent [19]

Ueda et al.

[11] Patent Number: 5,068,082
[45] Date of Patent: Nov. 26, 1991

[54] FUEL ASSEMBLY FOR NUCLEAR REACTOR

[75] Inventors: Makoto Ueda, Yokohama; Koichi Sakurada, Narashino; Shungo Sakurai, Yokohama; Ritsuo Yoshioka, Yokohama; Shunsuke Ogiya, Yokohama; Mamoru Nagano, Yokohama, all of Japan

[73] Assignee: Kabushiki Kaisha Toshiba, Kawasaki, Japan

[21] Appl. No.: 219,346

[22] Filed: Jul. 15, 1988

[30] Foreign Application Priority Data

| Jul. 18, 1987 | [JP] | Japan | 62-178190 |
| Jul. 20, 1987 | [JP] | Japan | 62-179213 |
| Sep. 30, 1987 | [JP] | Japan | 62-244082 |
| Oct. 12, 1987 | [JP] | Japan | 62-254593 |
| Nov. 7, 1987 | [JP] | Japan | 62-280312 |
| Nov. 26, 1987 | [JP] | Japan | 62-296058 |

[51] Int. Cl.$^5$ .................................................. G21C 3/30
[52] U.S. Cl. ........................... 376/428; 376/172; 376/173; 376/417; 376/435; 376/443
[58] Field of Search ................ 376/172, 173, 435, 417, 376/428, 443

[56] References Cited

U.S. PATENT DOCUMENTS

| 4,096,033 | 6/1978 | Barry | 176/78 |
| 4,231,976 | 11/1980 | Bischoff et al. | 264/0.5 |
| 4,362,691 | 12/1982 | Lang et al. | 376/267 |
| 4,765,943 | 9/1988 | DeLorenzo et al. | 376/154 |
| 4,783,311 | 11/1988 | Ferrari | 376/417 |
| 4,968,479 | 11/1990 | Ogiya et al. | 376/428 |
| 4,968,479 | 11/1990 | Ogiya et al. | 376/428 |
| 4,970,047 | 11/1990 | Ueda et al. | 376/443 |

FOREIGN PATENT DOCUMENTS 61-165681 7/1986 Japan .

Primary Examiner—Robert L. Stoll
Assistant Examiner—N. Bhat
Attorney, Agent, or Firm—Foley & Lardner

[57] ABSTRACT

A fuel assembly for a nuclear reactor includes a number of fuel rods filled with a fuel material. A plurality of fuel rods have a partial effective fuel area filled with a fuel material and has a portion in which enrichment of a fissile nuclide is significantly reduced or the fissile nuclide does not exist at all on an axial level including a reactor shut-down zone at which subcriticality becomes small during a reactor operation period. The other fuel rods are filled with the fuel material throughout the entire axial length thereof. The first mentioned fuel rod may be provided with a partially interposed zone or may be constructed by a fuel rod having a length shorter than that of the other fuel rod. The tube means may be arranged in the fuel assembly so as to pass the moderator therethrough.

59 Claims, 53 Drawing Sheets

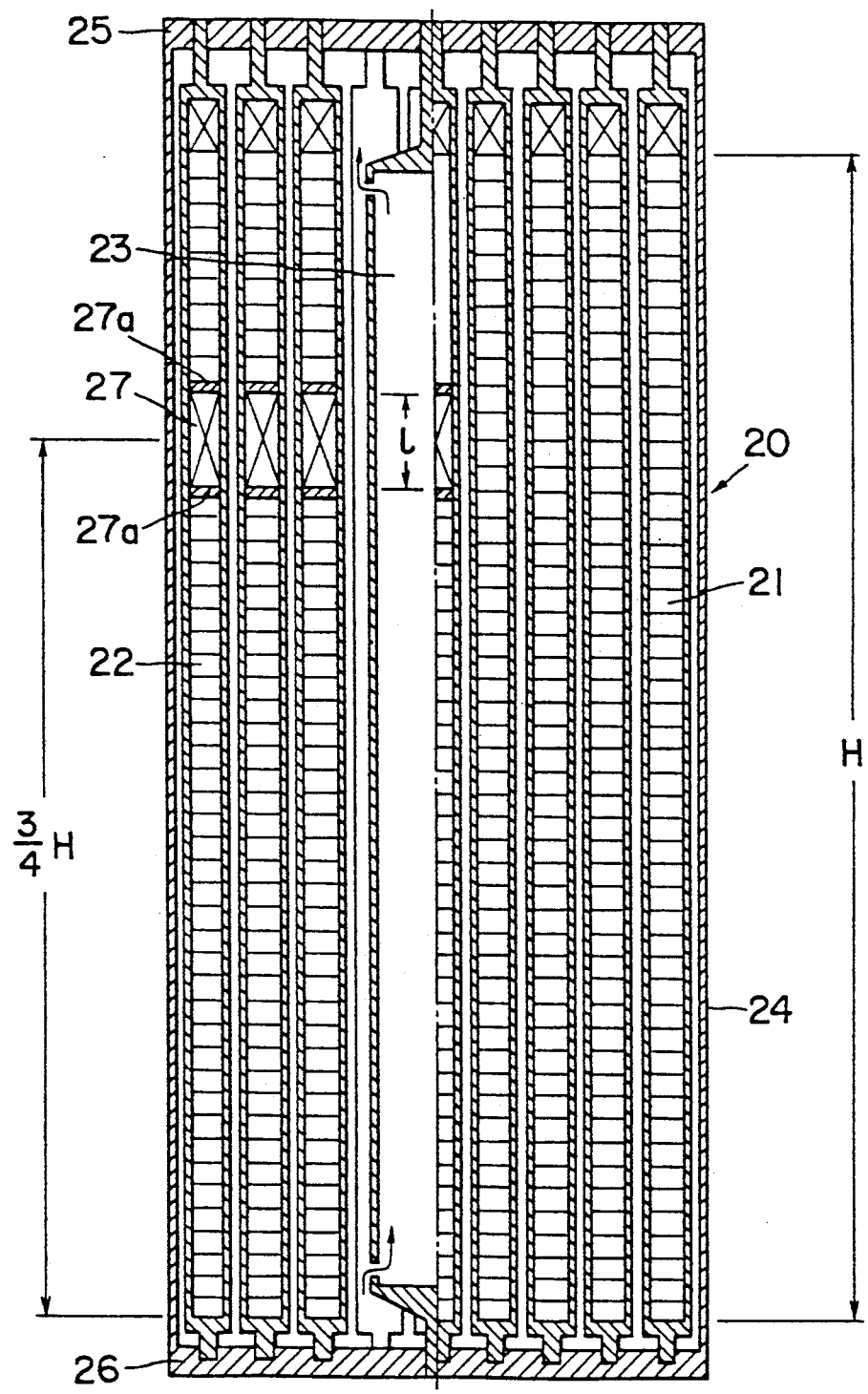
F I G. 2A

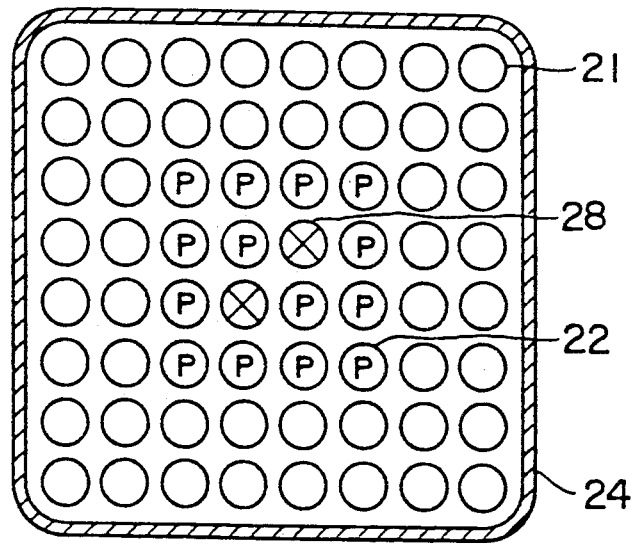
F I G. 8
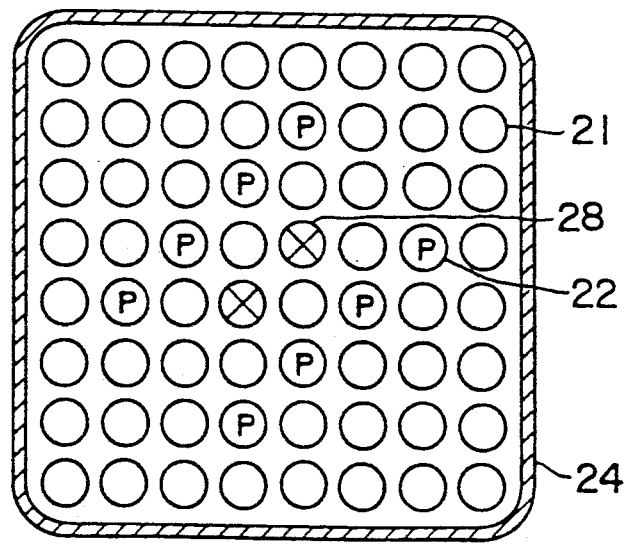
F I G. 9

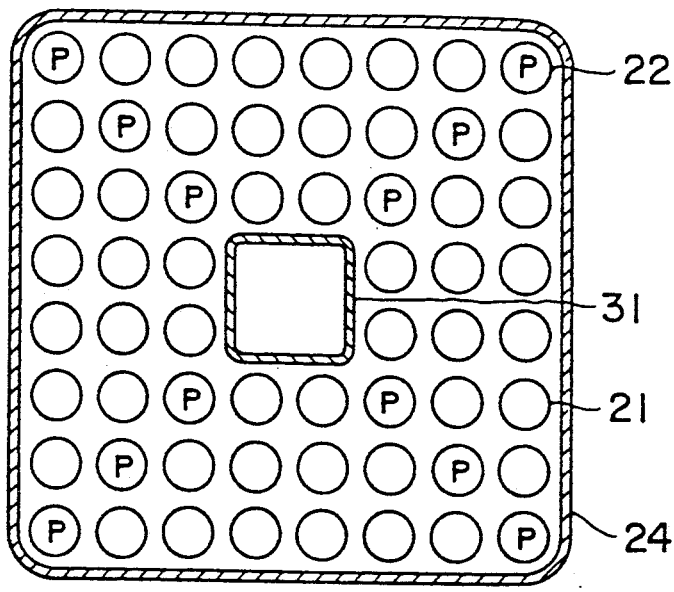
F I G. 12
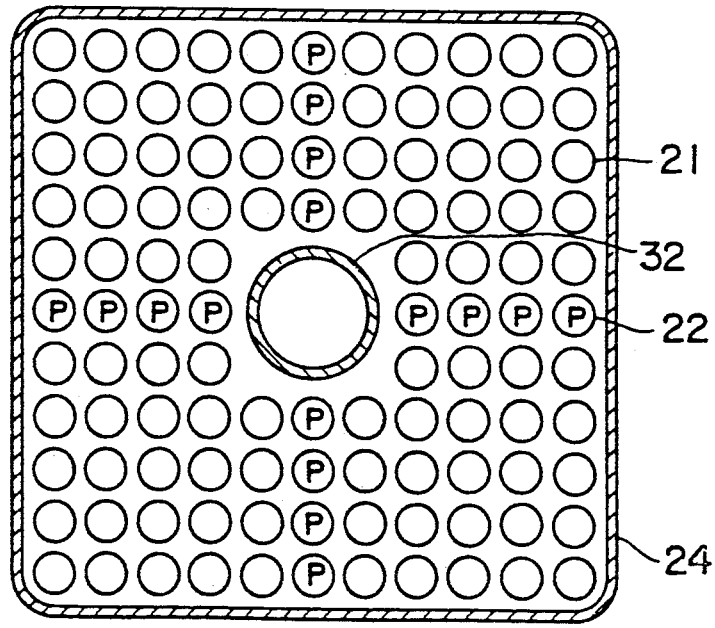
F I G. 13

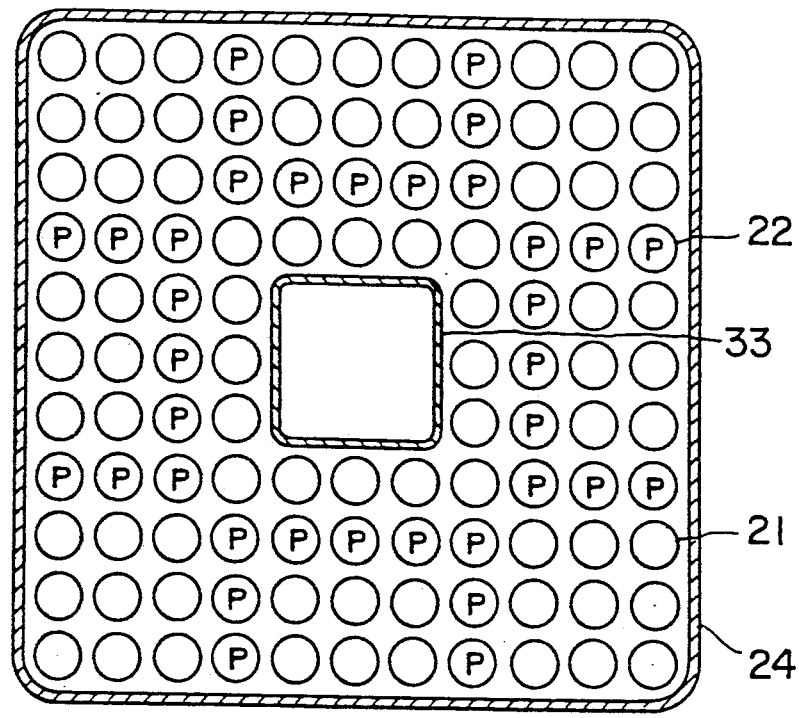
F I G. 14
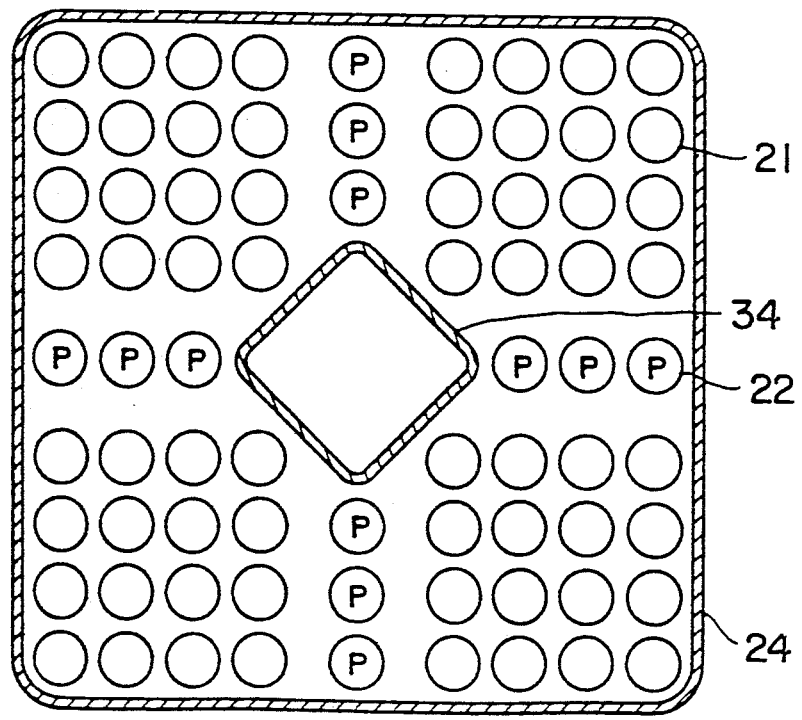
F I G. 15

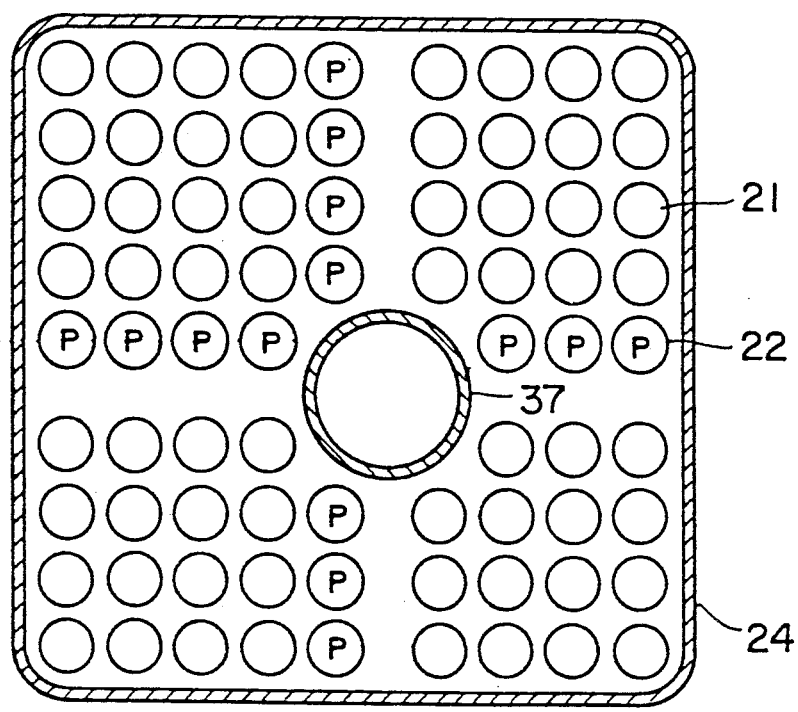
F I G. 18

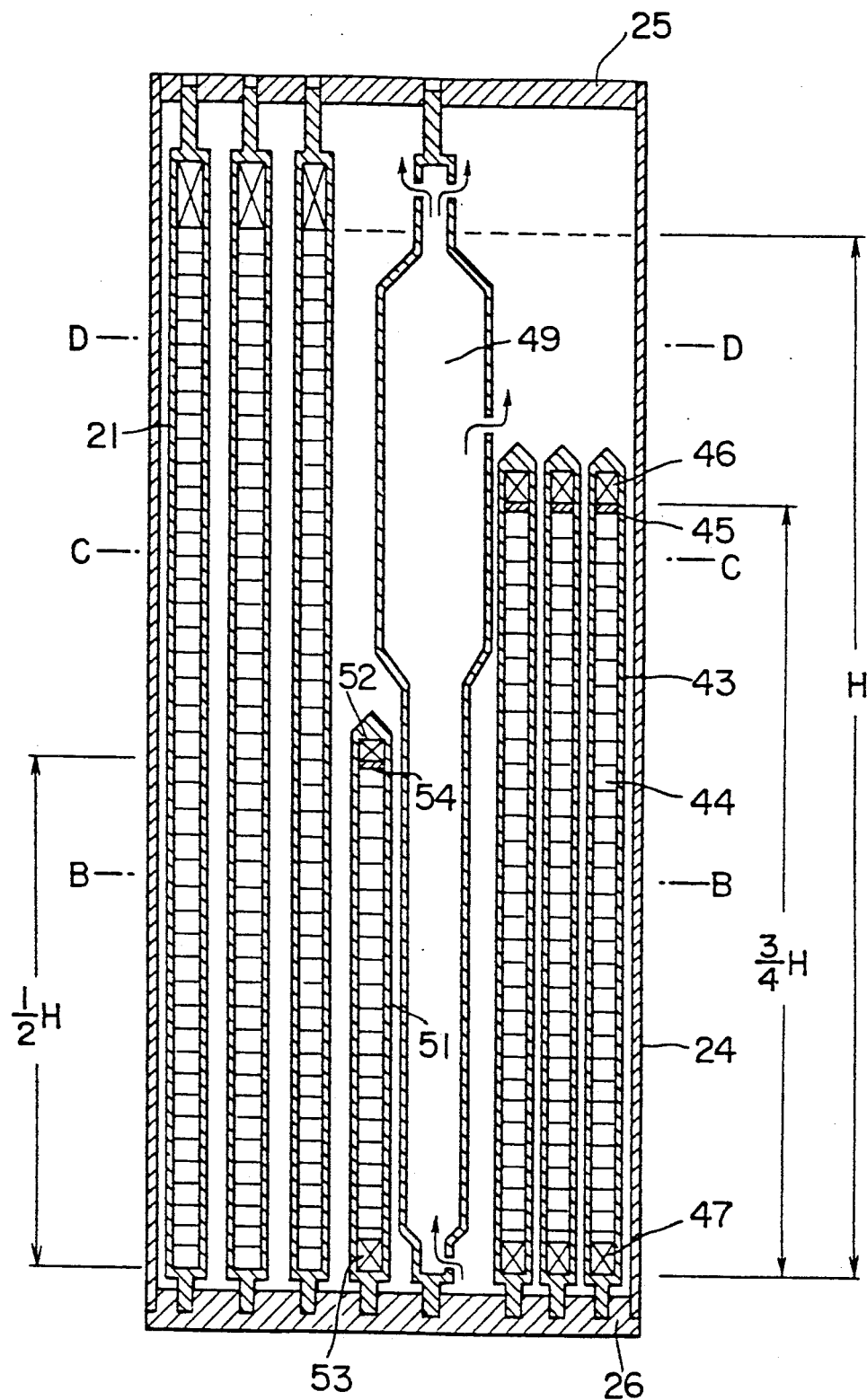
F I G. 25A

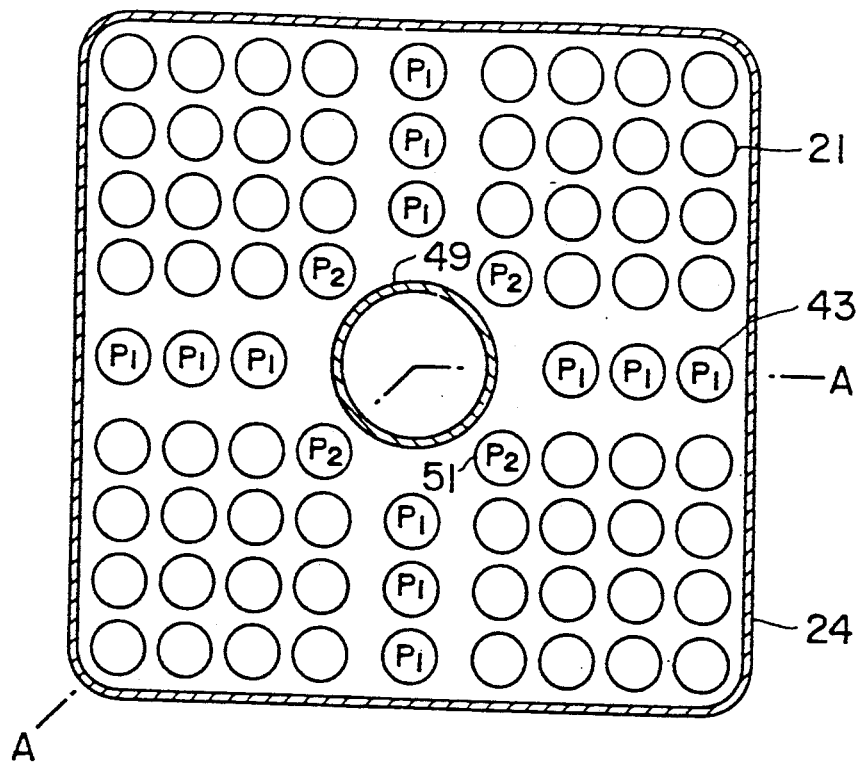
F I G. 25 B
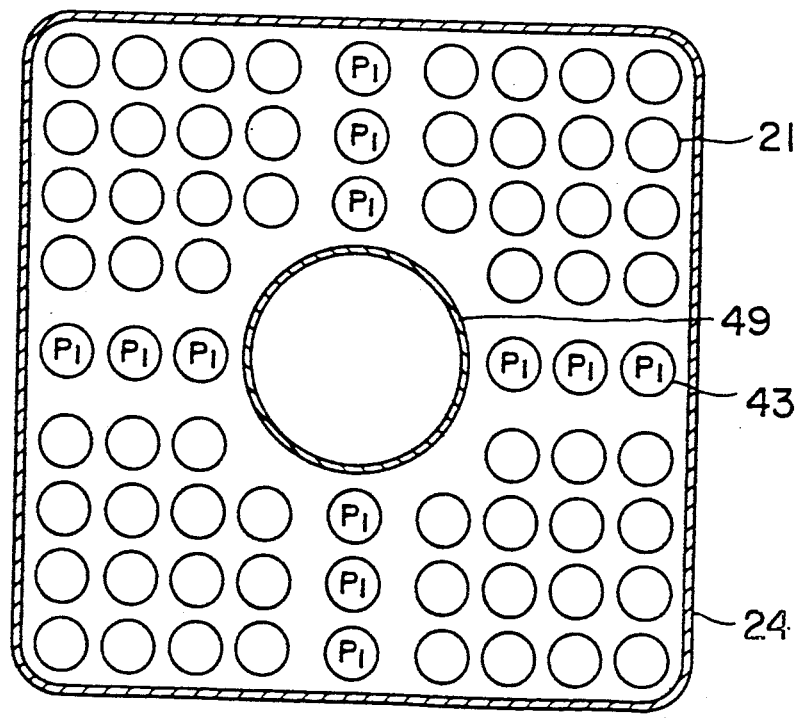
F I G. 25 C

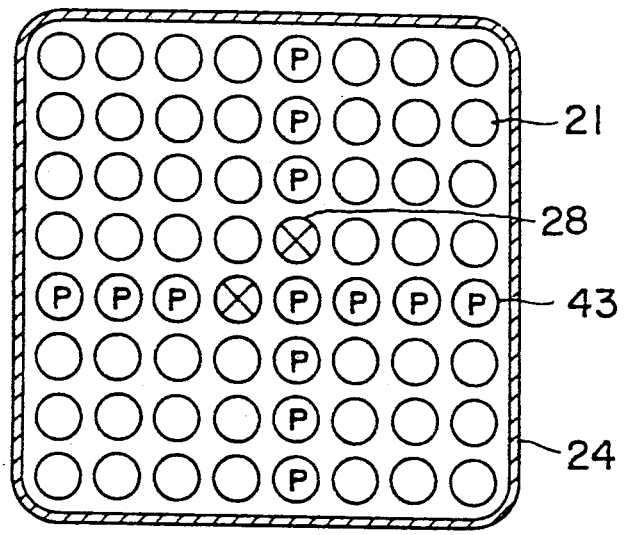
F I G. 29
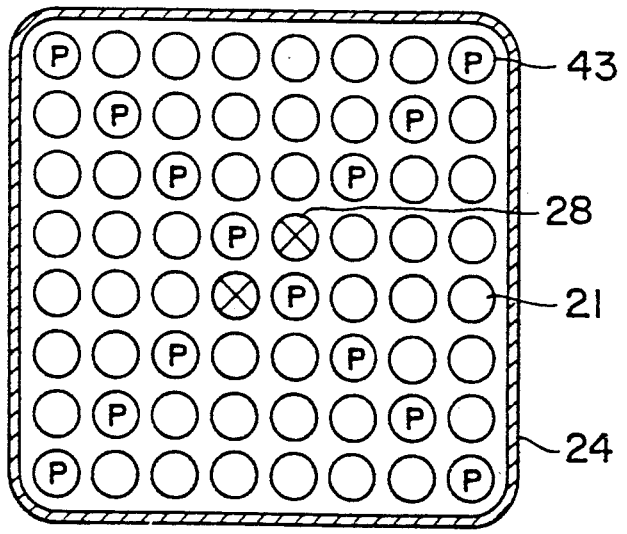
F I G. 30

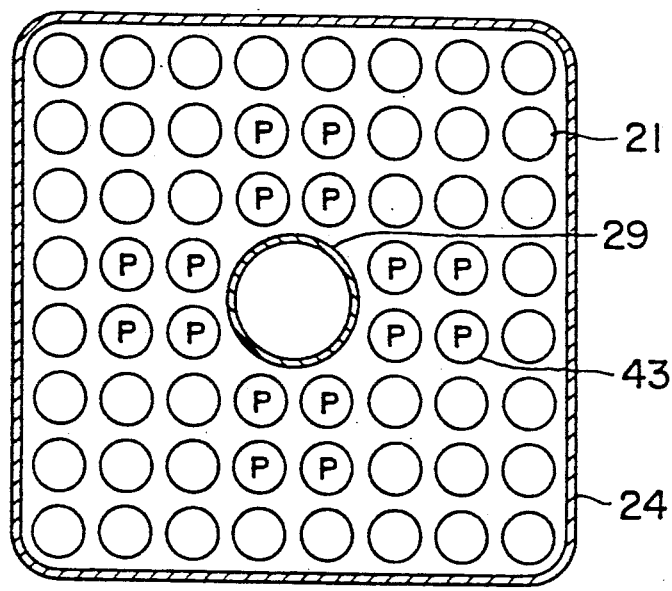
F I G. 33
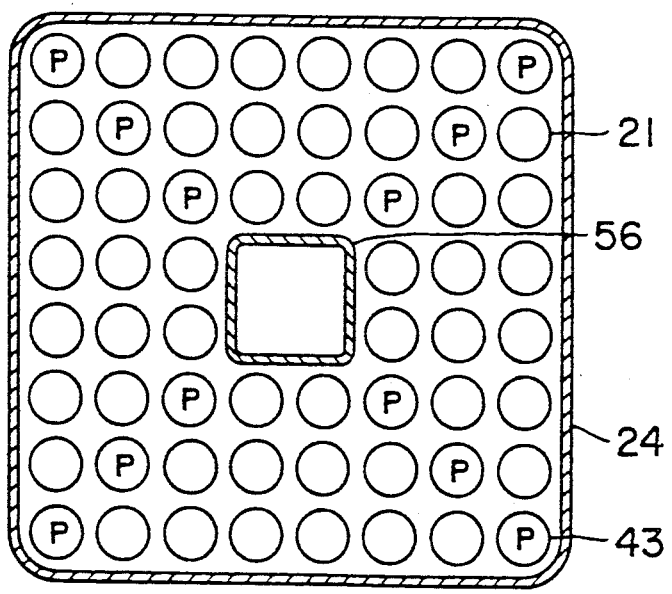
F I G. 34

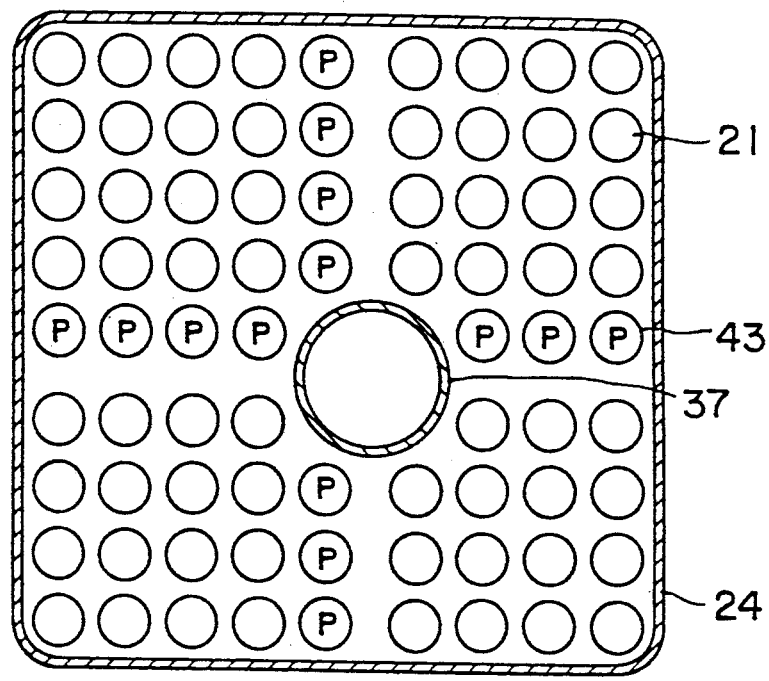
F I G. 39
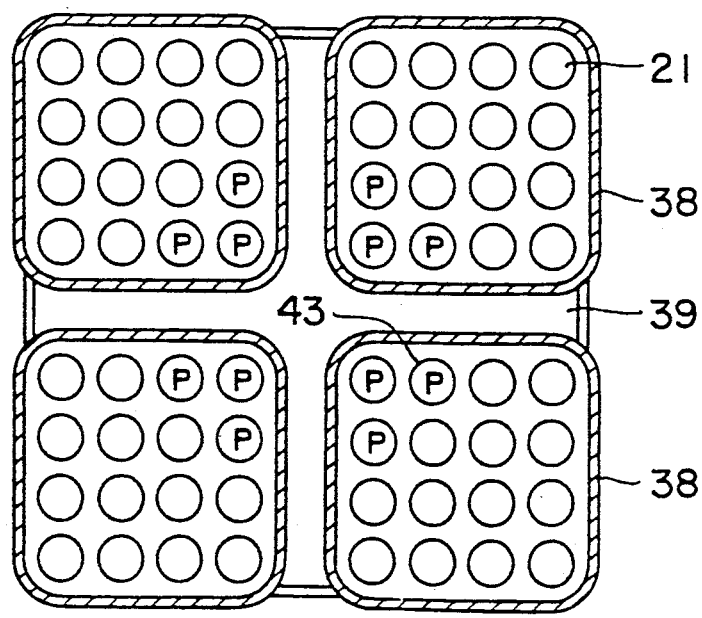
F I G. 40

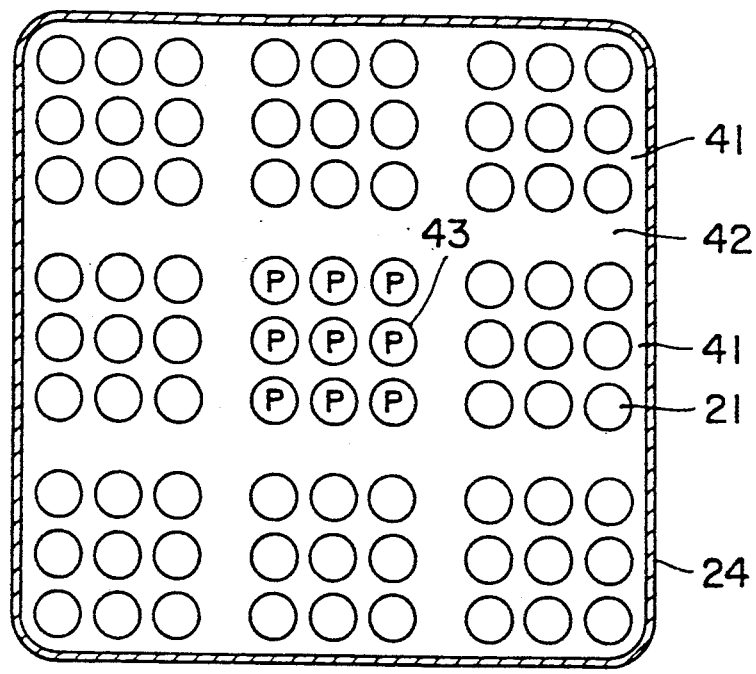
F I G. 41
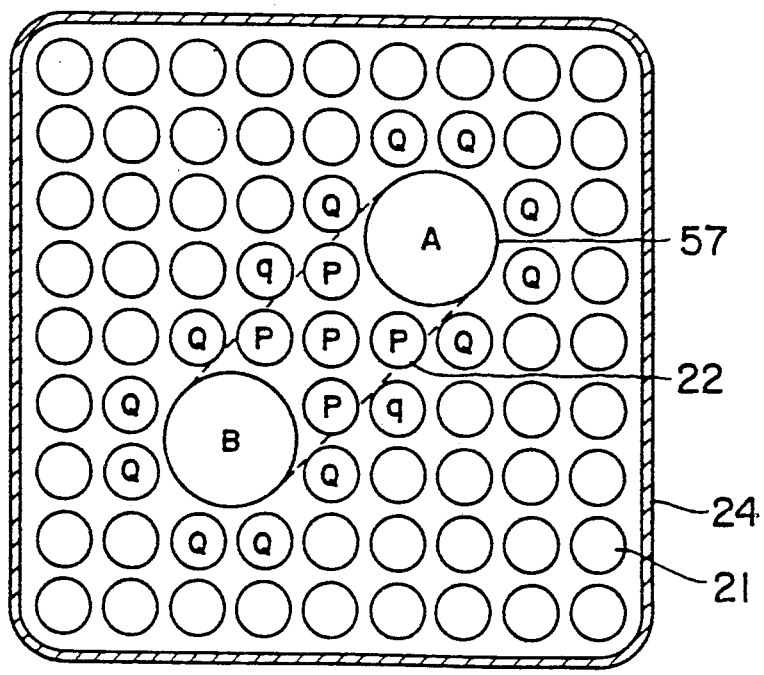
F I G. 42

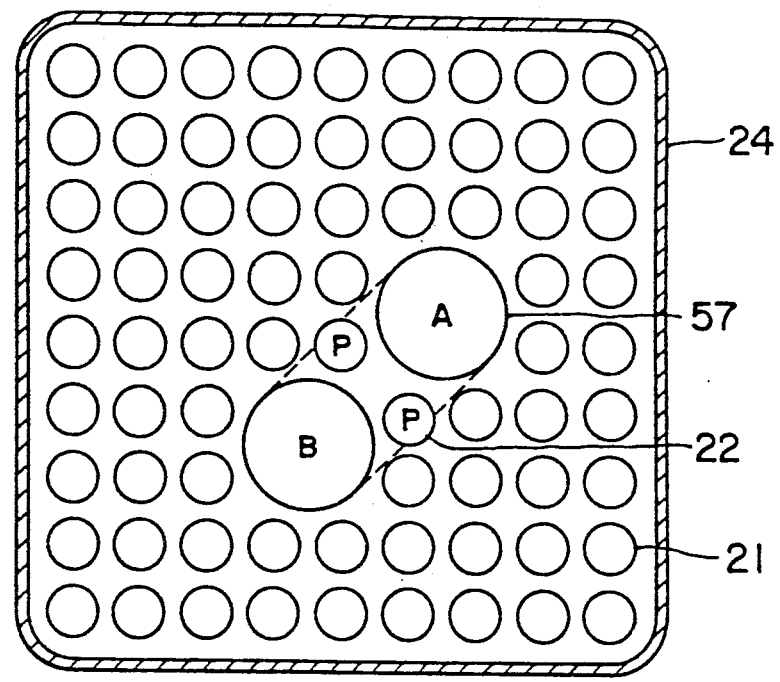
F I G. 43
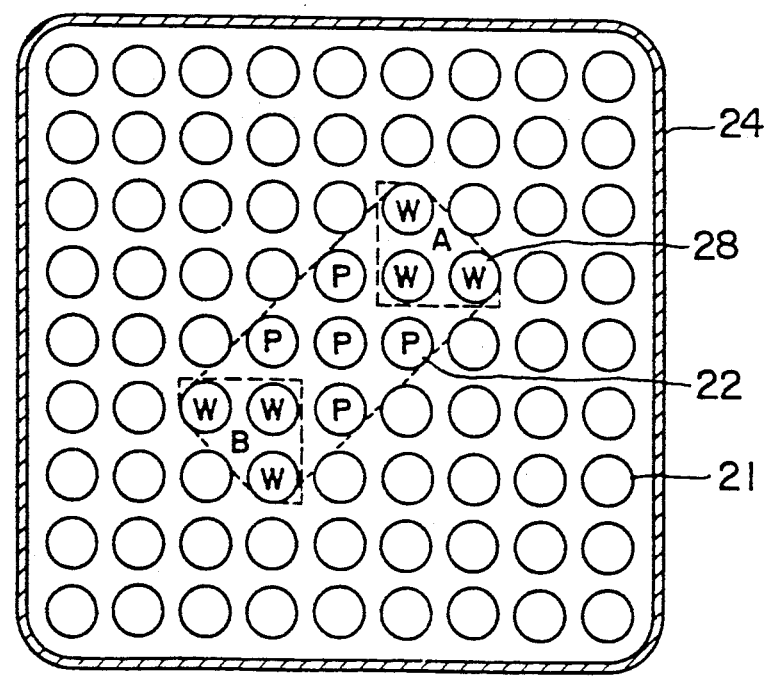
F I G. 44

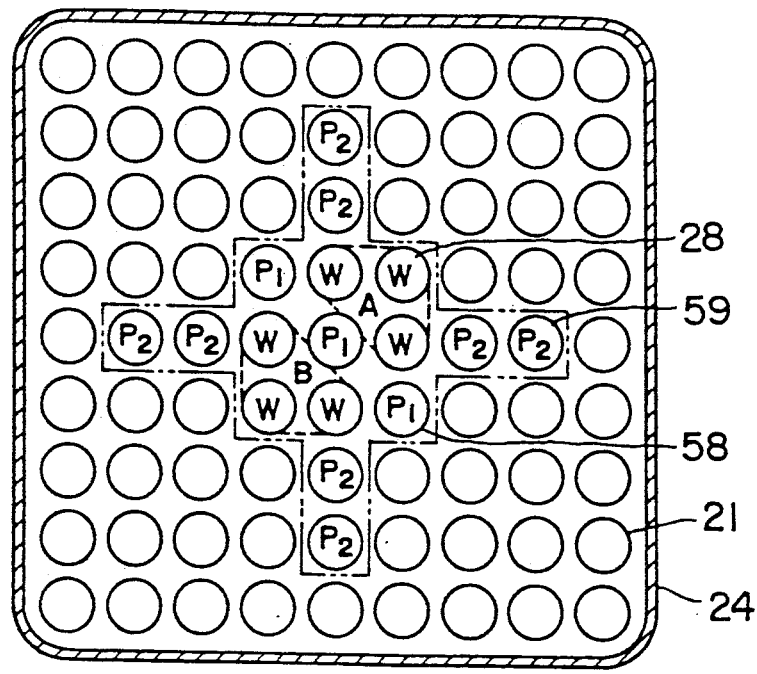
F I G. 45
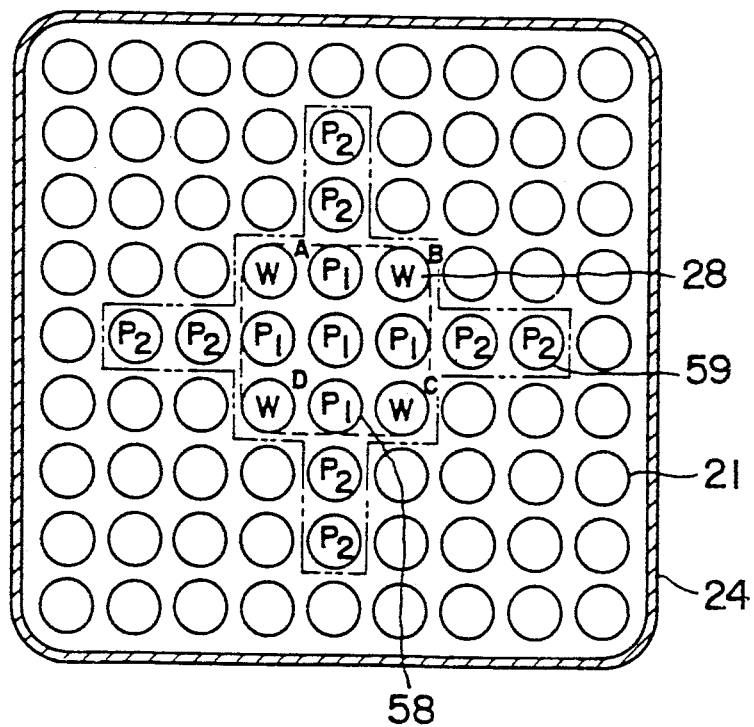
F I G. 46

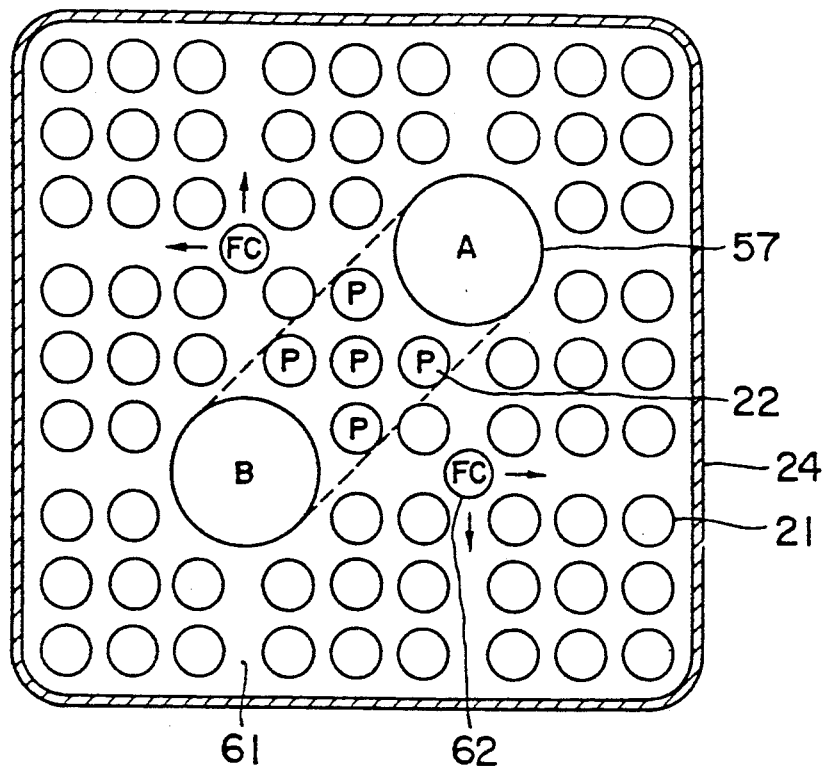
F I G. 47
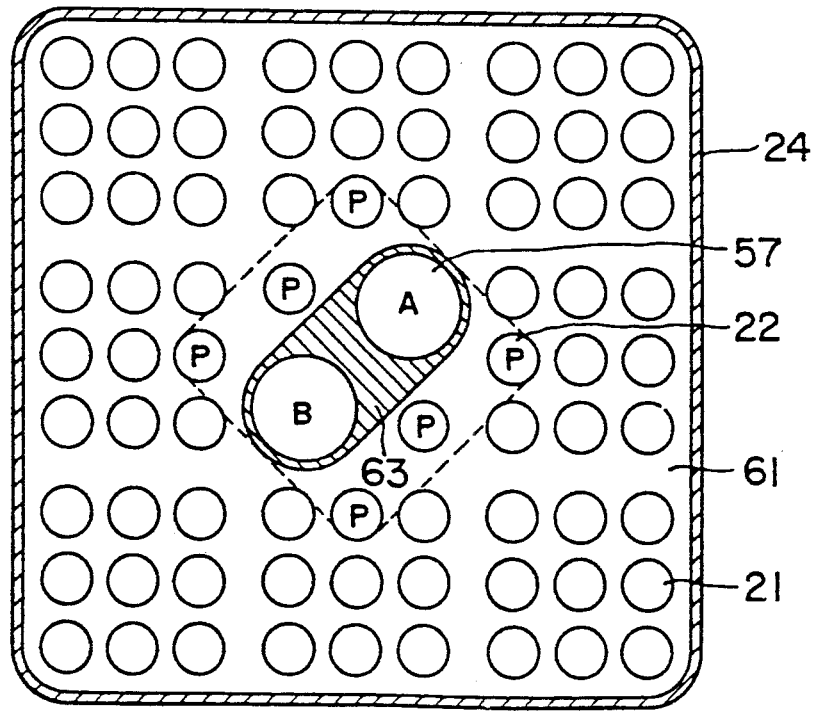
F I G. 48

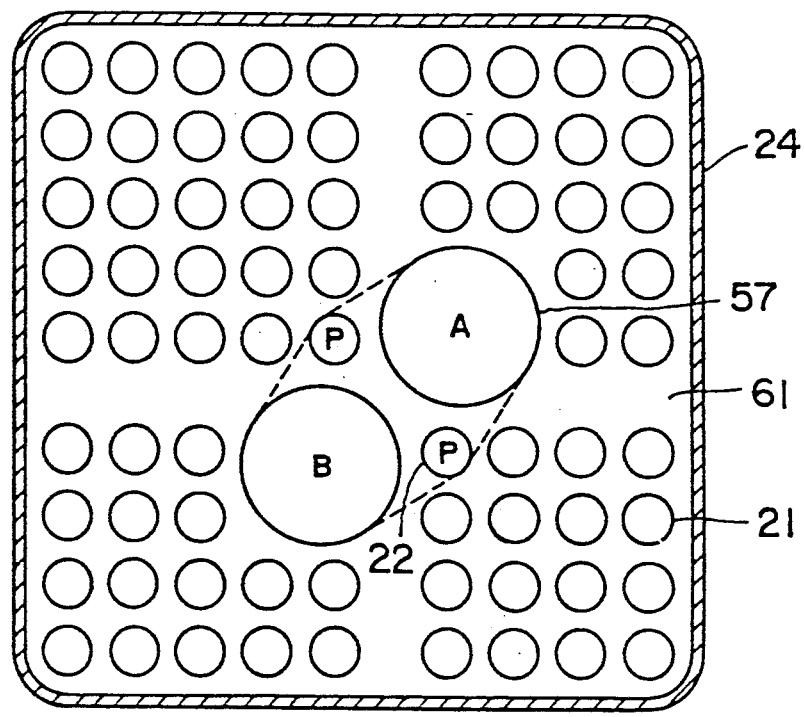
F I G. 51
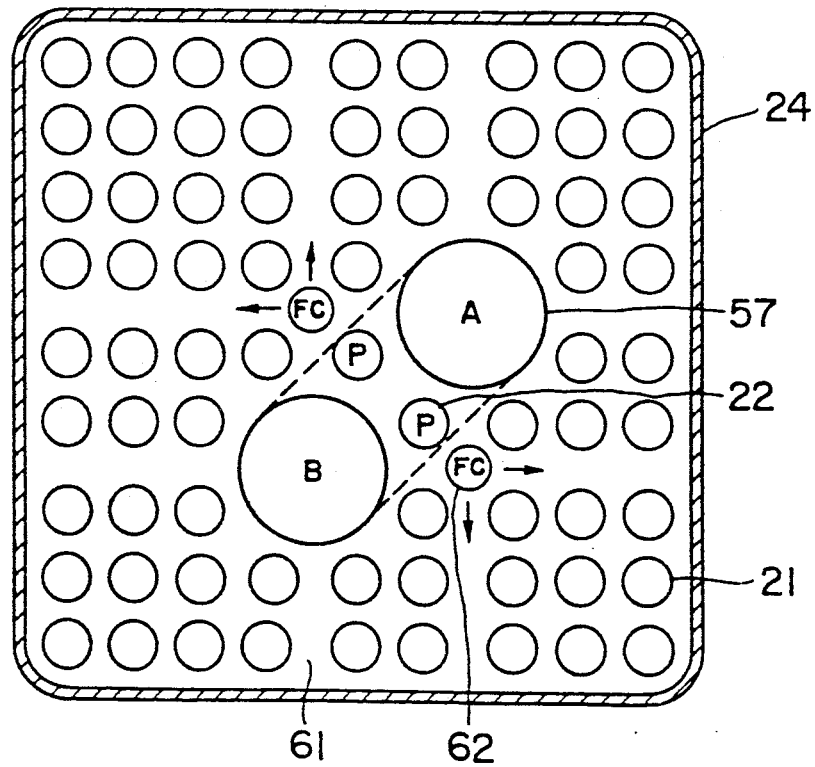
F I G. 52

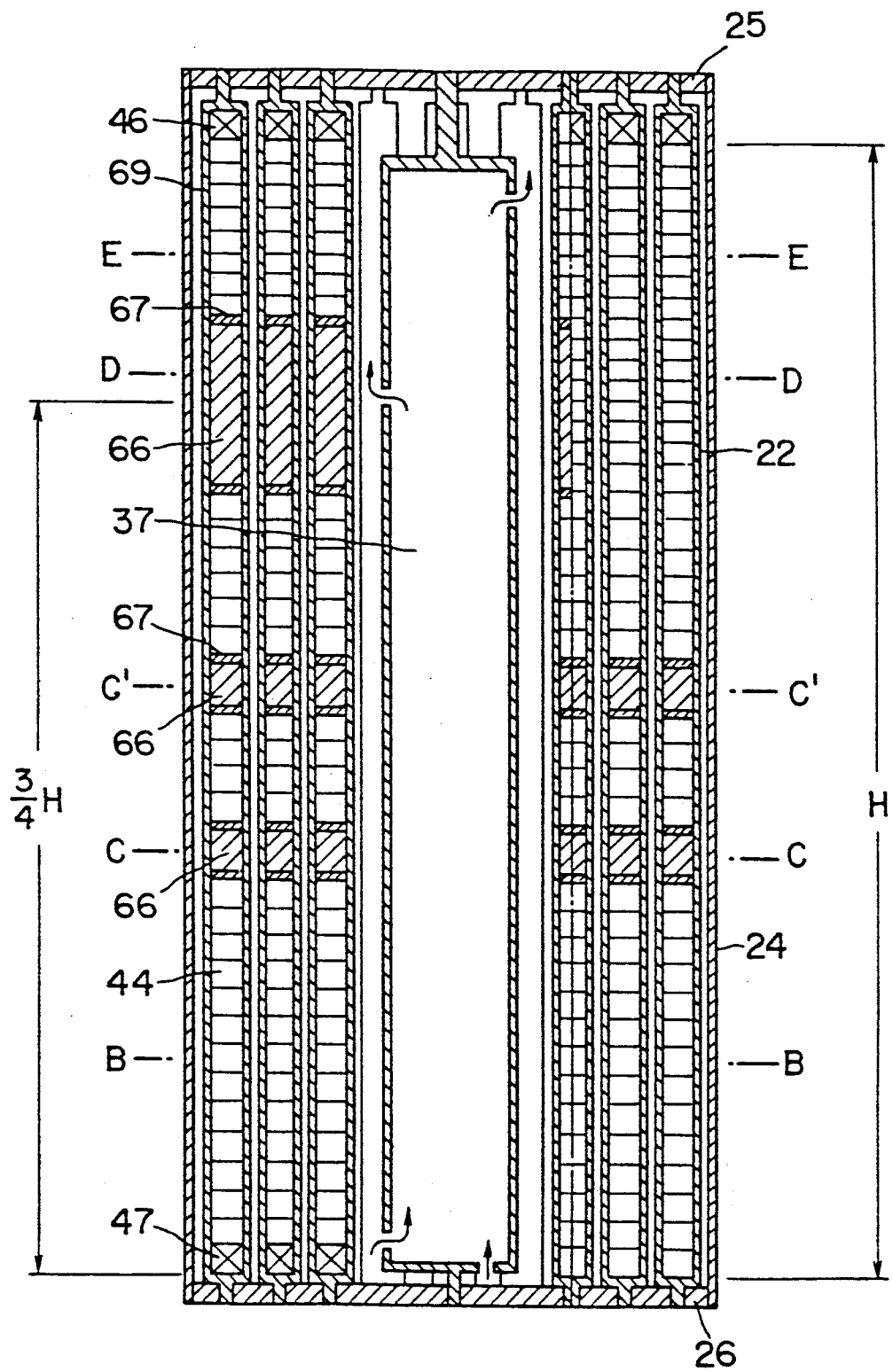
F I G. 59A

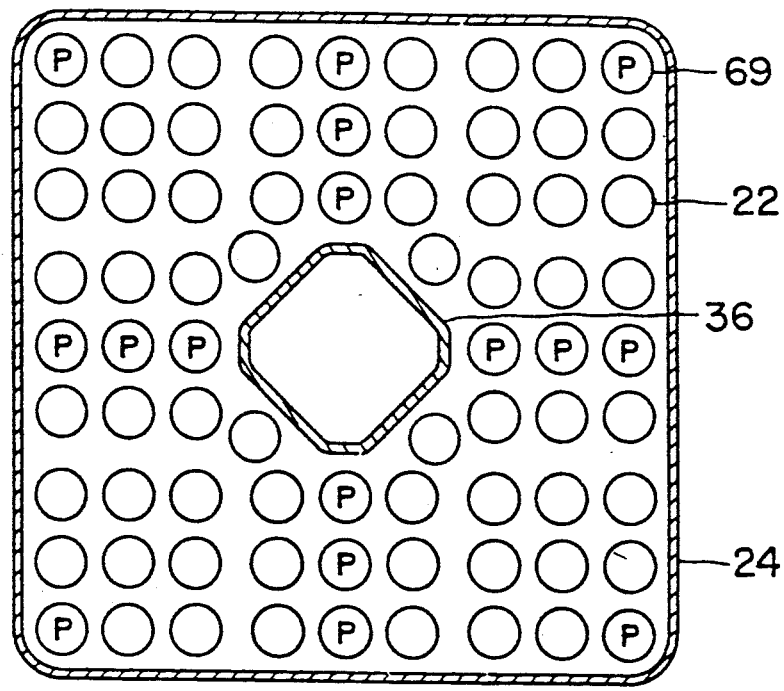
F I G. 66
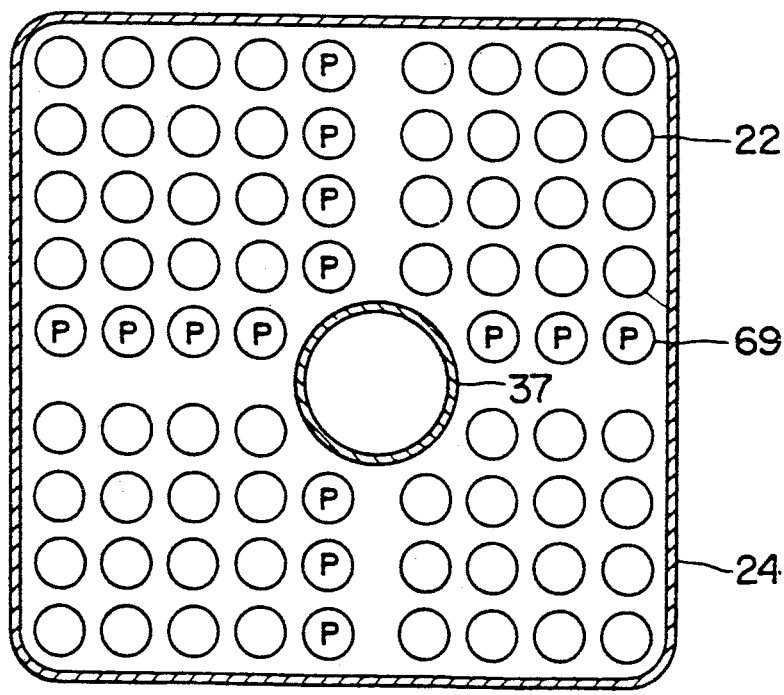
F I G. 67

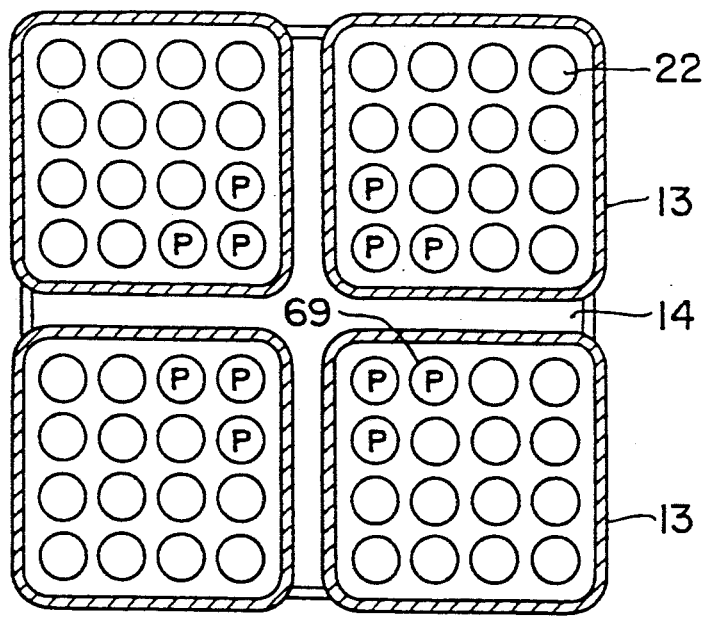
F I G. 68
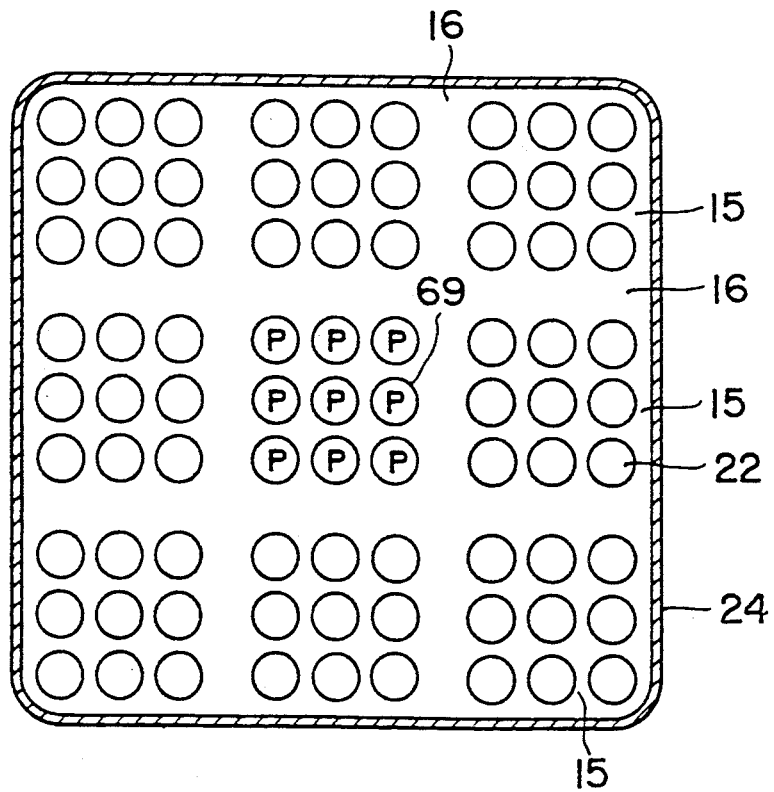
F I G. 69

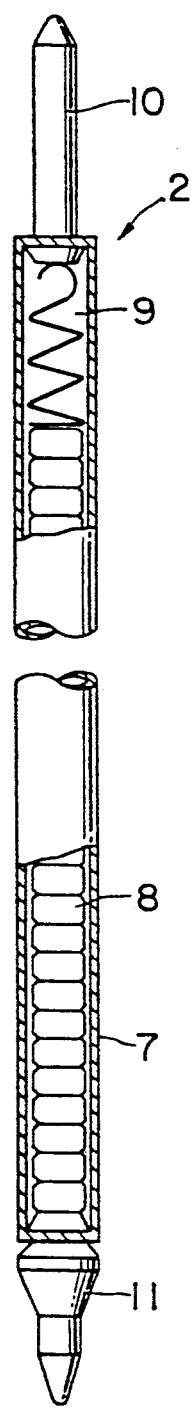
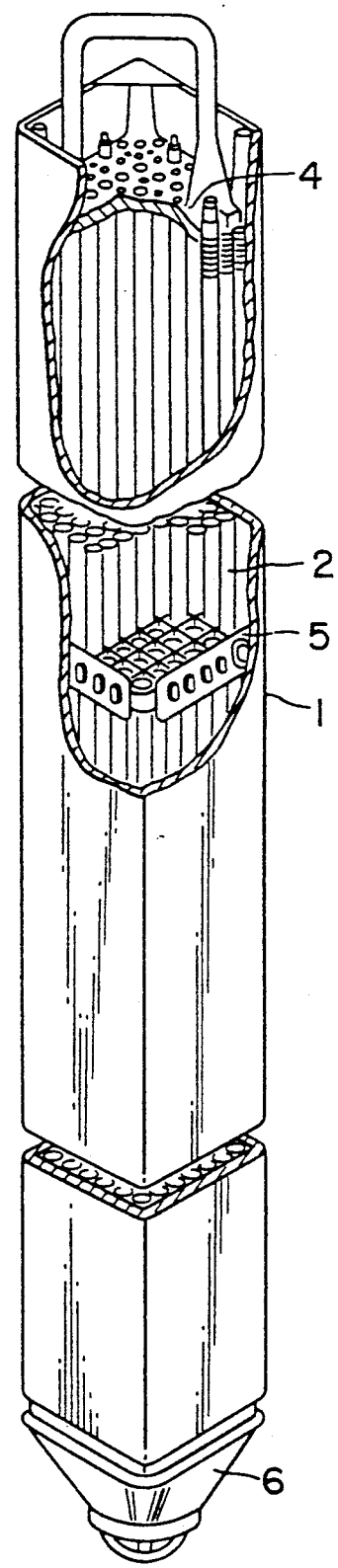
FIG. 73B
FIG. 73A
PRIOR ART

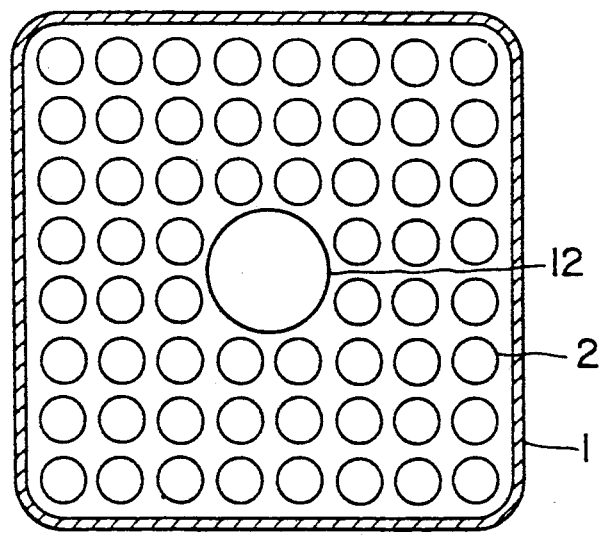
F I G. 75

FUEL ASSEMBLY FOR NUCLEAR REACTOR

BACKGROUND OF THE INVENTION

This invention relates to a fuel assembly for a nuclear reactor and more particularly to a fuel assembly for a boiling water reactor capable of ensuring a long operation cycle and maintaining a high shut-down margin.

A fuel assembly for a boiling water reactor (BWR) is constructed by a square channel box in which a number of fuel rods each comprising a metallic clad in which nuclear fuel material is packed are regularly arranged. The reactor core of the BWR includes a plurality of cells each comprising a cruciform control blade and four fuel assemblies surrounding the control blade and these cells are arranged in a regulated manner in the core. Namely, each fuel assembly and control blade have axes perpendicular and parallel to each other, and a coolant operated as a moderator flows from the lower portion towards the upper portion of the reactor core.

Concerning the BWR, steam void is not formed in a portion near the lower end of the core effective portion, i.e., the lower end of a heat generating portion at which an exothermic reaction is performed, but a lot of voids is generated at the area above the central portion of the reactor core, and the generated voids move up towards the upper portion of the reactor core. Accordingly, the void fraction in the BWR becomes high towards the upper portion of the reactor core, and as a result, the moderation characteristics to neutrons are lowered and hence the output power is also lowered. In order to obviate these defective matters, in a conventional technique, it has been performed to increase the enrichment of the fissile nuclide to be contained in the fuel at a portion of high void fraction or it has been performed to mix a burnable poison with the fuel element to suppress the increasing of the power output at a portion of low void fraction.

For the reasons described above, in the BWR, the burn-up at the upper portion of the core is liable to be delayed, and hence the concentration of U-235 becomes relatively higher than that of the other portion of the core. In addition, since a fissile nuclide such as Pu-239 is generated by the voids, it is difficult to maintain the shut-down margin of the reactor core at the upper portion thereof. Moreover, recently, many efforts have been made for elongating the reactor operation cycle of the reactor and improving the degree of burn-up of the fuel in order to satisfy the economical requirement. In these cases, however, the enrichment of the fuel is necessarily increased, so that the maintenance of the shut-down margin of the reactor is made further difficult.

The fuel assembly which has been conventionally used and a fuel assembly which is expected to be used in the near future for the boiling water reactor (BWR) will be described hereunder by way of typical examples with reference to the drawings.

FIG. 73A is a perspective view of a fuel assembly of conventional type and FIG. 73B is a schematic vertical sectional view of a fuel rod consisting of the fuel assembly.

Referring to FIG. 73A, the fuel assembly comprises water rods, not shown, and fuel rods 2 secured by an upper tie plate 4, a spacer 5 and a lower tie plate 6, and a channel box 1 surrounding the outer periphery of the thus secured water rods and fuel rods 2. Each of the fuel rods 2, as shown in FIG. 73B, comprises a clad or sheath 7, a plurality of fuel pellets 8 arranged in the clad 7, a spring 9 located in a gas plenum disposed above the pellets 8 in the clad 7, an upper plug 10 for closing the upper opening of the clad 7, and a lower plug 11 for closing the lower opening of the clad 7.

FIG. 74 is a cross sectional view of the conventional fuel assembly shown in FIG. 73A, in which sixty-two fuel rods 2 and two water rods 3 are arranged in the channel box 1 to constitute the fuel assembly. The water rods 3 serve to suppress the shortage of the water acting as the moderator in the interior of the fuel assembly, but the water rods 3 are axially uniformly arranged, so that there may arise such problems as excessive water condition at the lower portion of the reactor core or water shortage condition at the upper portion thereof.

FIG. 75 also shows a cross sectional view of a fuel assembly which has been developed for improving the characteristics of the fuel assembly shown in FIG. 74, and the fuel assembly shown in FIG. 75 includes one water rod 12 having a diameter larger than that of the water rod 3 to pass non-boiling water therethrough. However, even in this example, there arises a problem of the excessive water condition at the lower portion of the reactor core and the water shortage condition at the upper portion thereof as described with respect to the former example shown in FIG. 74.

FIG. 76 shows a cross sectional view of a further example of a conventional fuel assembly developed for improving the fuel assembly of the type shown in FIG. 74, and the fuel assembly of FIG. 76 comprises four square channel boxes 13 each containing sixteen fuel rods 2 which are arranged to constitute a water area of a boiling moderator material and a cross-shaped space 14 defined by the respective channel boxes 13 constitutes a water area of a non-boiling moderator material to thereby aim the uniform distribution of the output power in the horizontal direction. With the fuel assembly of this character, however, there also arise problems of the excessive water condition at the lower portion of the reactor core and the water shortage condition at the upper portion thereof.

FIG. 77 shows a cross section of a still further example of the conventional fuel assembly of the type improving that shown in FIG. 75. The fuel assembly of FIG. 77 is constructed by nine sub-bundles 15 each comprising nine fuel rods 2, and relatively wide gaps 16 are defined between the respective sub-bundles 15. With the fuel assembly of this example, the problems of the excessive water condition and the water shortage condition at the lower and upper portions of the reactor core have not been solved.

As described hereinabove, concerning the BWR, steam voids are formed in the area of the location of the fuel assemblies except the lowest portions thereof and the voids move up towards the upper portion of the reactor core, and accordingly, the void fraction in the BWR becomes high towards the upper portion of the reactor core. As a result, the moderation characteristics to neutrons are lowered and hence the fission rate is also lowered. In other words, the burning progresses at the lower portion of the reactor core and the burning is delayed at the upper portion thereof. In order to obviate this phenomenon; that is, in order to suppress the lowering of the output power at the upper portion of the reactor core, it has been performed to increase the enrichment of the fissile nuclide to be contained in the fuel disposed at the upper portion of the reactor core.

However, the increasing in the void fraction at the upper portion of the reactor core and the increasing in the enrichment of the fissile nuclide of the upper portion of the reactor core will result in the difficulty for maintaining the shut-down margin at the upper portion of the reactor core in the shut-down period of the BWR. On the other hand, in order to elongate the reactor operation cycle to meet the economical requirement, it will be desired to further increase the enrichment of the fuel. However, these facts result in the further reduction of the subcriticality at the upper portion of the reactor core, and finally, there may arise a case where the reactor is not shut-down. Because of this problem, in the conventional technique, it is considerably difficult to elongate the operation cycle of the reactor.

SUMMARY OF THE INVENTION

An object of this invention is to substantially eliminate the drawbacks and defects encountered in the conventional technique described above and to provide an improved fuel assembly particularly constituting a reactor core of a water boiling reactor (BWR) capable of ensuring the maintenance of reactor shut-down margin even in the increasing in the enrichment of a fuel, and improving an axial output power distribution.

This and other objects can be achieved in one aspect according to this invention by providing a fuel assembly of the type in which a number of fuel rods each constructed by filling a fuel material in a clad are arranged, the fuel assembly comprising at least one first fuel rod having a partial effective fuel area filled with a fuel material and having a portion in which enrichment of a fissile nuclide is significantly reduced in a clad of the fuel rod or the fissile nuclide does not exist at all at an axial level including a portion (called shutdown zone) at which subcriticality is made small at a period in which maintenance of reactor shut-down margin is made difficult during a reactor operation period, and a second fuel rod having a total effective fuel area filled with a fuel material throughout an entire axial length of the clad of the fuel rod.

According to the preferred embodiment of this invention, the first fuel rod having a partially effective fuel area may be constructed as a fuel rod provided with a partially disposed interposed zone in which the enrichment of the fissile nuclide is significantly reduced in the clad or the fissile nuclide does not exist at all.

The first fuel rod may be further constructed according to the preferred embodiment of this invention a short fuel rod having an axial length shorter than that of the second fuel rod having a total effective fuel area.

Further according to the preferred embodiment of this invention, tube means through which a moderator passes are arranged symmetrically with respect to at least one diagonal line, in cross section, of the fuel assembly and the first fuel rod having the partial effective fuel area is disposed in an area defined between these tube means.

According to this invention, there is also provided, in another aspect, a fuel assembly of the type in which a number of fuel rods each constructed by filling a fuel material in a clad are arranged, the fuel rod comprising at least one first fuel rod having a partial effective fuel area filled with a fuel material and having a portion in which enrichment of a fissile nuclide is significantly reduced in a clad of the fuel rod or the fissile nuclide does not exist at all at an axial level including a first portion at which subcriticality is made small at a period in which maintenance of reactor shutdown margin is made difficult during a reactor operation period and a second portion located between the first portion and a lower end of the effective fuel area, and a second fuel rod having a partial interposed zone in which enrichment of a fissile nuclide is significantly reduced in a clad of the fuel rod or the fissile nuclide does not exist at all at the second portion mentioned hereinabove.

According to the fuel assembly of the characters described above, in regions or zones axially located adjacent to an interposed zone of a fuel rod in which the enrichment of the fissile nuclide is significantly reduced or the fissile nuclide does not exist at all, the neutron interaction (binding effect) is weakened at a reactor cold period and is increased in a reactor high temperature operation period, particularly, during the occurrence of voids. This phenomenon will be explained with reference to the action of the thermal neutrons each having a short diffusion length. Namely, since the density of water is large (i.e., about 1.0 g/cm$^3$) in the reactor cold period, the diffusion length of the thermal neutron becomes small and the interaction of the thermal neutrons in the zones adjacent to the interposed zone of the fuel rod is reduced, and as a result, the neutron multiplication characteristics are lowered. With the boiling water reactor, in the reactor high temperature operation period, the temperature of the water is about 286° C. (reference value) and the density thereof is about 0.74 g/cm$^3$ even when no void is generated, and the migration length of the neutron in the water is increased to about 1/0.74 (i.e. 1.35) times to that in the reactor cold period. Moreover, the density of the steam-water mixture in the occurrence of the voids is lowered to an extent of about 0.3 g/cm$^3$, and as a result, the thermal neutron diffusion length in the gas-water mixture is increased to 1/0.3 ($\approx 3$) times. Consequently, the neutron mutual interaction in the fuel areas adjacent to the interposed zone is increased and hence the neutron multiplication characteristics are also increased.

According to the functions described above, by introducing the interposed zone into the fuel rod, the effective multiplication factor $K_{eff}$ is lowered in the reactor cold period, that is, the reactor shut-down margin (subcriticality) is made large, and on the other hand, in the reactor high temperature operation period, the effective multiplication factor $K_{eff}$ can be prevented from becoming lower even if the fuel amount is reduced by the introduction of the interposed zone, and in a certain case, it may even become possible to increase the effective multiplication factor by suitably designing the fuel rod inclusive of the interposed zone in comparison with that in the case of the fuel rod with no interposed zone.

In addition, during the operation period of the BWR, since the void ratio is high at the upper portion of the reactor core, the moderator is insufficient, but according to this invention, the amount of the fuel at the upper portion of the reactor core is reduced, so that the water-to-fuel volume ratio is increased, thus resolving the insufficiency of the moderator. The output power is therefore increased and the power axial distribution can be improved. Moreover, since the water much exists in the upper portion of the reactor core, the void factor (i.e. large load) can be alleviated.

The coolant flows upwardly from the lower portion of the reactor core, and the voids are not generated in the lower portion thereof but are generated in the other portion, and particularly, in the upper portion of the reactor core, the void factor is increased. This fact means that the flow rate of the coolant in steam-water mixture state increases largely. Since the pressure drop is usually in proportion to about the square of the coolant flow rate, the pressure loss in the upper portion of the fuel assembly is made large. The pressure loss is varied in accordance with the wetted areas of the fuel rods or channel box and the structure or numbers of the spacers.

In this connection, according to this invention, the fuel rod is partially removed at an area upper than a portion having a length of two-third ($\frac{2}{3}$) to five-sixth (5/6) of the effective fuel length measured from the lower end of the effective portion of the fuel to thereby locate the vanishing zone, so that the number of the fuel rods in the upper portion of the fuel assembly where the pressure loss is made large can be reduced. Accordingly, the wetted area is reduced, thus effectively reducing the pressure loss, and as a result of this, the reduction of the driving power of a recirculation pump is made possible. The stability of the channel box is improved and the flow of the coolant in the channel is also made stable, which results in the reduced variation of the void factor and the improvement of the reactor core stability.

Since the thermal neutron flux is increased around the tube through which the moderator passes, the thermal neutron flux increasing region can be widened by arranging a plurality of such tubes in the fuel assembly. The reactivity of the fuel is also increased in the thermal neutron flux increasing region, thus increasing the effective multiplication factor $K_{eff}$. The tubes may be preferably arranged symmetrically with respect to the diagonal line of the fuel assembly in cross section to make easy the design thereof.

Preferred embodiments of this invention will be further described hereunder in detail with reference to the accompanying drawings.

BRIEF DESCRIPTION OF THE DRAWINGS

In the accompanying drawings:

FIGS. 2A and 2B are an elevational section and a cross section respectively of the first typical embodiment according to this invention;

FIGS. 4 to 20 are cross sectional or plan views of the fuel assemblies of second to eighteenth embodiments according to this invention;

FIG. 21 represents the nineteenth embodiment according to this invention, in which

FIG. 22 represents the twentieth embodiment according to this invention, in which

FIG. 25 represents the twenty-third embodiment according to this invention, in which FIG. 25A is an elevational section of the fuel assembly of the twenty-third embodiment and FIGS. 25B, 25C and 25D are cross sections taken along the lines B-B, C-C and D-D respectively shown in FIG. 25A;

FIGS. 26 to 40 and 42 to 56 are all cross sections or plan views of the twenty-fourth to thirty-eighth and fortieth to fifty-fourth embodiments according to this invention;

FIG. 41 is a plan view of the thirty-ninth embodiment according to this invention.

FIG. 57 represents the fifty-fifth embodiment according to this invention, in which

FIG. 59 represents the fifty-sixth embodiment according to this invention, in which FIG. 59A is an elevational section of the fuel assembly of the fifty-sixth embodiment and FIGS. 59B, 59C and 59D are cross sections taken along the lines B-B, C-C and D-D respectively shown in FIG. 59A;

FIGS. 60 to 69 are cross sections or plan views of the fifty-seventh to sixty-sixth embodiments according to this invention;

FIG. 71 represents examples of the fuel rods mounted in the fuel assemblies according to this invention, in which FIG. 71A shows a curve showing the characteristics required for the control rods, FIG. 71B shows a characteristic curve of the fuel rod embodied on the basis of the curve shown in FIG. 71A, and FIG. 71C shows elevational sections of two control rods, respectively in half;

FIG. 73A is a perspective view, partially broken away, of a conventional fuel assembly;

FIG. 73B is an elevational section of a fuel rod mounted in the fuel assembly shown in FIG. 73A; and FIGS. 74 to 77 are cross sections or plan views of conventional fuel assemblies.

DESCRIPTION OF THE PREFERRED EMBODIMENTS

In advance of the detailed description of the preferred embodiments of this invention, the principal theory or basic principle according to this invention will be described hereunder with reference to the accompanying drawings.

Figure 1A:
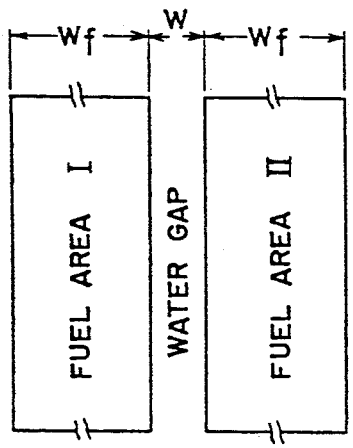
FIGS. 1A to 1C are illustrations or graphs for explanation of the basic theory of this invention.
Figure 1B:
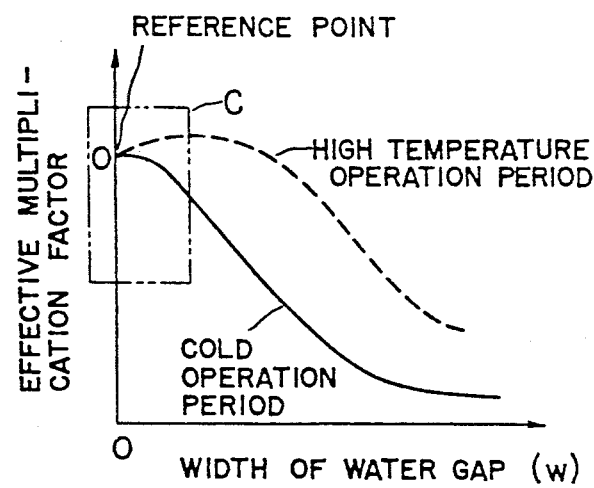
Figure 1C:
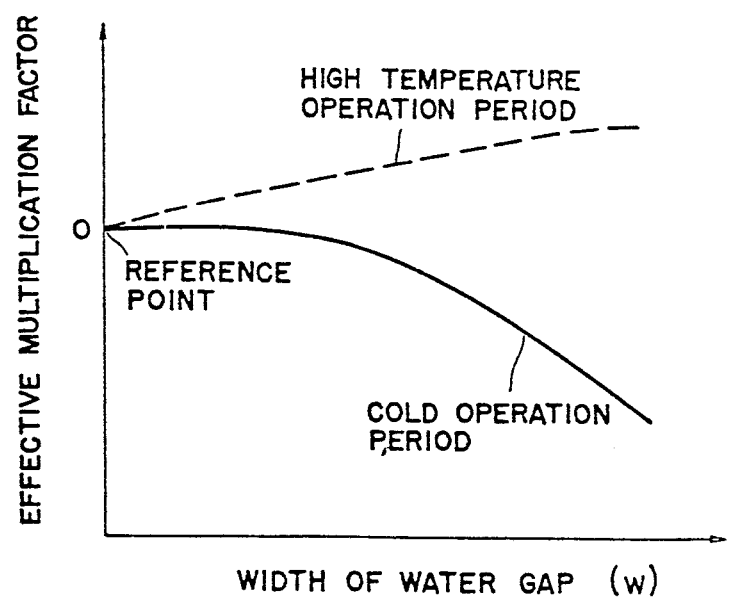

Referring to FIG. 1A, it is assumed that a water gap having a width w exists between two fuel existing zones I and II represented so as to have a rectangular cross section, respectively, and width wf of the fuel existing zone I(II) is considerably larger than the width w of the water gap as viewed from the same direction. In this case, a relationship between the width w of the water gap and the variation of the multiplication factor of the neutron is represented by a graph shown in FIG. 1B, and a framed portion C in FIG. 1B is shown in FIG. 1C on an enlarged scale. Referring to FIG. 1B or 1C, the variation of the multiplication factor is shown by a dotted line representing a high temperature condition or shown by a solid line representing a cooled temperature condition, both lines starting from "0" reference point showing the condition of no water gap. In a case where the water gap exists in the axial and normal (usually, horizontal with respect to a light water reactor) directions in the fuel assembly, it is considerably difficult to design the fuel assembly so as to have a wide water gap zone, and in other words, the formation of a wide water gap in the limited area makes narrow the fuel existing zone, which results in the reduction of the heat generating zone.

In one embodiment of this invention, wide and narrow areas of more than two kinds are interposed between or among the fuel rods, and accordingly, it may be necessary to clearly describe herein the characteristics of the area having a narrow width and being interposed between the fuel rods, these or this zone being called "interposed area" hereinafter. For this purpose, FIG. 1C is shown on an enlarged scale of the framed portion C of FIG. 1B, and theoretically calculating values of the variations of the multiplication factors in the case where the water gap has a width of 2 cm at the most show substantially identical curves to those shown in FIG. 1C. Namely, it will be understood from the curves in FIG. 1C that the variation of the multiplication factor in the high temperature operation cycle (i.e. void generating cycle) increases in the positive direction (i.e. the effective multiplication factor $K_{eff}$ increases) in accordance with the increasing in the width of the water gap, and in the cooled temperature condition, the effective multiplication factor $K_{eff}$ having been remarkably reduced when the width of the water gap exceeds about 1 cm in accordance with the increasing in the water gap width, thus resulting in the increasing in the subcriticality at the shut-down period of the reactor.

The foregoing description was made on the view point of the relative operational variations of neutrons in two fuel zones with the water gap interposed, but the above described operation or function may be described on the basis of a mode in which the infinite multiplication factor $K_{\infty}$ of the fuel assembly is divided into old known four factors. According to this mode, the curves shown in FIG. 1C will be represented by the variation of the characteristics regarding the thermal neutron utilization factor and the resonance escape probability. In the case where it is required to enlarge the width of the water gap in the interior of the fuel assembly without reducing the number of the fuel rods, it is obliged to reduce the widths of the gaps between the respective fuel rods, and the reduction of the gap widths therebetween results in the increase in the shielding effect of resonance neutrons between the respective fuel rods in the resonance absorption. As a result, the resonance escape probability is increased, and on the other hand, the thermal neutron flux ratio of the water gap zone with respect to the fuel zone is reduced and hence an effect for lowering the thermal neutron utilization factor is attained. Accordingly, it will be said that the curves of the graph shown in FIG. 1C are substantially determined by the offset effect of the water density dependency and the water gap width dependency of the above two effects.

In order to ensure the gaps between the respective fuel rods and elongate the water gap width, it has to be done to remove the fuel rods (fuel material), and in such case, the variation of the resonance escape probability described above is not based on the shielding effect of the resonance neutrons and that probability is increased on the basis of the increase in the slow-down effect of the neutrons. Namely, in the case where the reactor is operated at a high temperature and the voids are generated, the moderator is in short supply, which is relieved by the introduction of the water gap, and as a result, the resonance escape probability is increased. The thermal neutron utilization factor will be substantially identical to that mentioned with respect to the above case.

Figure 2B:
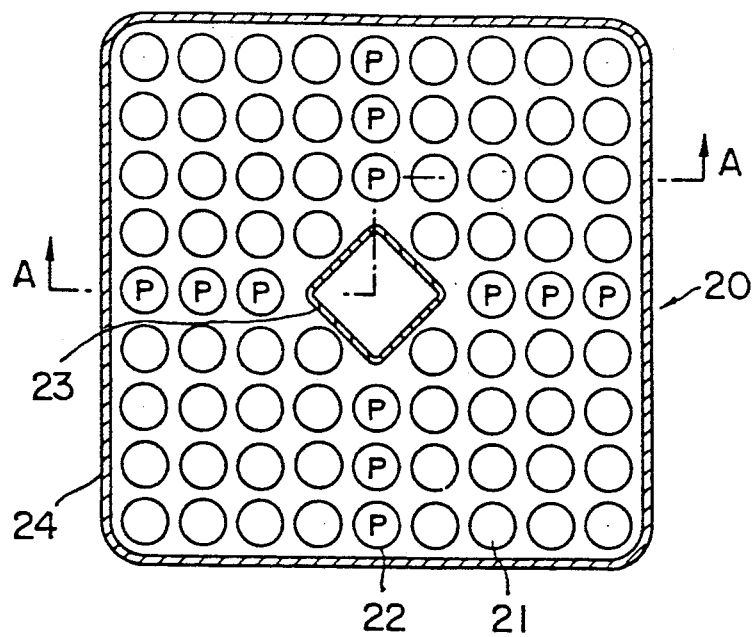

FIG. 2 is a schematic view of one embodiment of this invention made on the basis of the principal theory described hereinbefore, and FIG. 2A is an elevational section taken along the line A-A shown in FIG. 2B showing a plan view of a fuel assembly.

Referring to FIG. 2, a fuel assembly 20 includes a water rod 23 in square cross section arranged in the central portion of the fuel assembly 20 and fuel rods 21 and 23 arranged, except the central portion, regularly in nine rows and nine lines as shown in FIG. 2B. These water rod 23 and fuel rods 21 and 22 are surrounded by a channel box 24 having upper and lower ends secured by upper and lower tie plates 25 and 26, respectively. The fuel rods 22 each in which an interposed member 27 is inserted are denoted by the letter P. The length of the interposed member 27 is suitably determined to be less than about ⅓ of the entire effective length H of the fuel rod, the length being about 30 to 60 cm in the illustrated embodiment. The interposed member 27 is so located in the fuel rod 22 that the central portion of the interposed member 27 is positioned at a vertical portion having a height of about ⅜H as measured from the lower end of the effective length of the fuel rod. This is based on the fact that in a zone existing near the ⅜H portion and having a vertical width of about ⅛H the subcriticality is made small. Although the details of the interposed members 27 will be described hereinafter, as typical examples, the insertion of hollow tubes, insertion of graphites, insertion of $ZrH_2$ pellets and the introduction of water will be listed up. Output power spike suppressing members 27a for preventing the output power spikes are inserted in the fuel rods 22 adjacent to the interposed members 27, respectively, which will be also described hereinafter.

The fuel rods P into which the interposed members are arranged in cruciform (in the state of mutually perpendicular straight lines) with the water rod 23 located at the central portion thereof. Each group includes three fuel rods P and the neutron interaction between the respective groups is small in this embodiment, so that there is no need for locating the fuel rods P on the same level.

The fuel rod P provided with an inserted or charged interposed member or material is hereinafter merely called "fuel rod P with the interposed member".

Figures 3A, 3B:
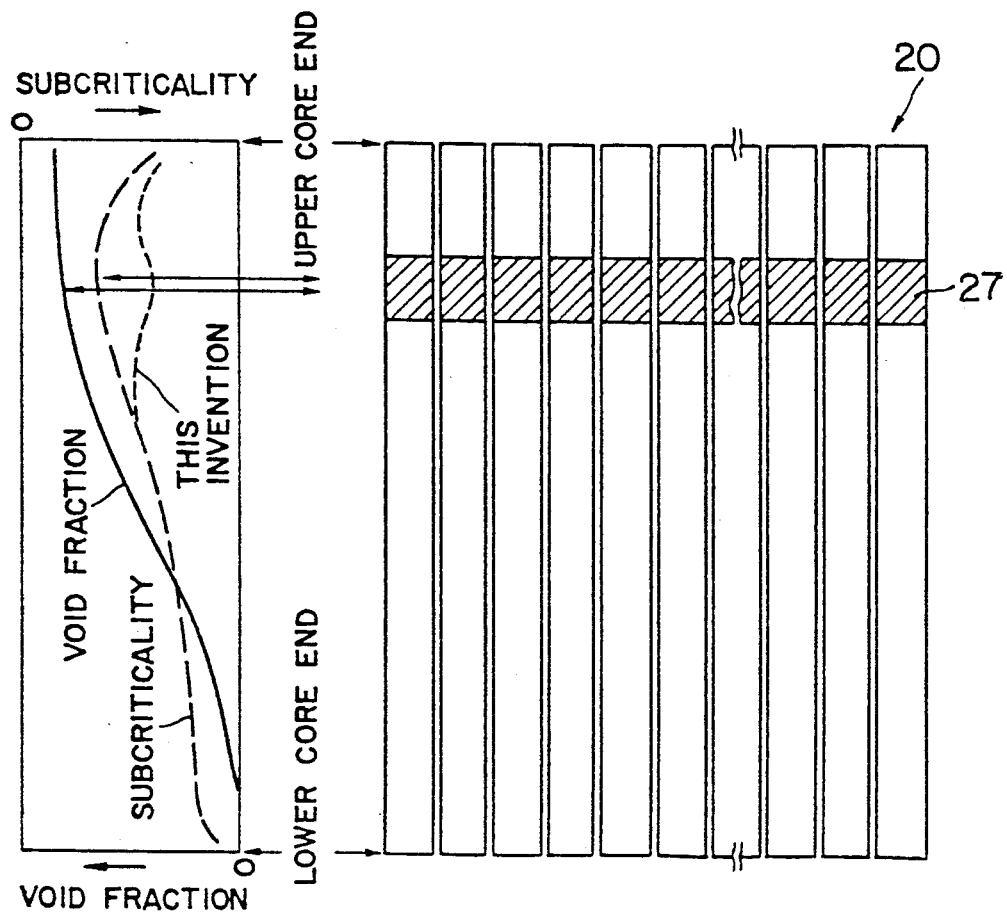
FIG. 3A is a schematic view of a BWR core to which the fuel assembly of FIG. 2 is applied.
FIG. 3B is a graph representing the relationship between the void factor in the core axial direction and the subcriticality.

FIG. 3A is a schematic view showing an example in which the fuel assemblies 20 each referred to hereinabove are applied to a water boiling reactor and FIG. 3B is a graph showing the void fraction in the axial direction of the reactor core and the subcriticality distribution. The interposed members 27 are arranged in portions hatched in FIG. 3A, and it is effective to accord with the location levels of the interposed members 27 in the respective fuel rods P, but it is not always necessary to accord with the locations thereof in the respective fuel assemblies 20. This is based on the fact that the width of the interposed area substantially corresponds at the most to the width of the water gap at the outer periphery of the fuel assembly and is also based on the operation due to the binding effect in the interior of the fuel rod. With the interposed area having a narrow width, the binding effect is substantially masked by the water gap zone disposed at the outer periphery of the reactor core to less affect on the fuel assemblies arranged neighborhood. The axial length of each of the interposed members is varied in accordance with the number of the fuel rods into which the interposed members are charged and the mode of arrangement, but usually, the axial length thereof is determined to be within 15 to 90 cm. Below 15 cm, much effect is not expected, whereas above 90 cm, the effect is not relatively proportional to the reduction of the amount of the heat generating material (fuel) to be charged. Since the interposed members are arranged at portions in the fuel assemblies at which the subcriticality is made smallest, the embodiment of this invention can be effectively operated.

Figure 4:
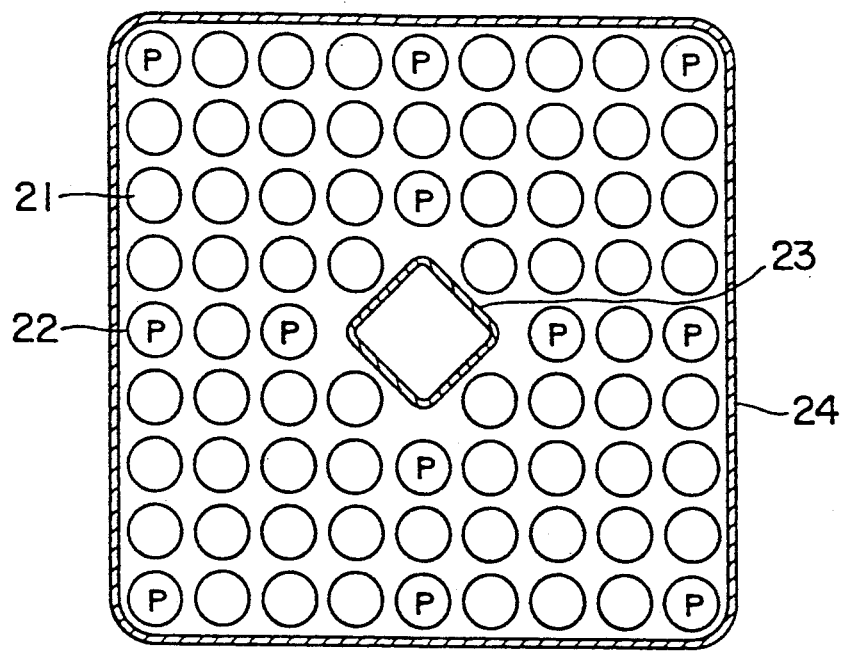

FIG. 4 shows a plan view of the second embodiment of the fuel assembly according to this invention, and the like reference numerals are assigned to elements or portions corresponding to those shown in FIGS. 1 to 3. This numerical coincidence will be applicable to other embodiments which will be described hereinafter.

Concerning the fuel assembly shown in FIG. 4, one of the fuel rods P in each group, including three fuel rods P, is substituted for the usual fuel rod 21 arranged in each corner portion of the fuel assembly because the corner portion attains the effect for improving the shut-down margin of the reactor.

The fuel rods P with the interposed members arranged at the corner portions of the fuel assembly serve remarkably to increase the effective multiplication factor $K_{eff}$ at the high temperature operation period of the reactor for the reason that there exists sufficient water around the fuel rods of the corner portions, thus easily generating the output power. This arrangement effectively utilizes this function of the fuel assembly.

With the fuel rods P of the fuel assembly of this arrangement, when a burnable poison (for example, gadlinium Gd) is inserted into each fuel rod P at substantially the axially central portion by the amount such that the effect of the burnable poison is vanished at the end of the operation cycle, the aforementioned object can be attained without generating the output power spike.

Figure 5:
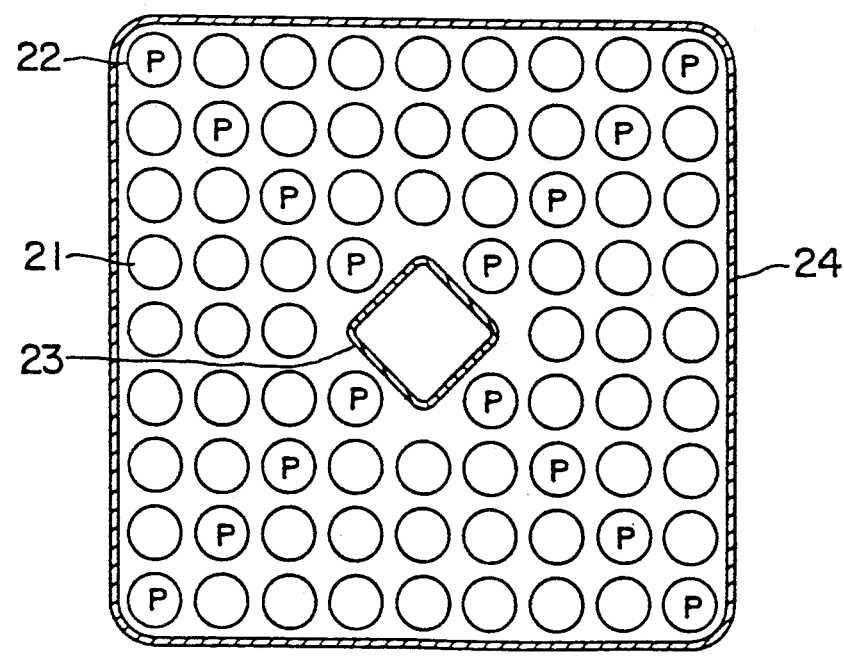

FIG. 5 is a plan view of the third embodiment according to this invention, in which the fuel rods P in which the interposed members are inserted are diagonally arranged in cruciform with the water rod 23 disposed at the central portion thereof, and accordingly, the fuel assembly of this embodiment includes sixteen fuel rods P with the interposed members and sixty usual fuel rods 21.

Figure 6:
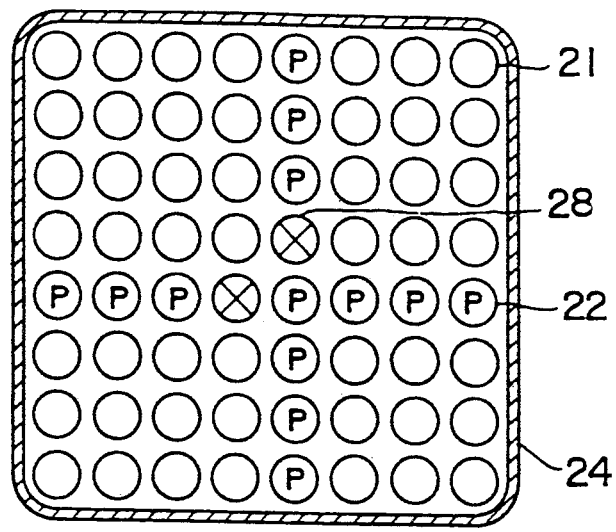

FIG. 6 is a plan view showing the fourth embodiment according to this invention, in which two water rods 28 each having a relatively small diameter are arranged as referred to with respect to the conventional fuel assembly, and accordingly, in this embodiment, the fuel assembly includes thirteen fuel rods P with the interposed members and forty-nine usual fuel rods 21. The fuel assembly of this embodiment does not include a water rod having a large diameter, so that the mutual function or action between the respective groups of the fuel rods P with the interposed members (three or four rods P in each group) in the cruciform arrangement is slightly larger than that attained by the first embodiment, and in this embodiment, it will be better to locate the respective interposed members at substantially the same axial levels.

Figure 7:
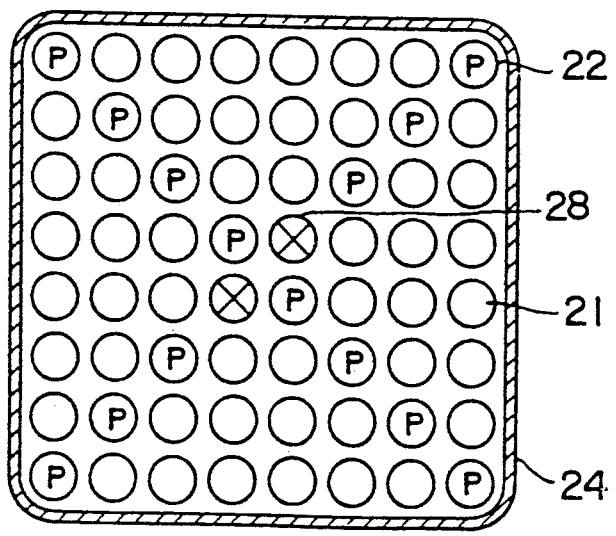

FIG. 7 is a plan view of the fifth embodiment according to this invention, which utilizes two water rods 28 each having a small diameter as described with reference to the embodiment shown in FIG. 6. According to this embodiment, the fuel rods P with the interposed members are diagonally arranged, and fourteen fuel rods P with the interposed members and forty-eight usual fuel rods 21 are arranged. This fifth embodiment attains substantially the same function as that attained by the fourth embodiment shown in FIG. 6.

FIG. 8 is a plan view of the sixth embodiment according to this invention which also utilizes two water rods 28 each having a small diameter as described with reference to the embodiments shown in FIGS. 6 and 7. The fuel assembly of this embodiment includes fuel rods P with interposed members gathered at the central portion thereof and comprises fourteen fuel rods P with the interposed members and forty-eight usual fuel rods 21. The fuel assembly of this embodiment attains substantially the same functions as those attained by the embodiments shown in FIGS. 6 and 7.

FIG. 9 is a plan view of the seventh embodiment according to this invention, which utilizes two water rods 28 each having a small diameter as described with reference to the embodiments shown in FIGS. 6 and 7. In this embodiment, the fuel rods P with the interposed members are arranged in two rows each parallel to one diagonal line of the fuel assembly. The fuel assembly of this embodiment includes eight fuel rods P with the interposed members and fifty-four usual fuel rods 21 and attains substantially the same functions as those attained by the embodiments shown in FIGS. 6 and 7. Since the number of the fuel rods P with the interposed members are smaller than that of the former embodiments, the length of each interposed member may be made larger or a plurality of interposed members may be inserted into one fuel rod P. Accordingly, this embodiment can provide the improved shut-down margin and be suitable for adjusting the axial output power distribution. In other words, water is in short supply at the upper portion of the reactor core during the high temperature operation period, but the water shortage may be alleviated by the existence of the interposed members inserted in the fuel rods P.

Figure 10:
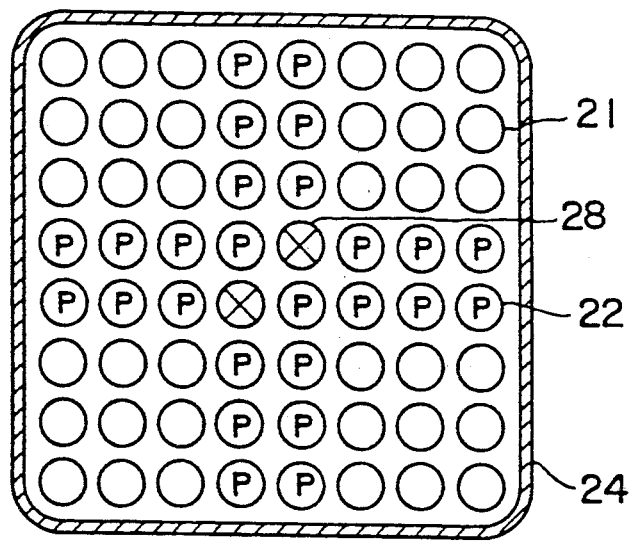

FIG. 10 is a plan view of the eighth embodiment according to this invention, which is applicable to the mode utilizing two water rods 28 each having a small diameter. In the fuel assembly of this embodiment, the fuel rods P with the interposed members are arranged in a double-cruciform, and the fuel assembly comprises twenty-six fuel rods P with the interposed members and thirty-six usual fuel rods 21. The fuel assembly also includes four units of 3×3 (three lines and three rows) sub-bundles at the axial level of the interposed member insertion height, which are widely separated by the existence of the interposed members, so that very large shut-down margin can be obtained on that level of height. The degree of the shut-down margin can be adjusted by regulating the axial length of the interposed members, and in case of the length of the interposed member being about 15 to 30 cm (usual), the remarkable effect can be expected. The heights of the fuel rods P in respective cruciform arrangements may be changed with each other as occasion demands, and this arrangement will effectively change the output power distribution.

Figure 11:
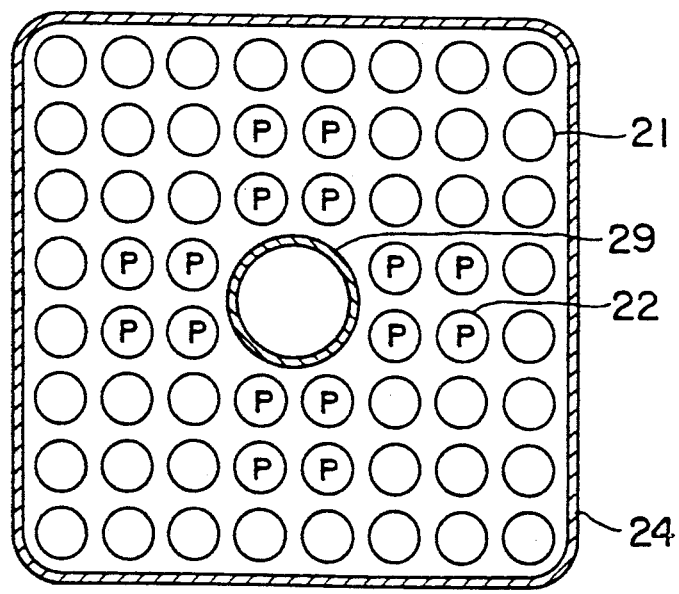

FIG. 11 is a plan view of the ninth embodiment according to this invention, in which a water rod 29 circular in section having a larger diameter and a size corresponding to four fuel rods arranged in a bundle in the fuel assembly of the embodiment shown in FIG. 10 is arranged at the central portion of the fuel assembly, which therefore includes sixteen fuel rods P with the interposed members and forty-four usual fuel rods 21. The fuel assembly of this embodiment attains function and effect slightly less than those attained by the embodiment shown in FIG. 10.

FIG. 12 is a plan view of the tenth embodiment according to this invention, which corresponds to the arrangement of the fuel rods shown in FIG. 7, but the central four rods are substituted with one water rod 31 having a square cross section. The fuel assembly of this embodiment includes twelve fuel rods P with the interposed members and forty-eight usual fuel rods 21, and attains function and effect slightly less than those attained by the embodiment shown in FIG. 10.

FIG. 13 is a plan view showing the eleventh embodiment according to this invention, in which fuel rods, i.e., fuel cells are arranged in eleven lines and eleven rows and a water rod 32 having a large diameter and a size corresponding to nine fuel rods in a bundle is located at the central portion of the fuel assembly. The fuel assembly of this embodiment includes sixteen fuel rods P with the interposed members arranged in cruciform (i.e. in lines normal to each other) with the water rod arranged centrally of the cross shape and ninety-six usual fuel rods 21.

FIG. 14 is a plan view of the twelfth embodiment according to this invention, which is a modification of the embodiment shown in FIG. 13 having the fuel cells arranged in eleven rows and eleven lines. This modified embodiment includes the thirty-three fuel rods P with the interposed members and seventy-six usual fuel rods 21 with a water rod 33 square in section having a size corresponding to nine fuel rods in a bundle arranged at the center of the fuel assembly. The fuel zones are divided into nine sub-zones in accordance with the heights of the inserted locations of the interposed members to effectively increase the shut-down margin and improve the effective multiplication factor $K_{eff}$ of the reactor during the high temperature reactor operation period.

FIG. 15 is a plan view of the thirteenth embodiment according to this invention, in which a water rod 34 square in cross section having a size corresponding to five fuel rods in a bundle is arranged at the central portion of the fuel assembly in a manner inclined by 45° with respect to the fuel bundle, and the fuel bundle is divided into four sub-bundles by arranging twelve fuel rods P with the interposed members in cruciform. The fuel bundle of this embodiment includes sixty-four usual fuel rods 21. Accordingly, since the distances between the respective sub-bundles at the heights of the inserted location of the interposed members of the fuel rods P is large this embodiment can attain the effects for increasing the effective multiplication factor (hot $K_{eff}$) at the high temperature operation period and for remarkably reducing the effective multiplication factor (cold $K_{eff}$) at the low temperature operation period (i.e. attaining large shut-down margin of a reactor). With this embodiment, a remarkable effect ca be attained even by using the fuel rods P with the interposed members each having relatively a short length.

Figure 16:
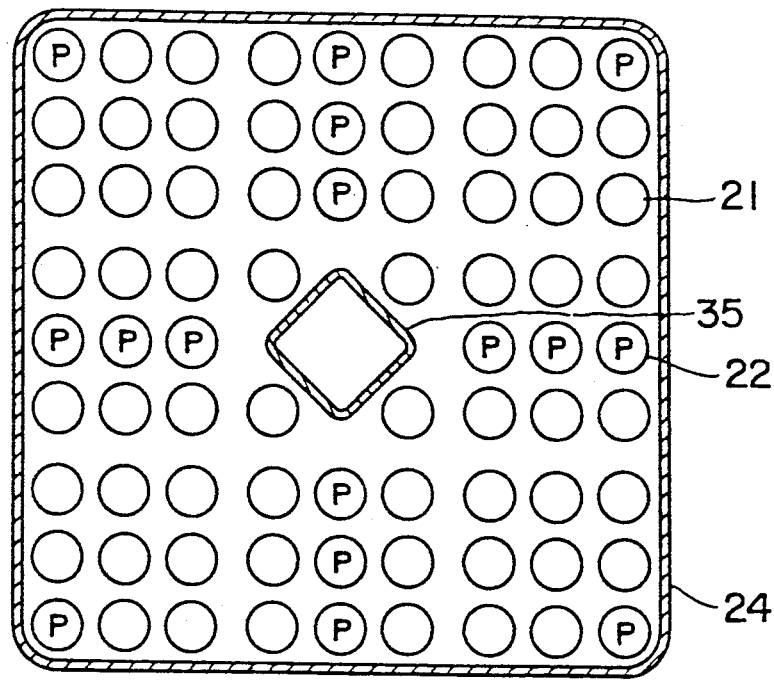

FIG. 16 is a plan view of the fourteenth embodiment according to this invention, in which a water rod 35 square in cross section having a size corresponding to five fuel rods in a bundle is arranged at the central portion of the fuel assembly in a manner inclined by 45° with respect to the fuel bundle, which is divided into nine sub-bundles. The sub-bundles are separated from each other through relatively wide gaps. Twelve fuel rods P with the inserted members are centrally arranged in cruciform and four fuel rods P are disposed one by one at the respective corner portions of the fuel bundle. This embodiment also includes sixty usual fuel rods 21. This embodiment can also attain the effects for increasing the effective multiplication factor (hot $K_{eff}$) at the high temperature operation period and for reducing the effective multiplication factor (cold $K_{eff}$) at the low temperature operation period (i.e. attaining large shut-down margin), but these effects are slightly less than those attained by the embodiment shown in FIG. 15.

Figure 17:
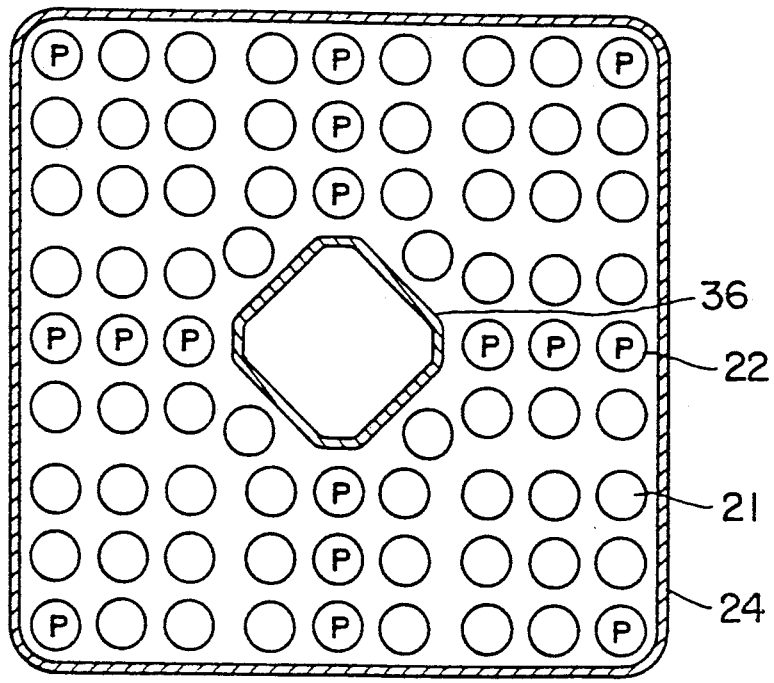

FIG. 17 is a plan view of the fifteenth embodiment according to this invention, which is a modification of the embodiment shown in FIG. 16 and in which a water rod 36 square in cross section having a size larger than that of the embodiment shown in FIG. 16 is arranged at the center portion of the fuel bundle and four additional fuel rods are arranged one by one at portions opposing to the respective sides of the square water rod 36. The fuel assembly of this invention includes sixteen fuel rods P with the interposed members and sixty usual fuel rods 21. According to this arrangement, since the centrally arranged square water rod 36 has a large size, the shut-down margin larger than that of the former embodiment can be attained.

FIG. 18 is a plan view of the sixteenth embodiment according to this invention, which is a modification of the embodiment shown in FIG. 15 and in which a round water rod 37 having a large diameter and a cruciform wide water gap are offset with respect to the fuel bundles. This embodiment is effectively applicable to a reactor core in which widths of the water gaps are arranged at the outer periphery of the fuel assembly (usually called BWR-D lattice type reactor core). In the reactor core of this type, it is desired that a central tie rod for control rods arranged in cross shape is located on a left upper side as viewed in FIG. 18. Namely, it is desired to locate many fuel rods on the side of the wide water gap. The fuel assembly of this embodiment includes fourteen fuel rods P with the interposed members and sixty-three usual fuel rods 21.

Figure 19:
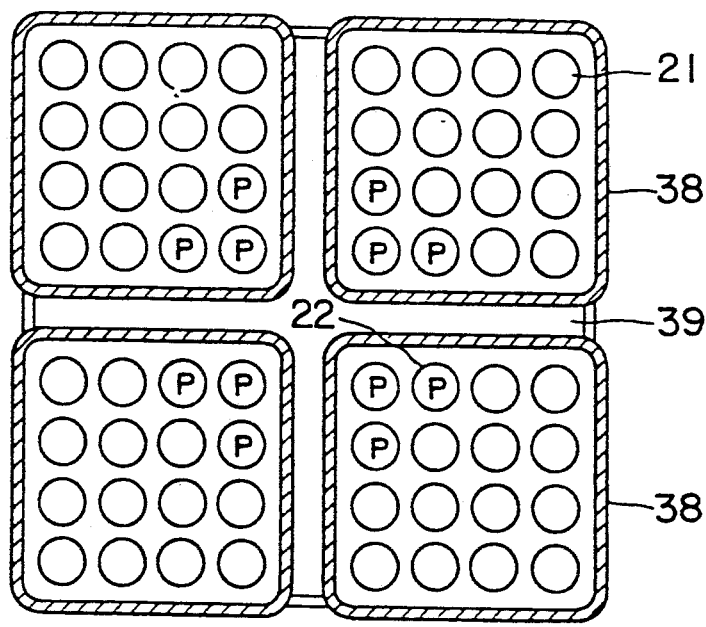

FIG. 19 is a plan view of the seventeenth embodiment according to this invention, in which four sub-bundles are arranged. Between the respective sub-bundles is defined a cross shaped gap 39 as non-boiling moderating water area. The fuel rods P with the interposed members are disposed in a bundle at the central corner portions of the respective sub-bundles and the fuel bundle totally includes twelve fuel rods P with the interposed members and fifty-two usual fuel rods 21. This embodiment attains effects for increasing the effective multiplication factor at the high temperature operation period and reducing the effective multiplication factor at the low temperature operation period (i.e. large shutdown margin).

Figure 20:
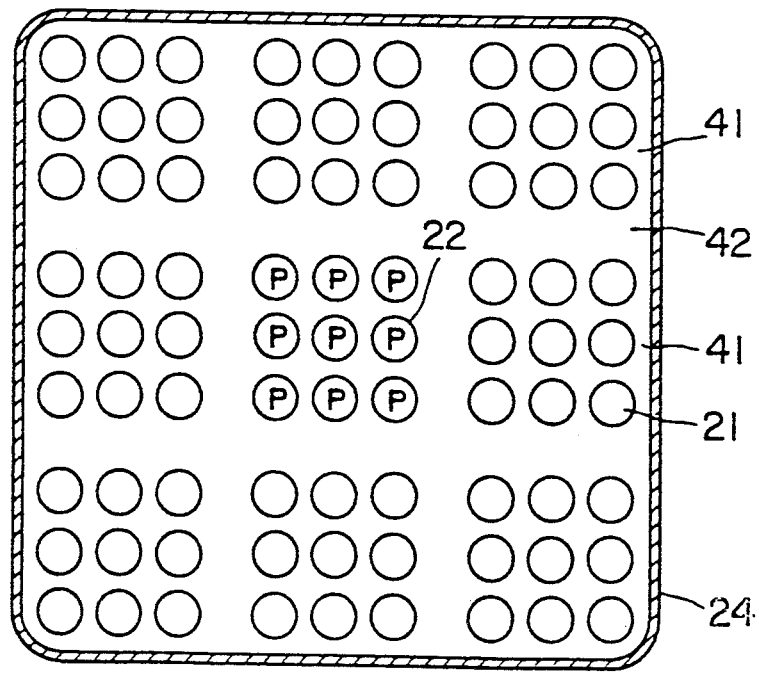

FIG. 20 is a plan view of the eighteenth embodiment according to this invention, which is constructed by nine sub-bundles 41 each comprising nine fuel rods 21. The respective sub-bundles 41 are separated by gaps 42 each having relatively wide width. The sub-bundle centrally arranged in this fuel assembly all comprises nine fuel rods P with the interposed members, and accordingly, the fuel bundle of this embodiment includes nine fuel rods P with the interposed members and seventy-two usual fuel rods 21. According to the arrangement of this embodiment, the effects substantially identical to those attained by the former embodiment can be also attained.

Figure 21A:
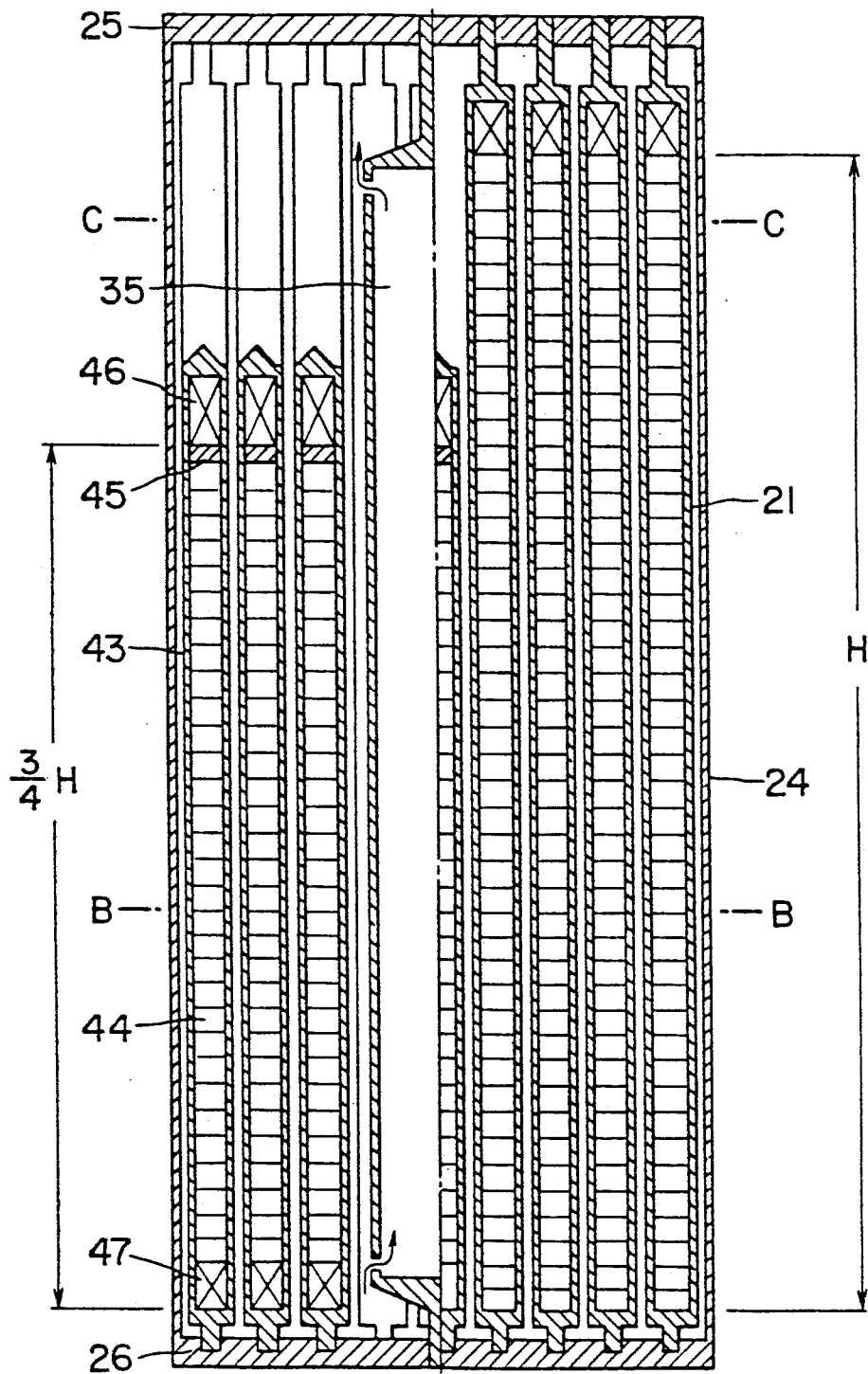
FIG. 21A is an elevational section of the fuel assembly of the nineteenth embodiment and FIGS. 21B and 21C are cross sectional views taken along the lines B-B and C-C respectively shown in FIG. 21A.
Figure 21B:
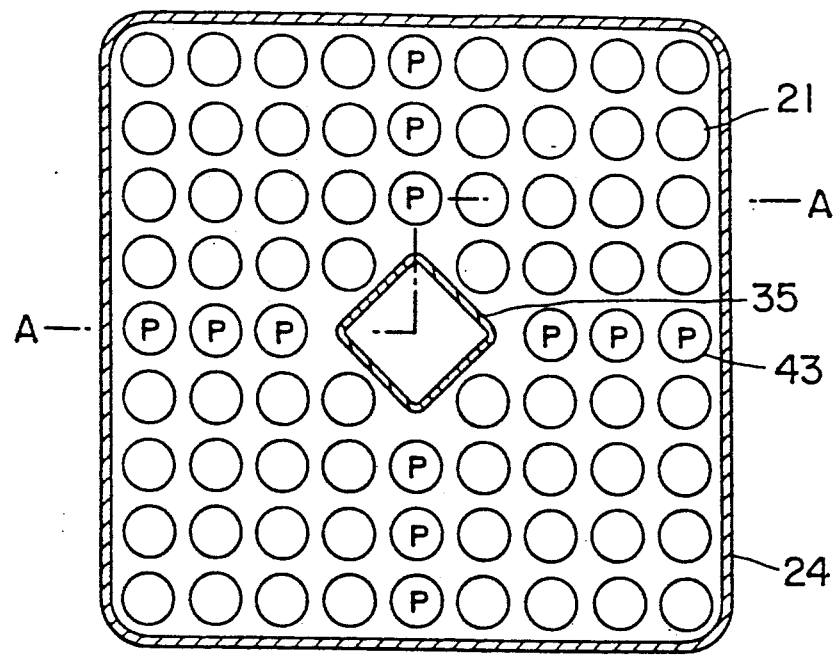
Figure 21C:
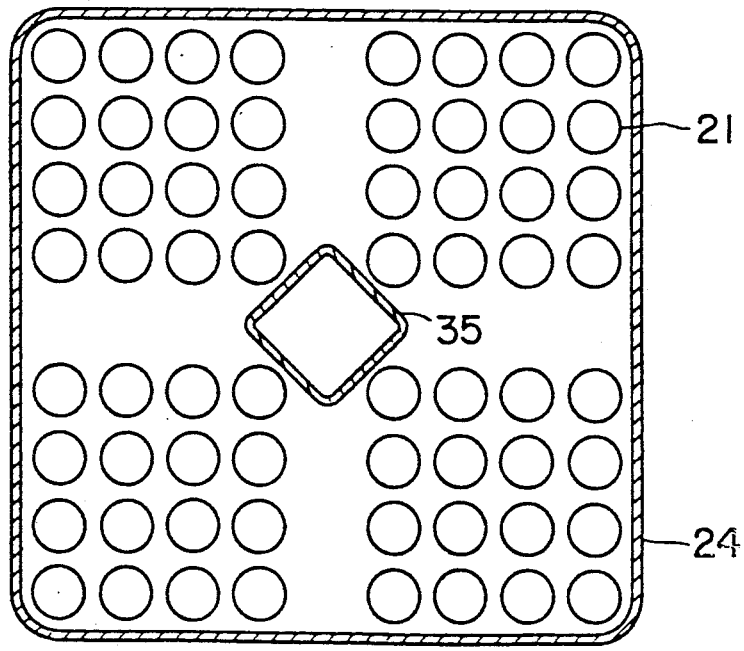
Figure 76:
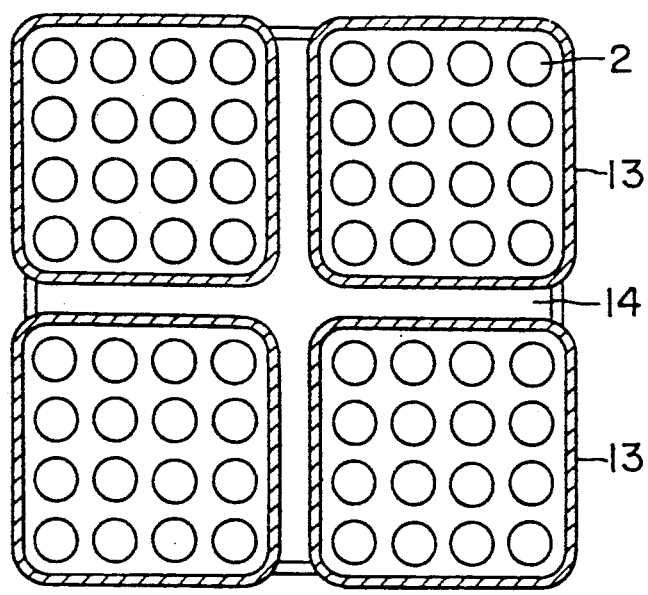
Figure 77:
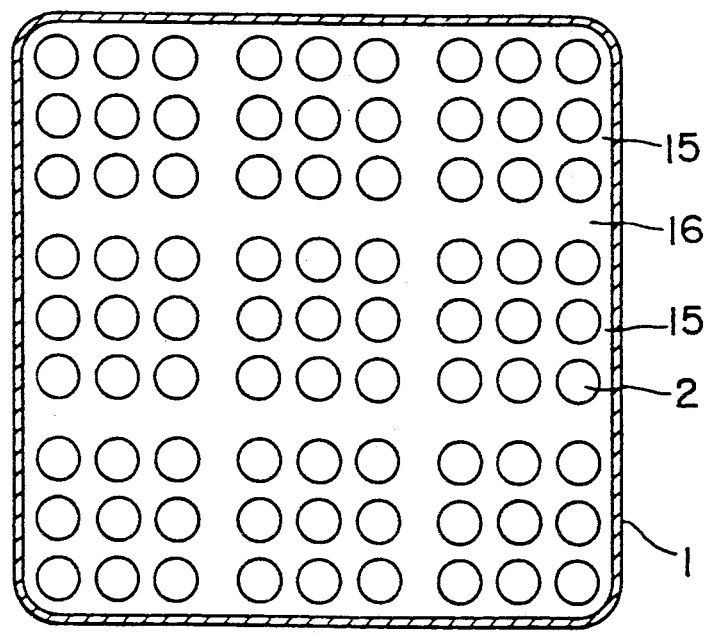

FIG. 21 represents the nineteenth embodiment according to this invention, in which FIG. 21A is an elevational section taken along the line A-A shown in FIG. 21B and FIGS. 21B and 21C are cross sectional views taken along the lines B-B and C-C shown in FIG. 21A.

The fuel assembly of this embodiment includes a square water rod 35 arranged in the central portion thereof and long fuel rod 21 and short fuel rod 43 (denoted by letter P in figures hereinafter) are regularly arranged in nine row and nine lines except for the central portion in which the square water rod 35 is located. The outer periphery of the fuel rods 21 and 43 is surrounded by a channel box 24 and the upper and lower ends of these fuel rods are secured by means of the upper and lower tie plates 25 and 26, respectively. Each short fuel rod 43 contains a stack (fuel pellets) 44, and an upper plenum 46 is disposed above the top portion of the stack 44 through an output power spike suppressing member 45 and a lower plenum 47 is disposed at the bottom of the stack 44.

With the embodiment of this type, the output power is liable to be increased locally at a portion within about 5 cm, particularly 1 cm, above the location of the top fuel pellet contained in the short fuel rod 43, so that, in order to prevent the occurrence of this phenomenon, the output power spike suppressing member 45 is disposed above the top of the stack 44. The output power spike suppressing member 45 is for example constructed by a depleted uranium pellet, natural uranium pellet or annular pellet having a length of 0.5 to 5 cm, usually 1 to 2 cm, with a burnable poison contained in the central portion thereof (i.e. $Gd_2O_3$—$UO_2$, $Gd_2O_3$—$ZrO_2$, $Gd_2O_3$—$Al_2O_3$, $HfO_2$—$Yb_2O_3$, $HfO_2$—$Dy_2O_3$ and the like) or pellet of non-burnable material (i.e. $ZrO_2$, $ZrO_2$—$GdO_3$, $Al_2O_3$, $Al_2O_3$—$Gd_2O_3$, $HfO_2$—$Yb_2O_3$, $HfO_2$—$Dy_2O_3$ and the like).

A gentle power increasing may be caused for a long fuel rod 21 adjacent to a vanishing rod portion disposed at the upper portion of the short fuel rod. In such a case, usually, there may be substantially no need for specific procedure for this phenomenon, but with a fuel assembly in future in which the fuel enrichment will be increased, such power increasing will be treated by slightly lowering the enrichment or inserting an annular fuel pellet with $Gd_2O_3$ contained in the central portion thereof on the basis of the known technique.

Figure 22A:
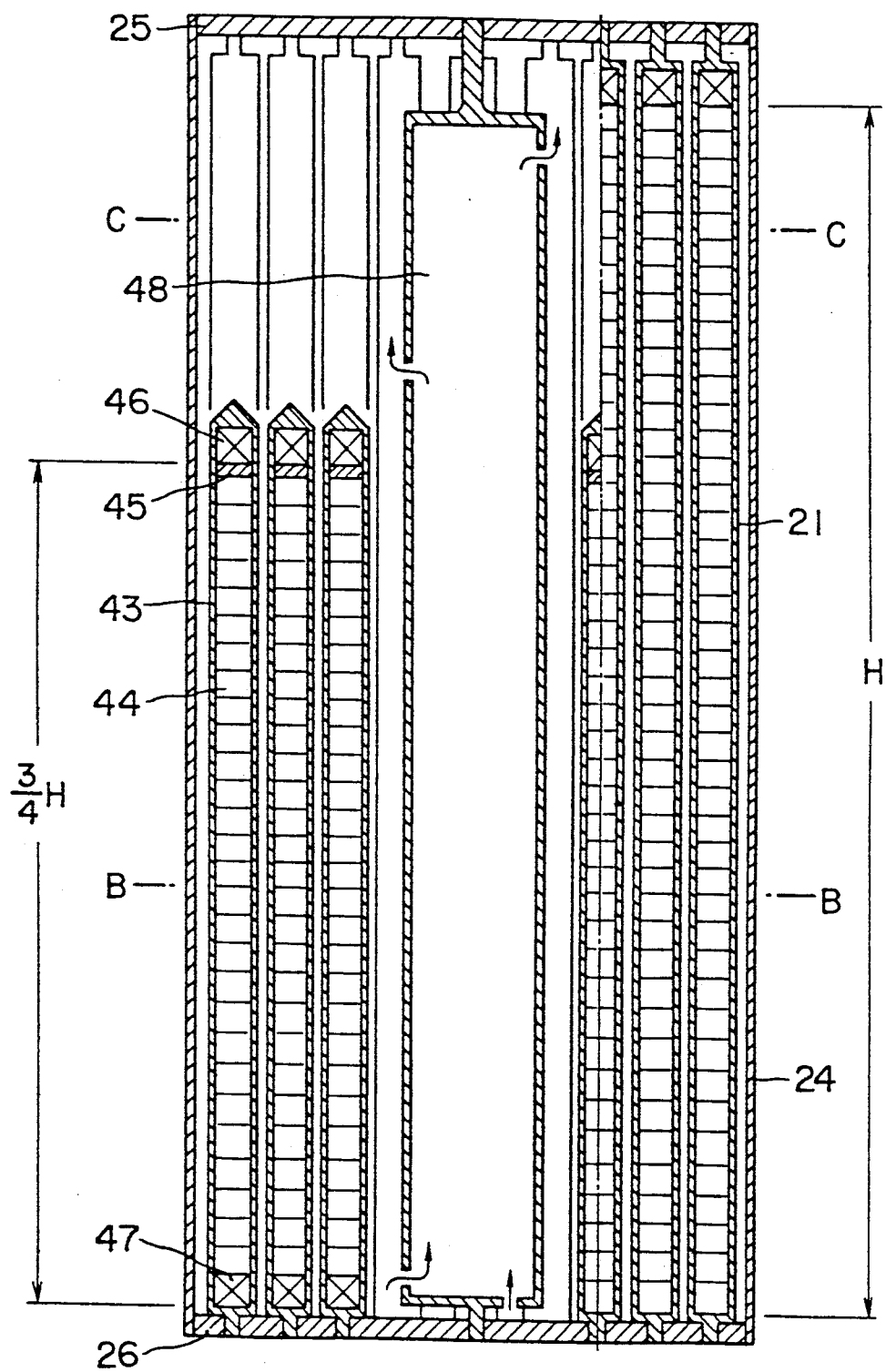
FIG. 22A is an elevational section of the fuel assembly of the twentieth embodiment and FIGS. 22B and 22C are cross sectional views taken along the lines B-B and C-C respectively shown in FIG. 22A.
Figure 22B:
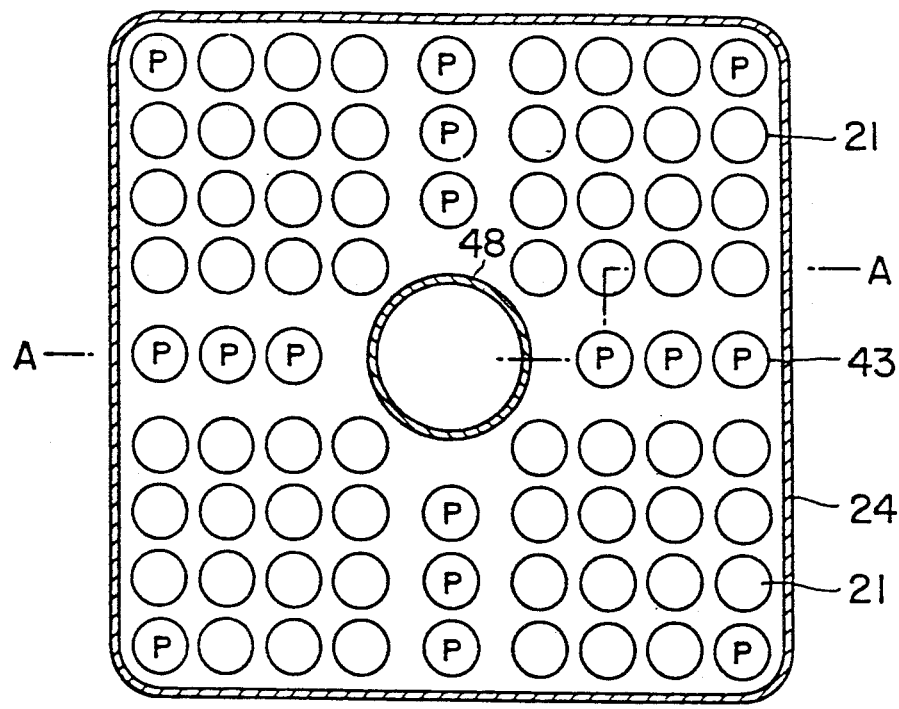
Figure 22C:
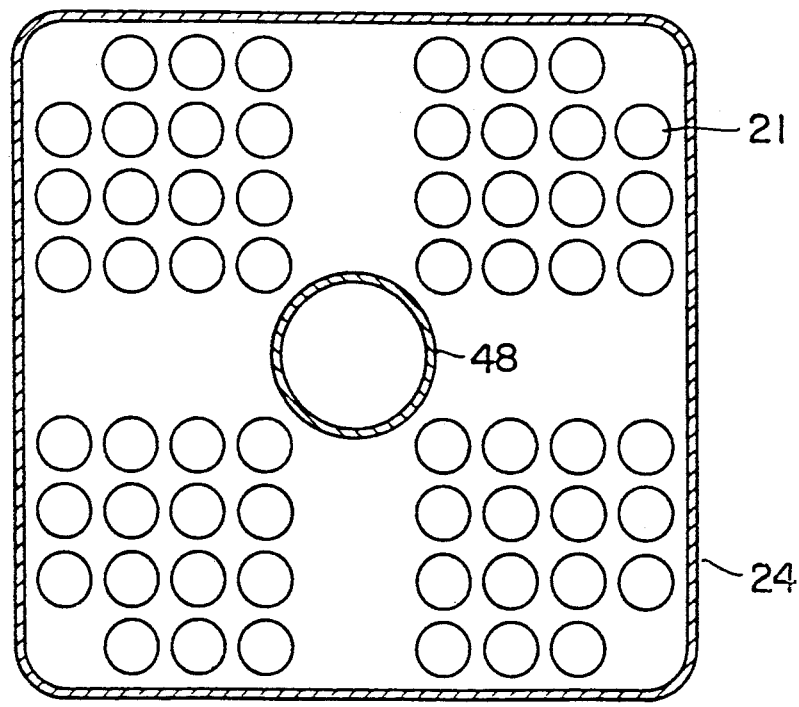

FIG. 22 represents the twentieth embodiment according to this invention, in which FIG. 22A shows an elevational section taken along the line A-A shown in FIG. 22B and FIGS. 22B and 22C are cross sectional views taken along the lines B-B and C-C shown in FIG. 22A, respectively.

As shown in FIG. 22B, this embodiment includes four short fuel rod groups each comprising three fuel rods P and arranged in cruciform with a water rod 48 having a large diameter arranged at the central portion of the cross-shaped short fuel rods P. The short fuel rods P are also arranged at the respective corners of the square fuel bundle, but in this embodiment these fuel rods are not necessarily made to be short fuel rods P. However, there is such a tendency as that the coolant concentrates in the vanishing zone in a certain case, and in such a case, the cooling ability of the coolants at the corner portions may be made insufficient. Taking into consideration such matter, if the short fuel rods P are arranged at the respective corner portions of the fuel bundle, such problem will be effectively obviated. The fuel bundle of this embodiment includes sixteen short fuel rods P and sixty usual fuel rods 21. According to this embodiment, the gap width of the vanishing zone is made wide in comparison with the nineteenth embodiment, so that the increased effects can be attained even with the use of the same amount of the fuel.

Figure 23:
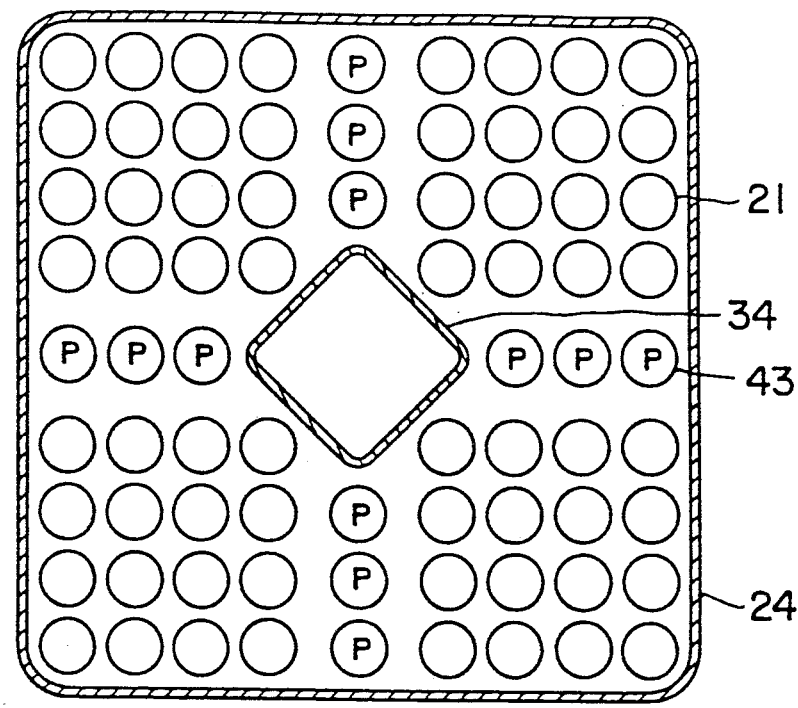
FIGS. 23 and 24 are cross sections of the twenty-first and twenty-second embodiments according to this invention.

FIG. 23 is a plan view of the twenty-first embodiment according to this invention, which includes the short fuel rods P having four groups each comprising three short fuel rods P in cruciform with a square water rod 34 arranged centrally in the crossing short fuel rods P. This embodiment includes twelve short fuel rods P and sixty-four usual fuel rods 21. According to this embodiment, the size of the centrally arranged square water rod may be made further large, and since the concentrating characteristics of the coolant towards the neighborhood of the central water rod are small in comparison with the embodiment shown in FIG. 22, the short fuel rods P are not used for corner rods.

Figure 24:
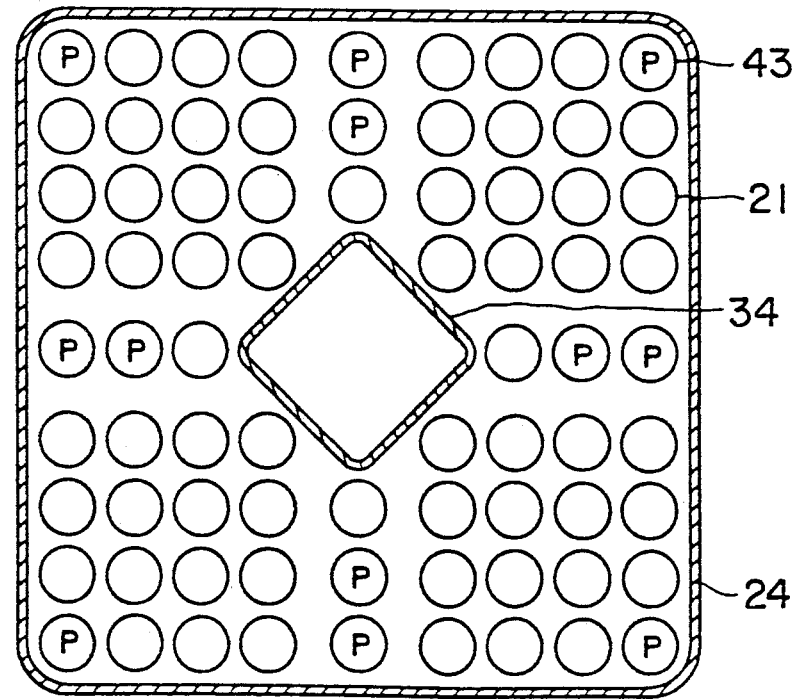

FIG. 24 is a plan view of the fuel assembly of the twenty-second embodiment according to this invention, which is a modification of the embodiment shown in FIG. 21. In this embodiment shown in FIG. 24, two outer fuel rods of the respective groups of the short fuel rods P arranged in cruciform are constructed a the short fuel rods P and four corner fuel rods are substituted with the four short fuel rods P, respectively in comparison with the embodiment shown in FIG. 23. The fuel assembly of this embodiment thus includes twelve short fuel rods P and sixty-four usual fuel rods 21.

Figure 25D:
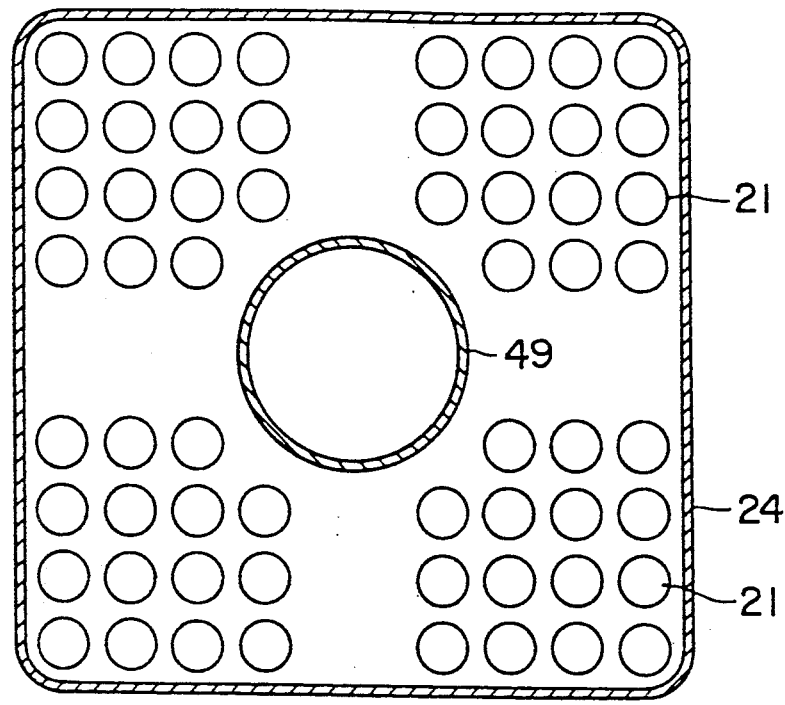

FIG. 25 represents the twenty-third embodiment according to this invention, in which FIG. 25A shows an elevational section taken along the line A-A shown in FIG. 25B and FIGS. 25B, 25C and 25D are cross sectional views taken along the lines B-B, C-C and D-D respectively shown in FIG. 25A.

This embodiment is a modification of the embodiment shown in FIG. 24, in which the centrally arranged water rod 49 is constructed by portions having diameters different in the axial direction, and for the provision of the different diameter portions, two types of short fuel rods P different in their axial lengths are used. Namely, in this embodiment, as shown in FIG. 25B, the fuel assembly includes four groups of the short fuel rods 43 (denoted as P1 in the illustration) each comprising three fuel rods P1 in cruciform with a water rod 49 having a large diameter arranged at the central portion of the cruciform short fuel rods P1 to thereby divide the interior of the fuel assembly into four sub-bundles. Gaps are defined between the respective sub-bundles and the groups of the short fuel rods P1. Four short fuel rods 51 (denoted as P2 in the illustrated embodiment) each having a length further shorter than that of the short fuel rod P1 are located at the inner corner portions of the respective sub-bundles facing the peripheral surface of the central water rod 49. An upper plenum 52 and a lower plenum 53 are also arranged at the upper and lower portions of each further short fuel rod P2, and an output power spike suppressing member 54 is inserted into the top portion of the pellets contained in the further short fuel rod P2. Accordingly, with the fuel assembly of this embodiment, the coolant has an occupation gradually increasing towards the upper portion thereof. This embodiment includes twelve short fuel rods P1, four further short fuel rods P2 and sixty usual fuel rods 21.

Figure 26:
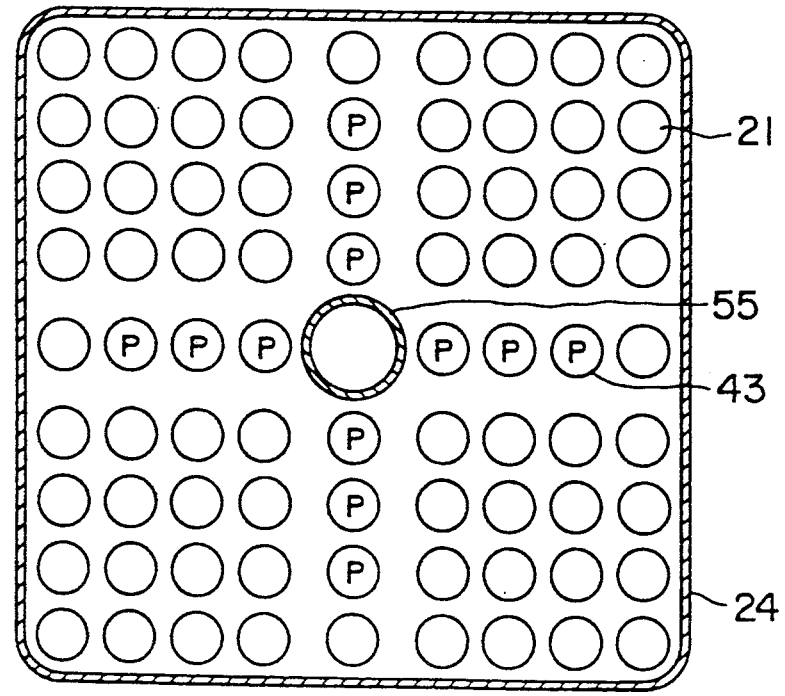

FIG. 26 is a plan view of the twenty-fourth embodiment according to this embodiment, in which four groups of fuel rods each comprising three short fuel rods P1 and one fuel rod 21 are arranged in cruciform with a water rod 55 having a diameter slightly larger than that of the fuel rod arranged at the central portion of the crossing fuel rods, thus dividing the interior of the fuel bundle into four sub-bundles. This fuel bundle thus includes twelve short fuel rods P and sixty-eight usual fuel rods 21.

Figure 27:
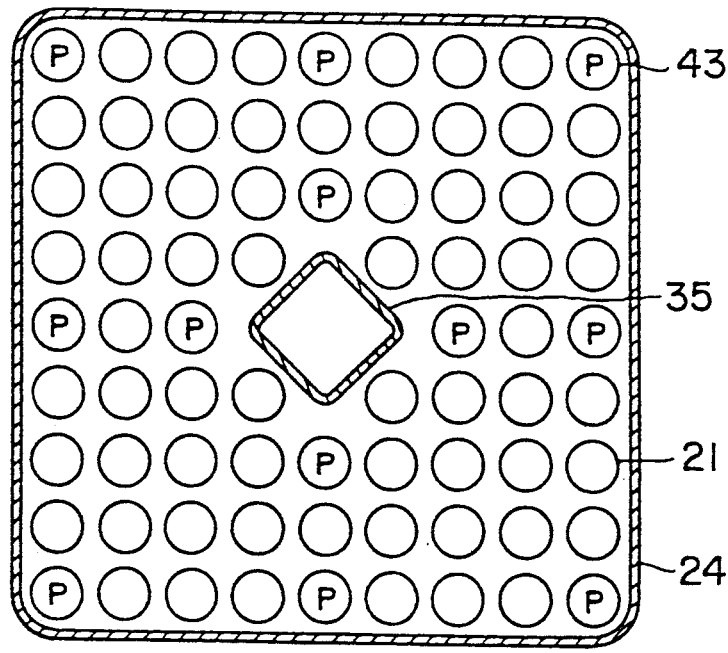

FIG. 27 is a plan view of the twenty-fifth embodiment according to this invention, which is a modification of the embodiment shown in FIG. 21 and in which four fuel rods P each positioned at the central portion of each group of three short fuel rods P are substituted with the fuel rods positioned at the respective corner portions of the fuel bundle. This embodiment thus includes twelve short fuel rods P and sixty-four usual fuel rods 21. This embodiment may have a degradation in the improvement of the shut-down margin, but can attain the improved effective multiplication factor $K_{eff}$ at the power operation period because the output powers of the fuel rods placed between the short fuel rods P in the respective groups are relatively high.

Figure 28:
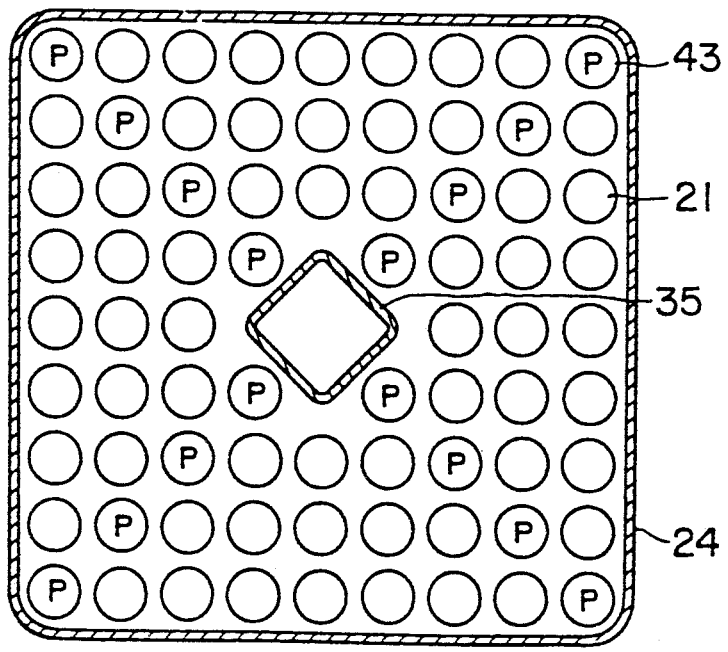

FIG. 28 is a plan view of the twenty-sixth embodiment according to this invention, in which short fuel rods P are diagonally arranged in cruciform with a water rod 35 square in cross section arranged at the center of the cruciform. The fuel assembly of this embodiment includes sixteen short fuel rods P and sixty usual fuel rods 21 and attains substantially the identical effect to that attained by the embodiment shown in FIG. 21.

FIG. 29 is a plan view of the twenty-seventh embodiment according to this invention, in which two water rods 38 each of which has a small diameter, but not large diameter, as used in the conventional fuel assembly are arranged and the short fuel rods P are also arranged in cruciform. This fuel assembly includes thirteen short fuel rods P and forty-nine usual fuel rods 21.

FIG. 30 is a plan view of the twenty-eighth embodiment according to this invention, in which, as shown in FIG. 29, two water rods 38 each having a small diameter are arranged and the short fuel rods P are also arranged diagonally. This embodiment includes fourteen short fuel rods P and forty-eight usual fuel rods 21.

Figure 31:
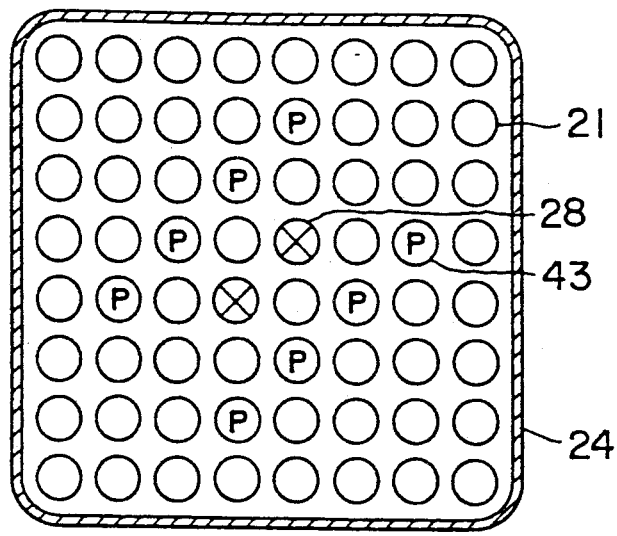

FIG. 31 is a plan view of the twenty-ninth embodiment according to this embodiment, in which two water rods 28, as represented by the embodiment shown in FIG. 11, each having a small diameter are arranged and two rows of short fuel rods P are arranged in parallel to one diagonal line. This embodiment includes eight short fuel rods P and fifty-four usual fuel rods 21.

Figure 32:
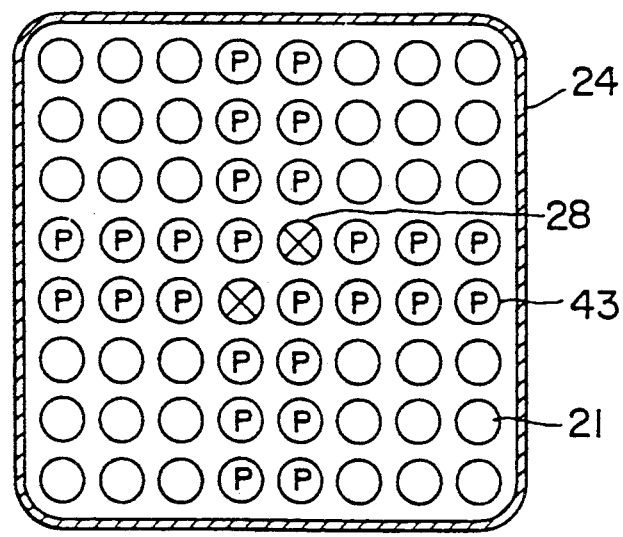

FIG. 32 is a plan view of the thirtieth embodiment according to this invention, in which two water rods 28 each having a small diameter are arranged and the short fuel rods P are arranged in double-cross shape. This embodiment includes twenty-six short fuel rods P and thirty-six usual fuel rods 21. The fuel assembly of this embodiment comprises, at the height of the vanishing zone, substantially four units of 3×3 (three rows and three lines) sub-bundles for attaining large shut-down margin.

FIG. 33 is a plan view of the thirty-first embodiment according to this invention, in which a water rod 29 having a large diameter and a size corresponding to four fuel rods in a bundle centrally arranged in the embodiment shown in FIG. 32 and the short fuel rods P arranged on the side of the channel box in FIG. 32 are substituted with the fuel rods each having a normal axial length. This embodiment includes sixteen short fuel rods P and forty-four usual fuel rods 21.

FIG. 34 is a plan view of the thirty-second embodiment according to this invention, which is obtained by applying the embodiment shown in FIG. 28 to 8×8 (eight lines and eight rows) fuel assembly, and in which a square water rod 56 having a size corresponding to four fuel rods in a bundle is arranged centrally in that embodiment. This fuel assembly includes twelve short fuel rods P and forty-eight usual fuel rods 21.

Figure 35:
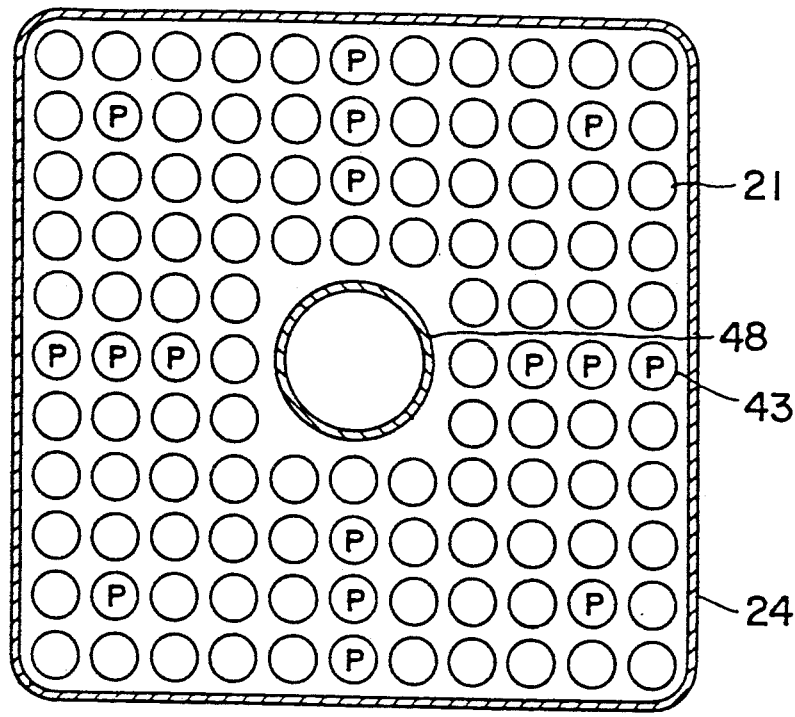

FIG. 35 is a plan view of the thirty-third embodiment according to this invention, which includes fuel rods arranged in nine rows and nine lines and a water rod 48 having a large diameter and a size corresponding to nine fuel rods in a bundle and being arranged at the central portion of the fuel assembly. The short fuel rods P are also arranged in cruciform with the water rod 48 arranged centrally and the short fuel rods P are further located at (2,2) portions (intersecting portions of second row and second lines) from the outer sides of the fuel bundle. According to this arrangement, the pressure-loss resistance at the upper portions of the (2,2) positions of the short fuel rods P is reduced and further improved the shutdown margin. The fuel assembly of this embodiment includes sixteen short fuel rods P and ninety-six usual fuel rods 21.

Figure 36:
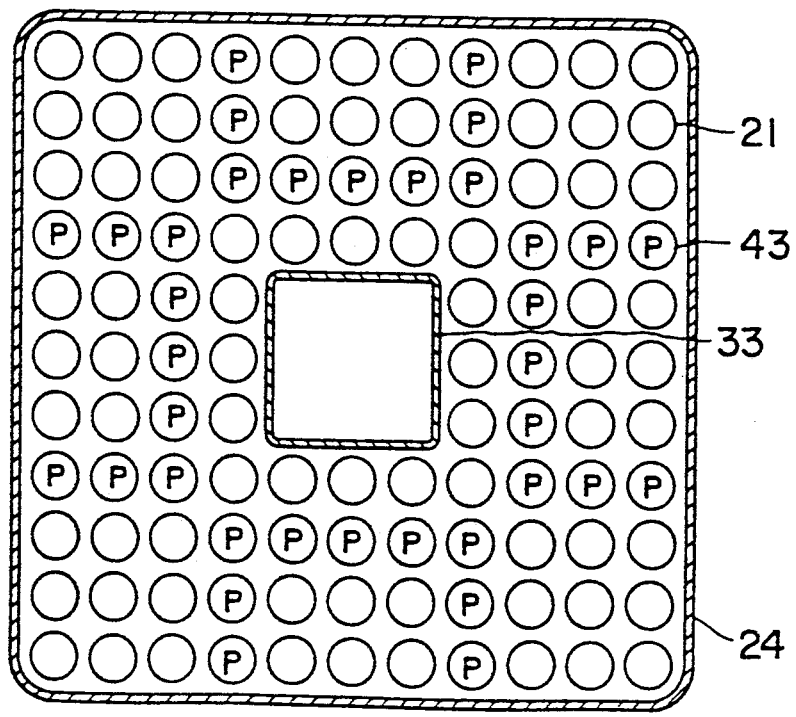

FIG. 36 is a plan view of the thirty-fourth embodiment according to this invention, which includes fuel rods arranged in nine rows and nine lines with a water rod 33 square in cross section having a size corresponding to nine fuel rods in a bundle and arranged at the central portion of the fuel assembly. The interior of this fuel bundle is divided into nine sub-bundles by arranging thirty-six short fuel rods P in a manner as shown. The bundle in the vanishing zone at the upper portion of the fuel assembly is divided into a plurality of small bundles so as to attain the further improved effects.

Figure 37:
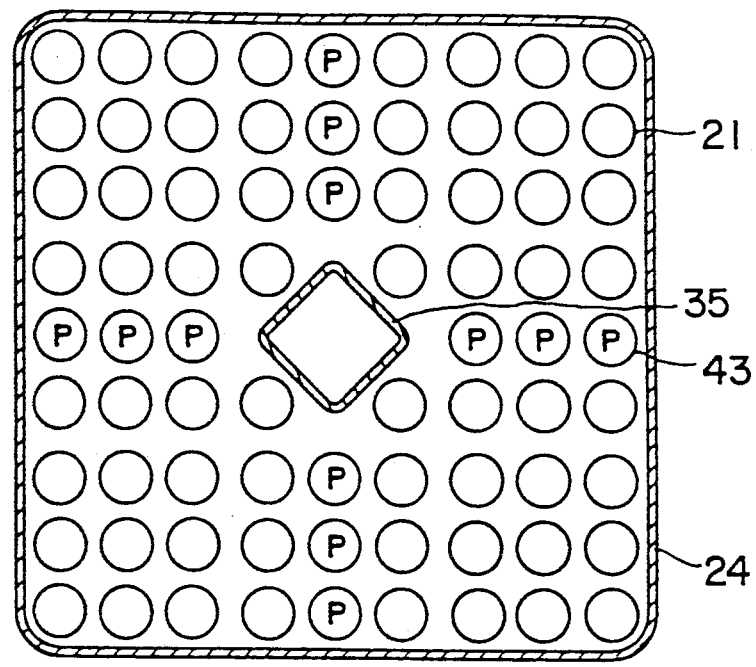

FIG. 37 is a plan view of the thirty-fifth embodiment according to this invention, which is a type in combination of the embodiments illustrated in FIGS. 21 and 22. Namely, a water rod 35 square in cross section having a size corresponding to four fuel rods in a bundle is disposed at the central portion of the fuel assembly with an inclination of 45° with respect to the fuel bundle and the fuel assembly is divided into nine sub-bundles separated respectively by gaps each having relatively wide width. Twelve short fuel rods P are arranged in cruciform at the central portion of the fuel bundle, and this embodiment also includes sixty-four usual fuel rods 21. The water rod of this embodiment may be made slightly smaller in size.

Figure 38:
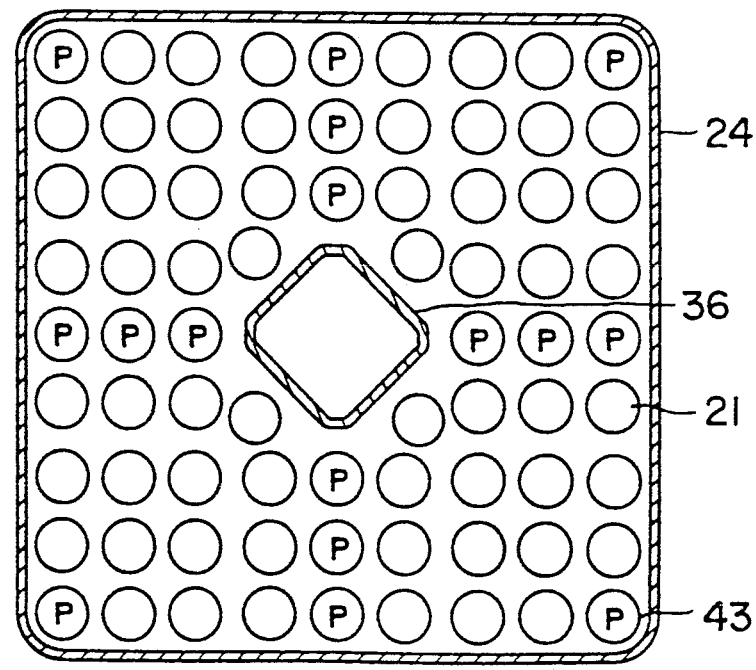

FIG. 38 is a plan view of the thirty-sixth embodiment according to this invention, which is an improved modification of the embodiment shown in FIG. 37. Namely, as shown, a square water rod 36 has a size slightly larger than that of the embodiment shown in FIG. 37, and further one fuel rod is disposed at a portion facing the side surface of the water rod 36. The fuel rods located at the respective outside corners are substituted with the short fuel rods P, and accordingly, the fuel assembly of this embodiment includes sixteen short fuel rods P and sixty usual fuel rods 21. According to this embodiment, since the centrally arranged square water rod 36 has a size larger than that of the former embodiment, the shut-down margin is made larger than that of the former embodiment.

FIG. 39 is a plan view of the thirty-seventh embodiment according to this invention, which is a modification of the embodiment shown in FIG. 29 and in which water gap defined between a water rod 37 having a large diameter and a sub-bundle is offset with respect to the fuel bundle. Accordingly, this embodiment is effectively applicable to a reactor core in which the widths of the water gaps at the outer periphery of the fuel assembly are different (usually called BWR=D lattice type reactor core). This fuel assembly is arranged in the reactor core so that the gaps on the left side and the upper side, as viewed, have wide widths, whereby the output power distribution is made flat and further improved effects can be attained. This embodiment includes fourteen short fuel rods P and sixty-three usual fuel rods 21.

FIG. 40 is a plan view of the thirty-eighth embodiment according to this invention, which is of the type applicable to a conventional fuel assembly. Namely, the fuel assembly of this embodiment comprises four sub-bundles 38 which are separated from each other by a cruciform gap 39 which is defined as a non-boiling moderating water zone. The fuel assembly includes twelve short fuel rods P which are arranged in a bundle at the corner portions facing the central crossing portion of the gap 39 of the respective sub-bundles and fifty-two usual fuel rods 21.

FIG. 41 is a plan view of the thirty-ninth embodiment according to this invention, which is of the type applicable to a conventional fuel assembly. Namely, the fuel assembly of this embodiment includes nine sub-bundles 41 each comprising nine fuel rods and separated from each other by gaps 42 each having a relatively wide width. One sub-bundle arranged at the central portion of the fuel assembly comprises nine short fuel rods P and the other sub-bundles totally comprise seventy-two usual fuel rods 21.

FIG. 42 is a plan view of the fortieth embodiment according to this invention, which includes two water rods 57 (A, B) having the same sizes, each corresponding to four fuel rods in a bundle and five fuel rods 22 (denoted as P in the illustrated embodiments hereinafter) provided with interposed members inserted therein respectively and disposed between the water rods A and B. The usual fuel rods 21 are arranged in the interior of the fuel assembly in nine rows and nine lines except the central locations of the water rods A and B and the five fuel rods P with the interposed members. Accordingly, the fuel assembly of this embodiment includes two water rods 57, five fuel rods 22 with the interposed members and sixty-eight usual fuel rods 21, and as a whole, the fuel assembly of this embodiment has a symmetrical arrangement with respect to the diagonal line connecting the upper left corner and the lower right corner as viewed in FIG. 42. In addition, according to this embodiment, the interposed members are inserted into the respective fuel rods P at portions each including the neighborhood of a portion having the height of $\frac{2}{3}$H (H being the effective axial length of the reactor core) at which the maintenance of the shut-down margin is made difficult. As shown by dotted lines, a wide zone including the interposed member existing area at this height ($\frac{2}{3}$H) portion is located, this zone ranging between two water rods A and B each having a large diameter, thus improving the shut-down margin. Fuel rods denoted by letters Q and q surrounding the water rods A and B are usual ones, but the fuel rods Q have surface areas facing the water rods A and B larger than the surface areas of the fuel rods q, so that the fuel rods Q much contribute to the reactivity of the water rods A and B, than the fuel rods q. In addition, the thermal neutron fluxes in the fuel rods Q and q at the portions corresponding to the portions at which the interposed material is inserted into the fuel rods P are made high and hence the reactivity attained by the fuel rods is increased. Accordingly, the thermal neutron fluxes of the fuel rods Q and the fuel rods P at portions except the portions of the height corresponding to the location of the interposed members is inserted into the fuel rods P. Therefore, at these portions, the effective multiplication factor $K_{eff}$ will be intentionally increased or decreased.

With this embodiment shown in FIG. 42, the short fuel rods of the type described hereinbefore will be substituted for the fuel rods 22 with the interposed members, and in such substituted arrangement, vanishing rods may be disposed at portions at which the maintenance of the shut-down margin is made difficult.

FIG. 43 is a plan view of the forty-first embodiment according to this invention, in which, in comparison with the arrangement of the former embodiment shown in FIG. 42, one water rod A is shifted rightwardly, as viewed, by one line and the other water rod B is shifted downwardly, as viewed, by one row, and two fuel rods P with the interposed members are disposed between these water rods A and B. The fuel assembly of this embodiment thus includes two water rods each having a large diameter, two fuel rods P with the interposed members, and seventy-one usual fuel rods 21. The small shut-down margin zone at the upper portion of the reactor core is made large as shown by the dotted line in comparison with the former embodiment shown in FIG. 42. This embodiment may be effectively applicable to the reactor core in which the water gap widths at the outer periphery of the fuel assembly are different (usually called BWR-D lattice type reactor core)

FIG. 44 is a plan view of the forty-second embodiment according to this invention, in which two groups A and B of water rods 28 (each denoted by letter W in the illustrated embodiment) each having a small diameter are arranged in triangular shapes respectively, and five fuel rods P with the interposed members are arranged between the respective water rod groups A and B. The usual fuel rods 21 are regularly arranged in nine lines and nine rows except the portions at which the water rods and the fuel rods P with the interposed members are located. The fuel assembly of this embodiment thus includes two water rod groups containing six water rods W each having a small diameter, five fuel rods P with the interposed members and the usual fuel rods 21. One water rod having a triangular outer configuration may be utilized instead of one group of three annular water rods.

With this embodiment, the interposed members inserted into the fuel rods P are positioned at the axial height of about $\frac{2}{3}$H (H being substantial effective axial height of the reactor core) at which the maintenance of the shut-down margin is made difficult and the water rod zone extending in a direction having an inclination of 45° is formed. The interposed member of one fuel rod P is designed so as to have an axial length of about ⅓H, so that the reduction of the fuel inventory due to the location of the fuel rods P with the interposed members will merely correspond to 1.25 number of fuel rods and hence as a whole assembly, to 7.25 number of fuel rods. The fuel inventory of this embodiment is made to be large in comparison with the usual case in which about nine fuel rods are charged for the fuel inventory.

FIG. 45 is a plan view of the forty-third embodiment according to this invention, which is an improvement of the embodiment shown in FIG. 44 for intending to make the further large shut-down margin. The fuel assembly of this embodiment includes two groups A and B of water rods W each comprising three water rods 28 each having a small diameter and each having a triangular shape, three fuel rods 58 (denoted by letter P1 in the illustrated embodiment) disposed between the water rod groups A and B, and eight fuel rods 59 (denoted by letter P2) are arranged in cruciform on the outer side of the square zone constituted by the two water rod groups A and B and the three fuel rods P1. The usual fuel rods 21 are also arranged in nine lines and nine rows except the location of the water rod groups and the fuel rods P1 and P2. Thus, the fuel assembly of this invention includes six water rods W each having a small diameter, eleven fuel rods P (comprising three fuel rods P1 and eight fuel rods P2) and sixty-four usual fuel rods 21. The fuel rods P1 are provided with the interposed members each positioned at the portion having a height of about ⅓H of the reactor core at which the maintenance of the shut-down margin is made difficult. The fuel rods P1 may be substituted with the short fuel rods referred to hereinbefore above which the vanishing rods are arranged. The fuel rods P2 are of the character substantially the same as that of the fuel rods P1, but each has the effective fuel length longer than that of the latter P1.

According to this embodiment, the fuel rods 58 and the water rods 28 function as a large water rod as shown by dotted line at the high temperature operation period of the reactor core, whereby the effective multiplication factor $K_{eff}$ is increased, and the reactivity at the upper portion Of the reactor core is improved, the distribution in the output lower axis direction also being improved. On the other hand, under the cold operation condition, the large water rod is of the excessive water condition, so that the subcriticality is improved and the fuel rods P2 serve to increase that effect.

FIG. 46 is a plan view of the forty-fourth embodiment according to this invention, which is similar to the embodiment shown in FIG. 45, but is different in that four water rods 28 (W) each having a small diameter are arranged separately as water rod zones A, B, C and D, and five fuel rods 58(P1) are disposed between these four water rods W at the central portion of the fuel assembly. Accordingly, the non-fuel area, formed by the water rods and the fuel rods with interposed members, occupies the area corresponding to nine fuel rods at the upper portion of the reactor core. The fuel rods 59(P2) are arranged in cruciform for further improving the effects. The fuel assembly of this embodiment thus includes four water rods 28 each having a small diameter, thirteen fuel rods P (comprising five fuel rods P1 and eight fuel rods P2), and sixty-four usual fuel rods 21.

FIG. 47 is a plan view of the forty-fifth embodiment according to this invention, which is generally constructed by nine sub-bundles each including 3×3 (three lines and three rows) fuel rods, and water gaps 61 each having a relatively wide width are defined between the respective sub-bundles. Two water rods 57 (denoted by letters A and B) each having a large diameter are disposed at the crossing portions of the water gaps 61 as shown in FIG. 47, and five fuel rods 22 (denoted by letter P) are disposed between the respective water rods A and B. As described above according to this embodiment, since the water rods A and B are disposed at the relatively large water gap zones, the water rods can be designed as relatively large ones comparatively of the reduced amount of the fuel inventory and the concentration of cooling water which is usually liable to be concentrated to these portions will be effectively suppressed by the location of the large water rods. Accordingly, the water rods A and B form at the upper portion of the reactor core a wide non-fuel area, referred to hereinbefore, through the fuel rods 22 with the interposed members. Flow control members (FC) 62 each having a small diameter are also provided in this fuel assembly at the other water gap crossing portions normal to those at which the water rods A and B are arranged to suppress the concentrated flow of the cooling water to these portions. The large water rods A and B also serve to control the flow of the cooling water. Each flow control members 62 usually have fine diameter holes so that the cooling water can flow in the arrowed directions. The fuel assembly thus includes two large water rods 57, five fuel rods P with the interposed members, sixty-eight usual fuel rods 21, and two FCs 62.

FIG. 48 is a plan view of the forty-sixth embodiment according to this invention, which is constructed by nine sub-bundles (each 3×3 fuel rods) as referred to with respect to the former embodiment shown in FIG. 47. Water gaps 61 each having a slightly wide width are defined between the respective sub-bundles, but the large water rods A and B are arranged more closely than those shown in FIG. 47 and mutually connected by a water rod connecting member also commonly serving as flow control fin 63 at the several axial portions. The flow control fin 63 serves to force back the cooling water which is liable to be concentrated to the central portion of the fuel assembly. The upper portion of the reactor core above the portion enclosed by dotted lines constitutes no fuel area. The respective three fuel rods 22 each provided with an inserted member are arranged along the lengthwise directions of the flow control fin 63. The fuel assembly of this embodiment thus includes two large water rods 57, six fuel rods with the interposed members, and sixty-eight usual fuel rods 21.

Figure 49:
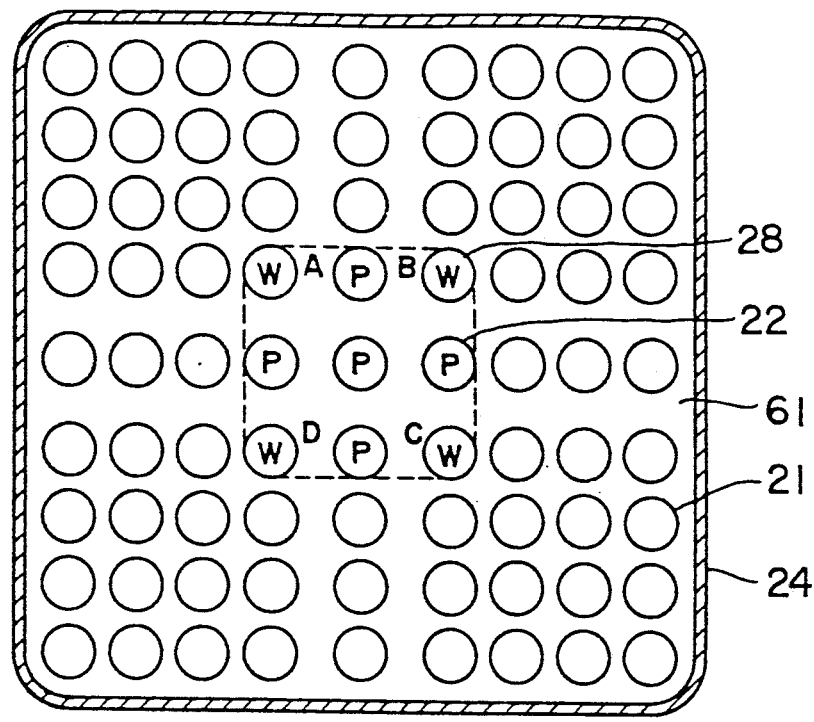

FIG. 49 is a plan view of the forty-seventh embodiment according to this invention, which is of the type different from that of FIG. 47 or FIG. 48, and in which the fuel assembly takes rough and fine lattice of 4-1-4 type fuel rod arrangement. Four water rods 28(W) portion of the central block enclosed by dotted lines, which constitute the water rod zones A, B, C and D. Five fuel rods 22 (P) with the interposed members are located between these water rods 28. The upper portion of the reactor core and the portion enclosed by dotted lines having water rods having a small diameter are arranged at corner is constituted as no fuel area, and the fuel assembly of this embodiment thus includes four water rods 28 each having a small diameter, five fuel rods 22 with the interposed members, and seventy-two usual fuel rods 21.

Figure 50:
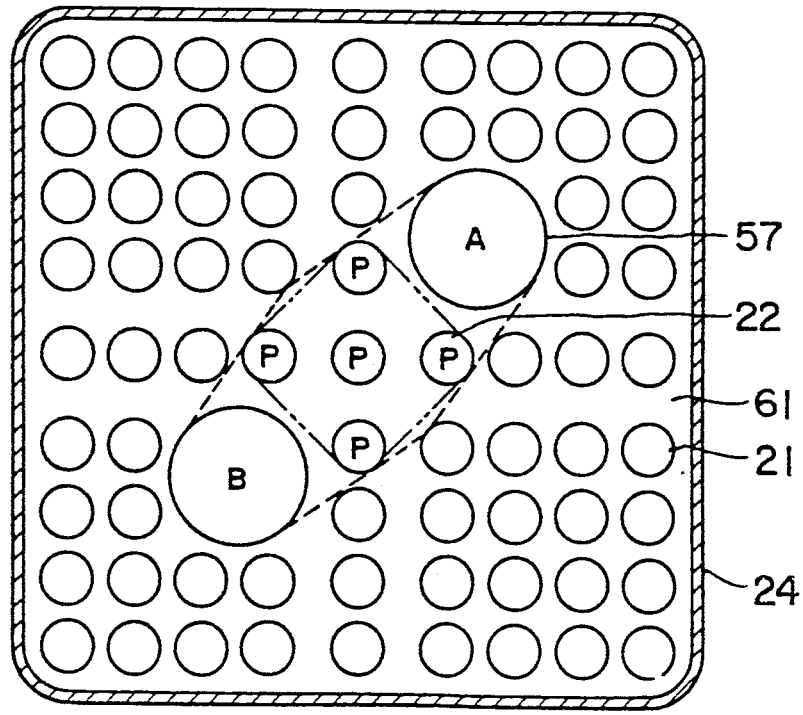

FIG. 50 is a plan view of the forty-eighth embodiment according to this invention, in which the fuel assembly takes rough and fine lattice of 4-1-4 type fuel rod arrangement as described with reference to the former embodiment of FIG. 49. Two large water rods 57 (A and B) each having a size corresponding to four fuel rods in a bundle are located inside sub-bundles (each 4×4 fuel rods) on one diagonal line, and five fuel rods 22 (P) with the interposed members are arranged between these water rods A and B. Although this embodiment is somewhat similar in arrangement to the embodiment shown in FIG. 42, the gaps between the respective fuel rods P are made relatively wide, so that no fuel area at the upper portion, enclosed by dotted lines, of the reactor core is also made large. The fuel assembly of this embodiment includes two large water rods 57, five fuel rods 22 provided with the interposed members and sixty-eight usual fuel rods 21.

FIG. 51 is a plan view of the forty-ninth embodiment according to this invention. The fuel assembly of this embodiment is of rough and fine lattice of 5-4 type fuel rod arrangement. Water rods 57 each having a large diameter are located at the inner corner portions of non-symmetrical lattice assemblies as shown in FIG. 50 and fuel rods 22 are located at the inner corner portions of symmetrical lattice assemblies. This fuel assembly thus includes two water rods 57 each having a large diameter, two fuel rods 22 with the interposed members and seventy-one usual fuel rods 21 and is effectively applicable to the BWR-D lattice type reactor core.

FIG. 52 is a plan view of the fiftieth embodiment according to this invention. The fuel assembly of this embodiment is of rough and fine lattice of 4-2-3 type fuel rod arrangement. Although this embodiment is similar in arrangement to that shown in FIG. 51, flow control members (FC)62 are arranged such as shown in FIG. 47. The fuel assembly of this embodiment includes two water rods 57 each having a large diameter, two fuel rods 22 with the interposed members and seventy-one usual fuel rods 21 and is effectively applicable to the BWR-D lattice type reactor core.

Figure 53:
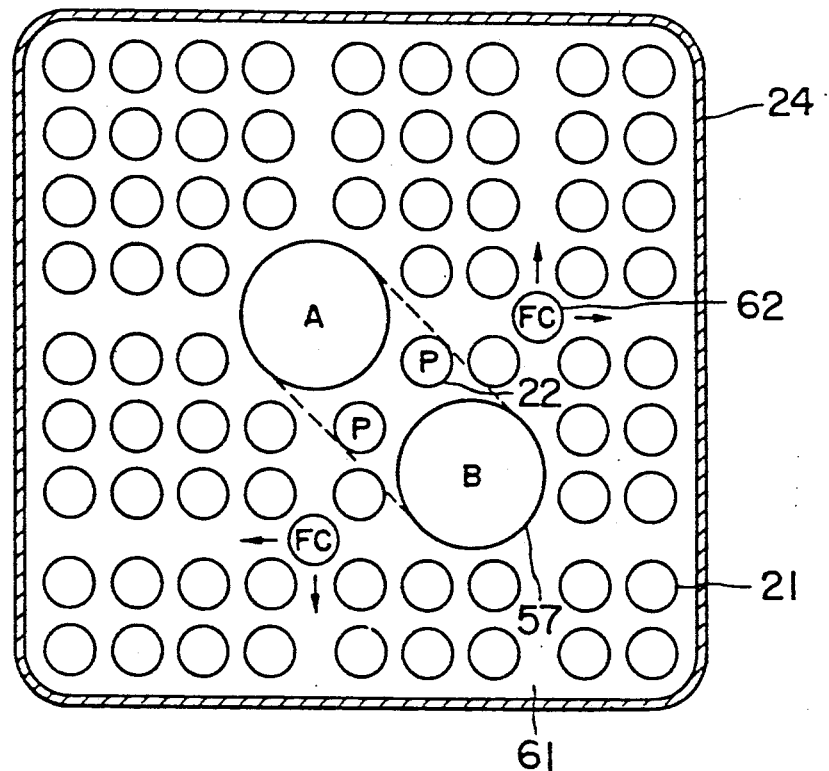

FIG. 53 is a plan view of the fifty-first embodiment according to this invention. The fuel assembly of this embodiment is of rough and fine lattice of 4-3-2 type fuel rod arrangement and similar to the embodiment shown in FIG. 52, but the water rods A and B have diameters slightly different from each other by taking into consideration the affect of the lattice shapes. The fuel assembly of this embodiment includes two water rods 57 having different large diameters, two fuel rods 22 with the interposed members, seventy-one usual fuel rods 21 and two FCs 63, and is effectively applicable to the BWR-D lattice type reactor core.

Figure 54:
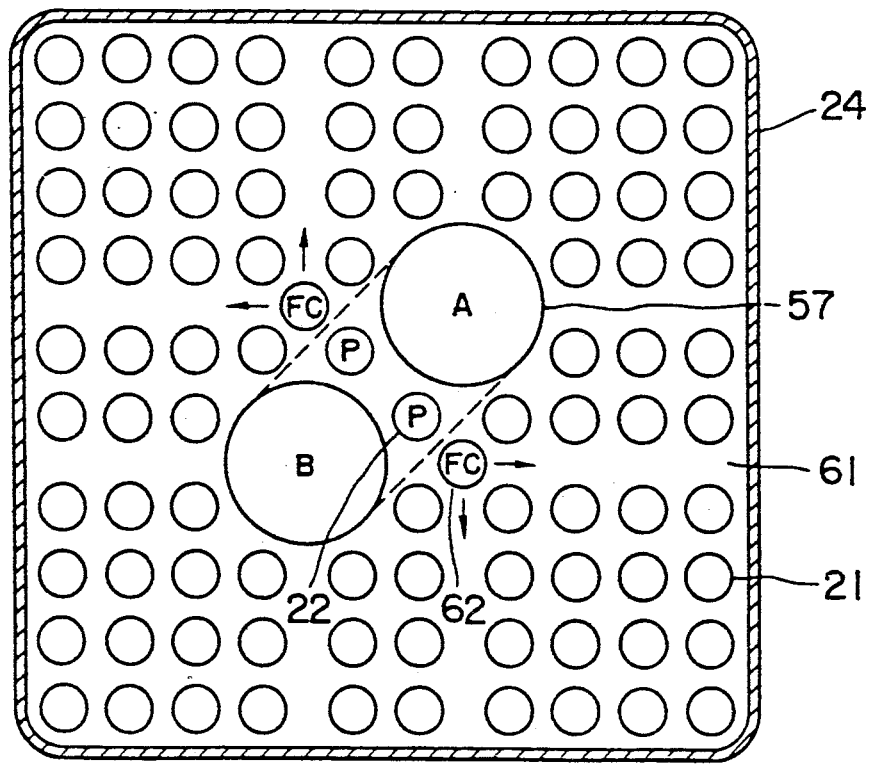

FIG. 54 is a plan view of the fifty-second embodiment according to this invention. The fuel assembly of this embodiment is of 10×10 type (ten lines and ten rows of fuel rods) and includes rough and fine lattice of 4-2-4 type fuel rod arrangement. Accordingly, large water rods 57 (A and B) are adopted, but the other arrangement is substantially identical to that shown in FIG. 52. This fuel assembly includes two water rods 57 each having a large diameter, two fuel rods 22 with the interposed members, ninety usual fuel rods 21, and two FCs 63.

Figure 55:
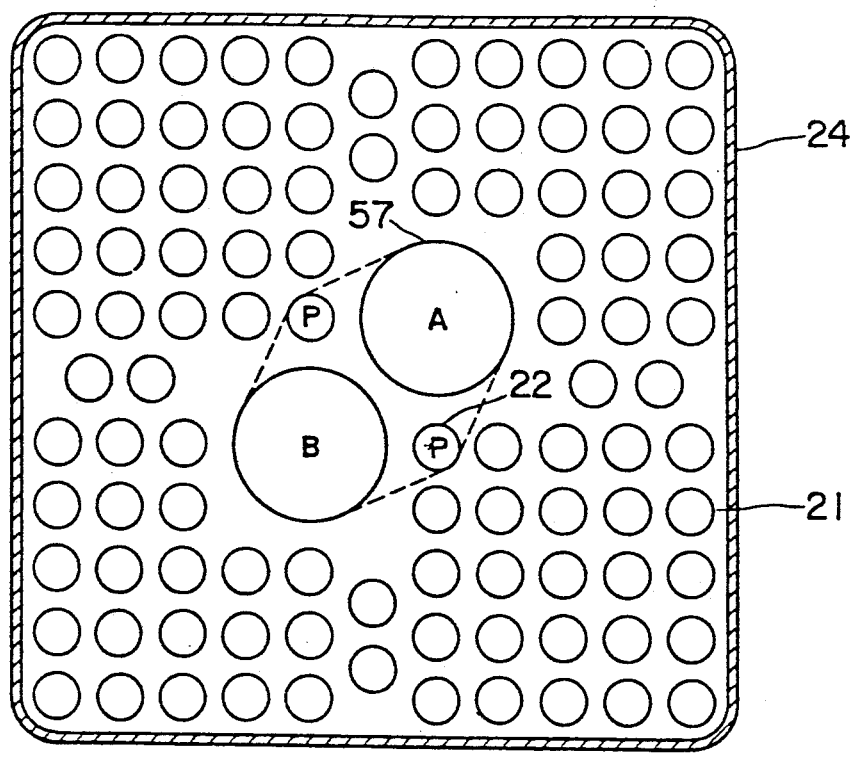

FIG. 55 is a plan view of the fifty-third embodiment according to this invention. The fuel assembly of this embodiment is of 10×10 type and includes rough and fine lattice of (5×5)×4 type fuel rod arrangement. Accordingly, the water rods 57 (A and B) each having a further large diameter is applicable in comparison with the water rods shown in FIG. 51, but the other structures are substantially identical to those of FIG. 51. The fuel assembly of this embodiment includes two water rods 57, two fuel rods 22 with the interposed members, and ninety-eight usual fuel rods 21.

Figure 56:
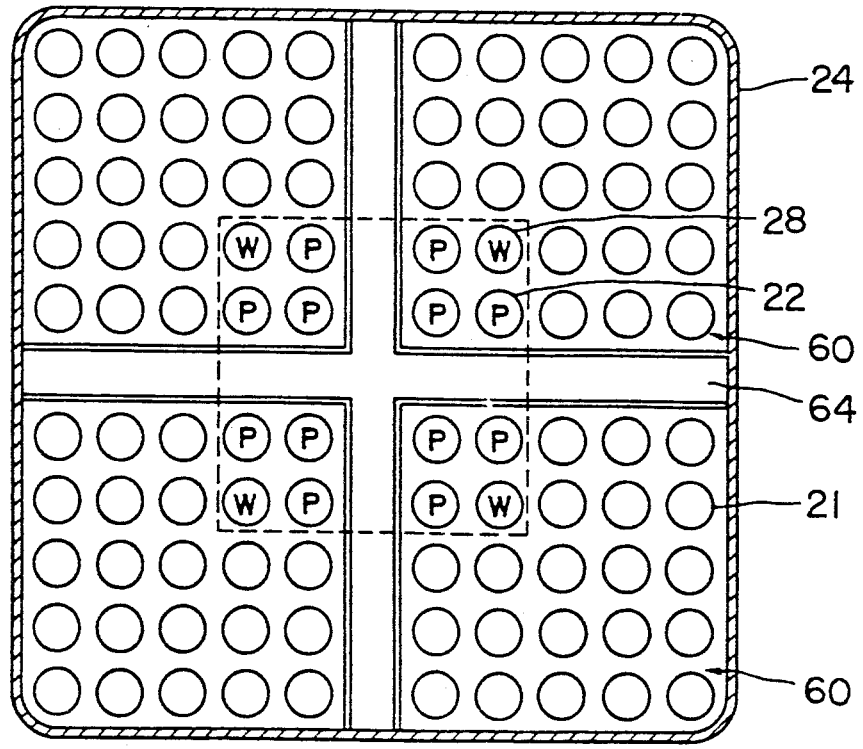

FIG. 56 is a plan view of the fifty-fourth embodiment according to this invention, in which four sub-bundles 60 are arranged and cruciform water gap 64 located between these sub-bundles 60 is constructed as non-boiling moderating water area. Three fuel rods 22 with the interposed members and one water rod 28 having a small diameter are arranged in a bundle at each corner portion of each sub-bundle facing the central crossing portion of the water gap 64. The fuel assembly of this embodiment thus includes four water rods 28, twelve fuel rods 22 with the interposed members, and eighty-four usual fuel rods 21, and according to this invention, no fuel area enclosed by dotted lines in FIG. 56 is formed at the upper portion of the reactor core.

With the aforementioned forty-first to fifty-fourth embodiments, short fuel rods may be utilized in substitution for the fuel rods each provided with an interposed member.

Figure 57A:
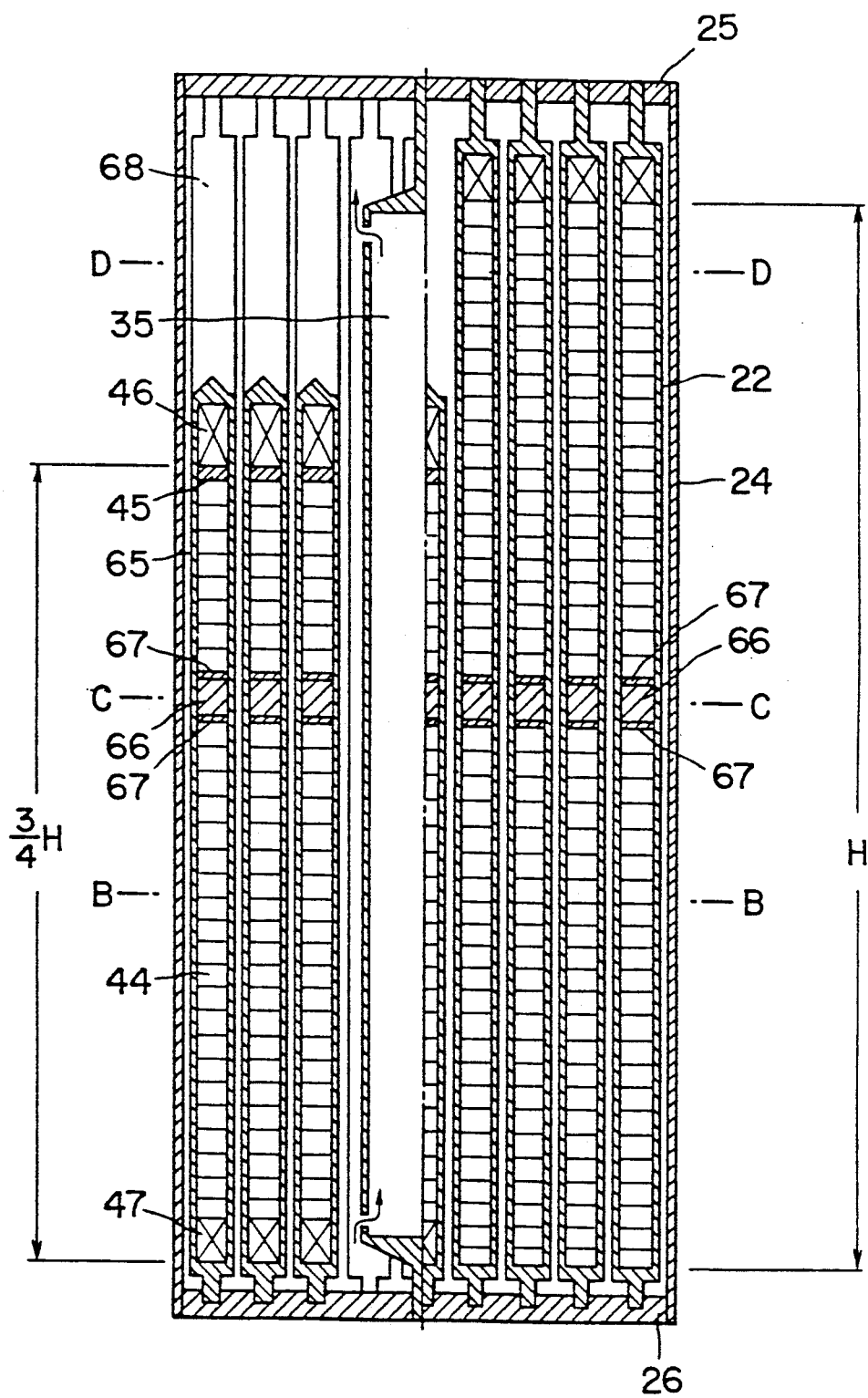
FIG. 57A is an elevational section of the fuel assembly of the fifty-fifth embodiment and FIGS. 57B, 57C and 57D are cross sections taken along the lines B-B, C-C and D-D respectively shown in FIG. 57A.
Figure 57B:
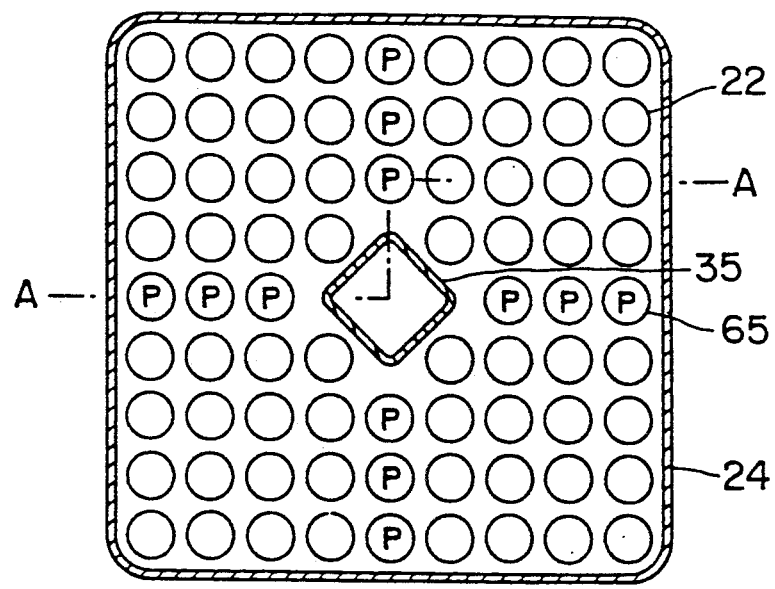
Figure 57C:
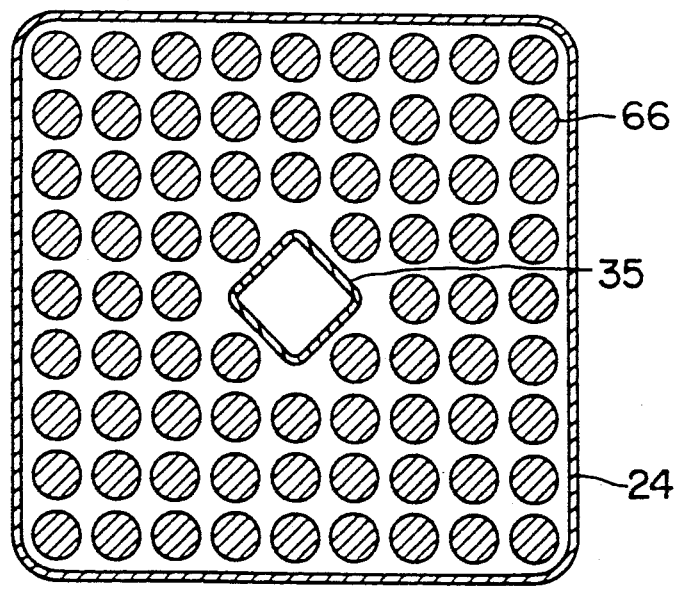
Figure 57D:
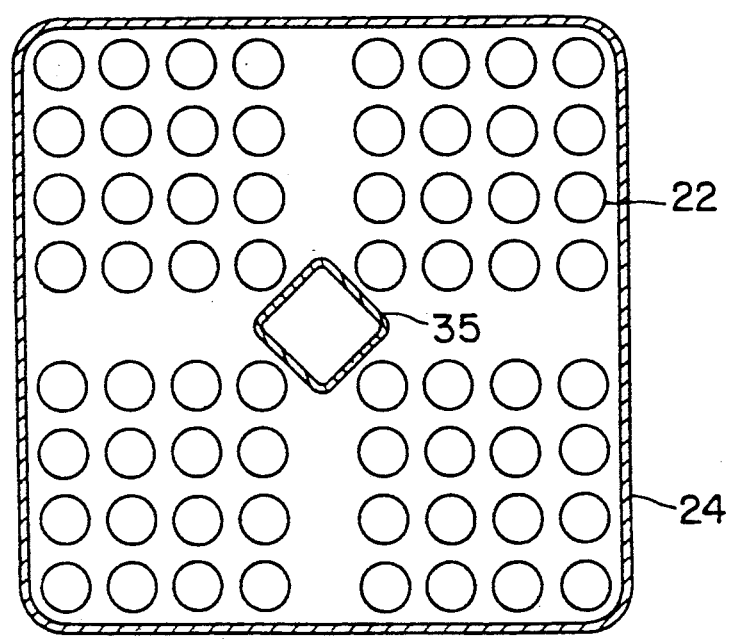

FIG. 57 is a plan view of the fifty-fifth embodiment according to this invention, in which FIG. 57A shows an elevational section taken along the line A-A shown in FIG. 57B and FIGS. 57B, 57C and 57D are cross sectional, i.e. plan view taken along lines B-B, C-C and D-D, respectively, shown in FIG. 57A.

In the fuel assembly of this embodiment, a water rod 35 square in cross section is arranged at the central portion thereof, and fuel rods 22 each having a length longer than that of the short fuel rod and provided with an interposed member 66, and short fuel rods 65 (denoted by letter P in the illustrated embodiment) are regularly arranged in nine lines and nine rows except the central portion at which the water rod 35 is arranged. The outer periphery of these fuel rods is surrounded by a channel box 24 and the upper and lower ends thereof are secured by upper and lower tie plates 25 and 26, respectively. The short fuel rod 65 is provided with an upper plenum 46 above the top of the stack (pellets) 44 by way of an output power spike suppressing member 45, and a lower plenum 47 is disposed at the bottom of the stack 44. A portion above the short fuel rod 65 is occupied by the coolant and steam voids to form a vanishing area in which no fuel rod exists. Main portion of a gas plenum is located below the stack 44 and a short one is auxiliarily located above the stack.

As shown in FIG. 57C, in the portions taken along the line C-C in FIG. 57A, all fuel rods contain the inserted interposed members 66 each having a length of about 2 to 8 cm, which is approximately equal to or more than the thermal neutron diffusion length at the cold operation period, whereas it is approximately equal to or less than that length at the generation of voids during the high temperature operation period. Output power spike suppressing members 67 are inserted in each of the fuel rods so as to nip the interposed member 66 from the upper and lower sides thereof. The characteristics required for the output power spike suppressing members 67 are basically the same as those required for the output power spike suppressing members 45 located above the top portion of the short fuel rods 65.

The reactor core according to this embodiment has such a nature as that the reactor output power locally increases in a portion within 5 cm, particularly 1 cm, from the top of the pellet stack of the short fuel rod 65, so that in order to suppress this local output power increasing, the output power spike suppressing member 45 is inserted above the top of the pellet stack. The output spike suppressing members 67 are also axially inserted into the pellets between which the interposed member 66 is inserted. The constructions or compositions of the output power spike suppressing members are substantially identical to those referred to with respect to the nineteenth embodiment shown in FIG. 21.

According to this embodiment, the output power gently increases in the long fuel rods 22 adjacent to the vanishing rods 68 located at the upper portions of the short fuel rods. In such a case, usually, there is no need for taking any specific procedure or counteraction, but with respect to a fuel assembly expected in future in which the fuel will be gradually enriched, many known techniques may be applicable such that the enrichment will be slightly lowered or an annular fuel pellet containing $Gd_2O_3$ in the central portion thereof will be inserted Supposing a case in which no output power spike suppressing member exists, the output power spike of the upper and lower portions of the relatively short interposed member in the axial direction (vertical direction) of the C-C cross sectional portion (shown in FIG. 57C) will tend to be large in comparison with the maximum output power spike in a case where the relatively axially long interposed member is inserted in a direction normal to the axial direction (D-D cross sectional portion as shown in FIG. 57D) in the relatively upper portion of the fuel assembly. For this reason, the former may be arranged in a portion (upper portion of the reactor core) which sufficiently retains the cooling ability of the coolant for ensuring the soundness condition of the fuel in case of emergency.

Figure 58B:
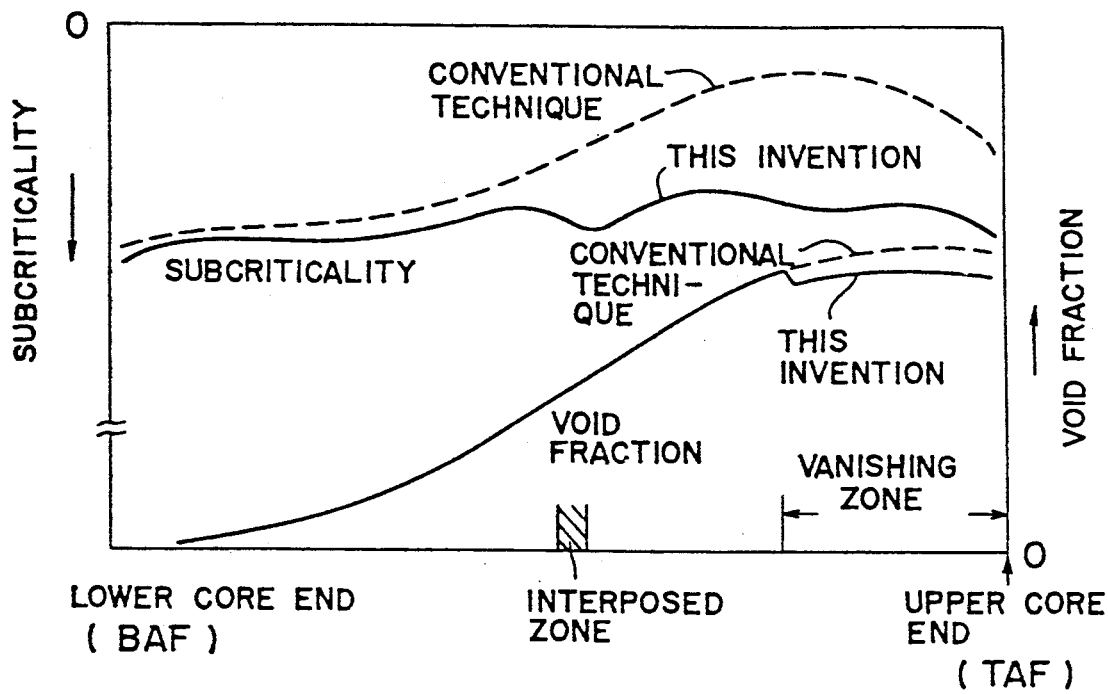
FIG. 58B is a graph representing a relationship between the void factor in the core axial direction and the subcriticality.
Figure 58A:
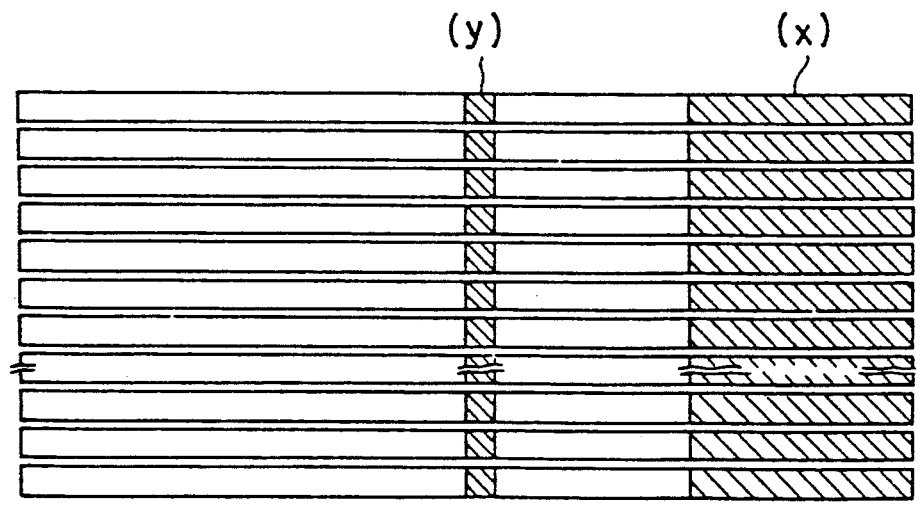
FIG. 58A is a schematic view of a BWR core to which the fuel assembly of FIG. 57 is applied.

FIG. 58A is a schematic elevational view of a BWR-type core to which the fuel assembly according to this invention is applied and FIG. 58B is a graph representing the relationship between the void fraction in the axial direction of the reactor core shown in FIG. 58A and the distribution of the subcriticality.

The hatched portions x in FIG. 58A represent the vanishing areas of the short fuel rods 65 and the hatched portions y represent areas into which the interposed members 66 are inserted. The heights of these vanishing areas x and the interposed member inserted areas y are usually aligned respectively, but this design matter is not always necessary because the vanishing areas have long length in the axial direction For example, in case it is desired to make gentle the axial output power distribution, the lower ends of these areas will be changed, for example, by providing a stepped portion in the bundle or a stepped portion between the respective bundles. On the other hand, it is desired to align the heights of the interposed member inserted areas y because these areas have vertically short lengths. FIG. 58B shows the comparison result between this invention and the conventional technique, and as is apparent from FIG. 58B, the subcriticality according to this invention is flat and large and the void fraction is slightly reduced at the upper portion of the reactor core.

Figure 59B:
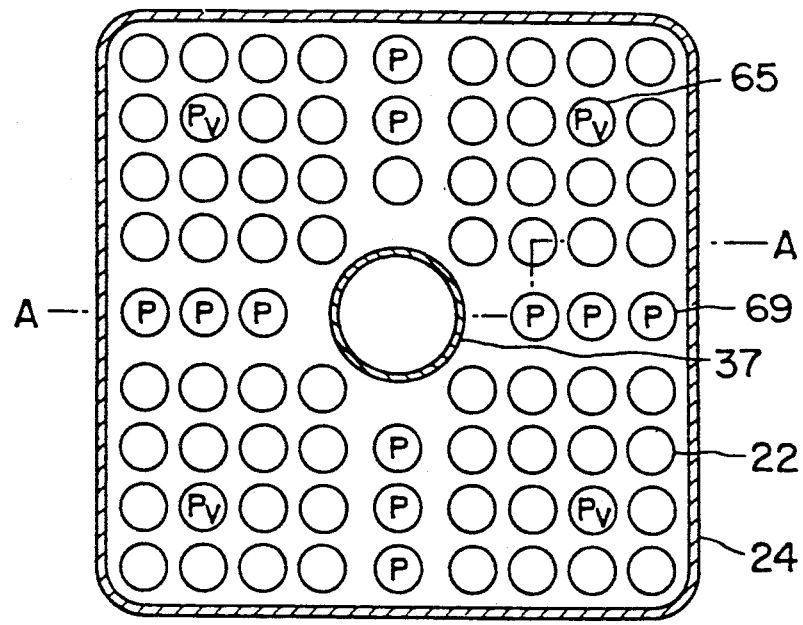
Figure 59C:
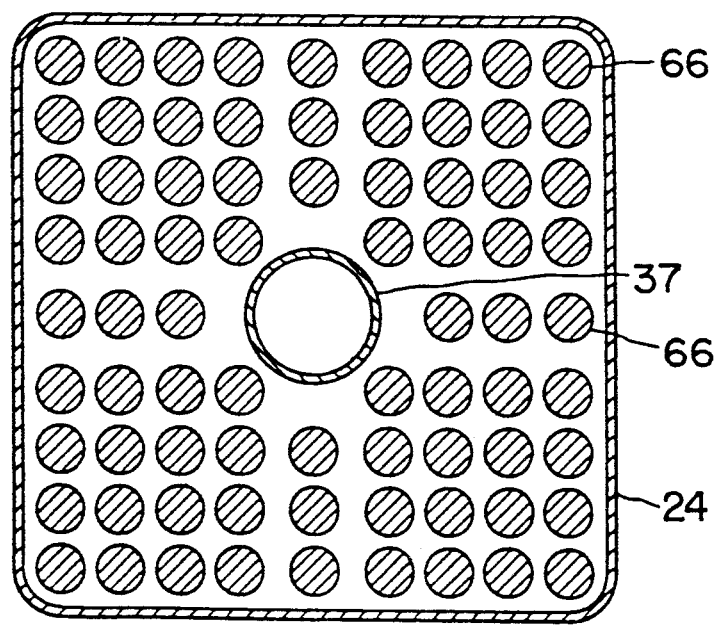
Figure 59D:
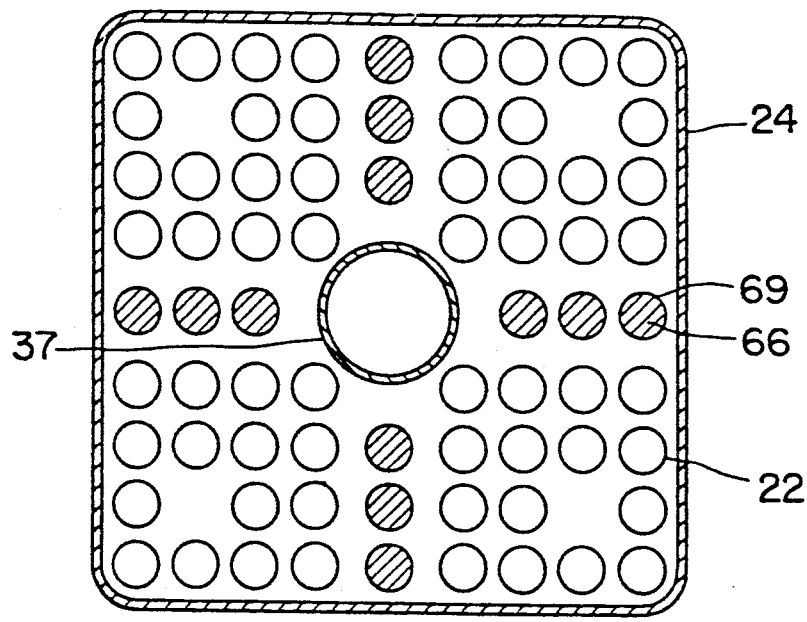
Figure 59E:
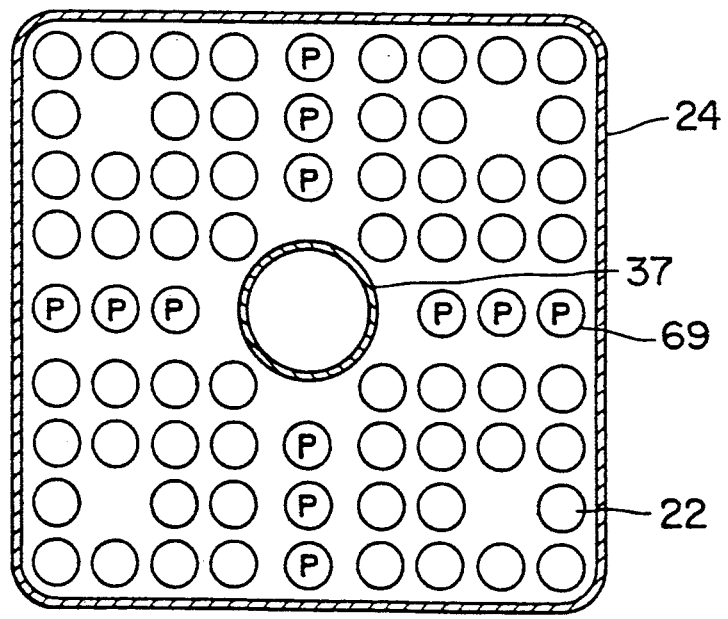

FIG. 59 shows schematic views of the fifty-sixth embodiment according to this invention, in which FIG. 59A shows an elevational section taken along the line A-A shown in FIG. 59B and FIGS. 59B, 59C, 59D and 59E are cross sectional views taken along the lines B-B, C-C, D-D and E-E respectively shown in FIG. 59A. In the fuel assembly of this invention, four groups, each comprising three fuel rods, of long fuel rods 69 (denoted by letter P in the illustrated embodiment), each provided with an interposed member, are arranged in cruciform with a water rod 37 having a large diameter arranged at the central portion of the crossing long fuel rods 69, and four short fuel rods 65 (denoted by letter PV) are located at the four crossed portions (2.2) of the second lines and second rows taken from the outer peripheral sides of the fuel bundle. Although the use of these short fuel rods 65 is not always necessary, the problem of high probability of insufficient cooling capacity at the portions near the bundle corners can be effectively overcome by using short fuel rods PV at the portions (2.2) as described above. The fuel assembly of this embodiment includes sixteen long and short fuel rods P and PV and sixty long fuel rods 22 each provided with an interposed member having the interposed member existing area smaller than that of the long fuel rod P. According to this embodiment, since the width of the gap between the axial interposed member existing areas is made wider than that of the former embodiment, the improved effects can be attained in comparison with the former embodiment by utilizing the same amounts of fuels.

Figure 60:
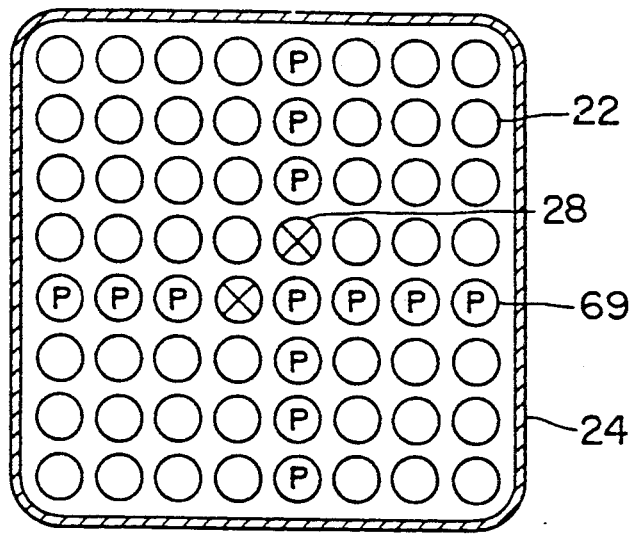

FIG. 60 is a plan view of the fifty-seventh embodiment according to this invention, which is to be applicable to a conventional type fuel assembly (in which two water rods 28 each having a small diameter, but not water rods each having a large diameter, are arranged), and fuel rods 69 with the interposed members are arranged in cruciform. The fuel assembly of this embodiment thus includes fourteen fuel rods P, comprising short fuel rods or long fuel rods 69 provided with the interposed members, and forty-nine fuel rods 22 with the interposed members having the interposed member existing area smaller than that of the fuel rods 69.

Figure 61:
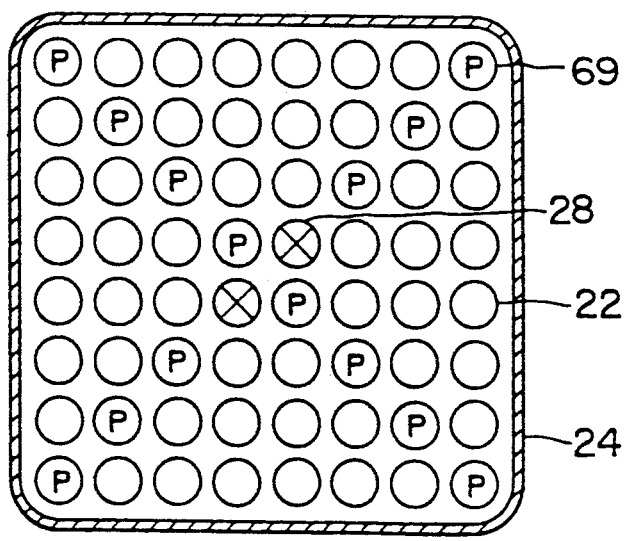

FIG. 61 is a plan view of the fifty-eighth embodiment according to this invention, which is applicable to an embodiment similar to that shown in FIG. 60 in which each pair of adjacent water rods 28 have a small diameter. The fuel assembly of this embodiment includes fourteen fuel rods P with the interposed members arranged diagonally and forty-eight fuel rods 22 with the interposed members having the interposed member existing area smaller than that of the fuel rods P.

Figure 62:
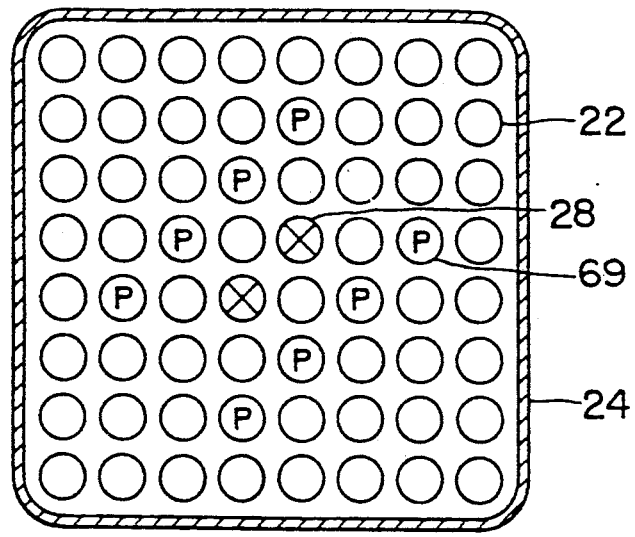

FIG. 62 is a plan view of the fifty-ninth embodiment according to this invention, which is also applicable to an embodiment similar to that shown in FIG. 60 in which two water rods 28 each having a small diameter are arranged. The fuel assembly of this invention includes eight fuel rods P with the interposed members in two parallel rows in the diagonal direction by every four fuel rods P and fifty-four fuel rods 22 with the interposed members having the interposed member existing area smaller than that of the fuel rods P.

Figure 63:
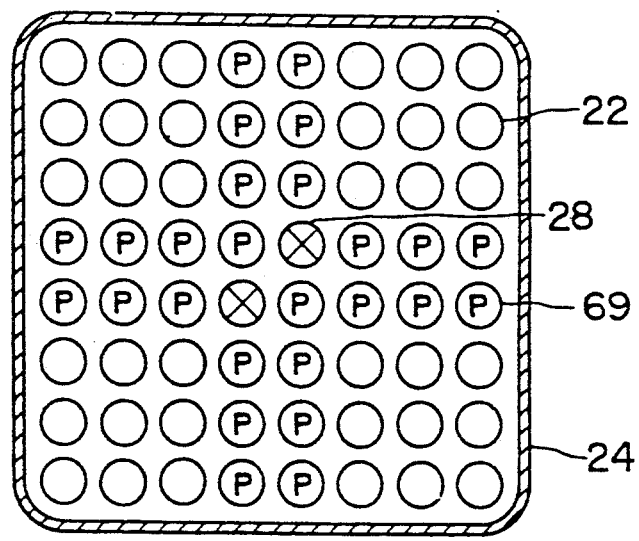

FIG. 63 is a plan view of the sixtieth embodiment according to this invention, which is applicable to an embodiment in which two water rods 28 each having a small diameter are arranged. The fuel assembly of this embodiment includes twenty-six fuel rods P with interposed members located in double-cross shape arrangement and thirty-six fuel rods 22 with the interposed members having the interposed member existing area smaller than that of the fuel rods P. The fuel assembly is constructed in the axial interposed member existing area by four sub-bundles each comprising 3×3 (three rows and three lines) fuel rods, thus maintaining the large reactor shut-down margin.

Figure 64:
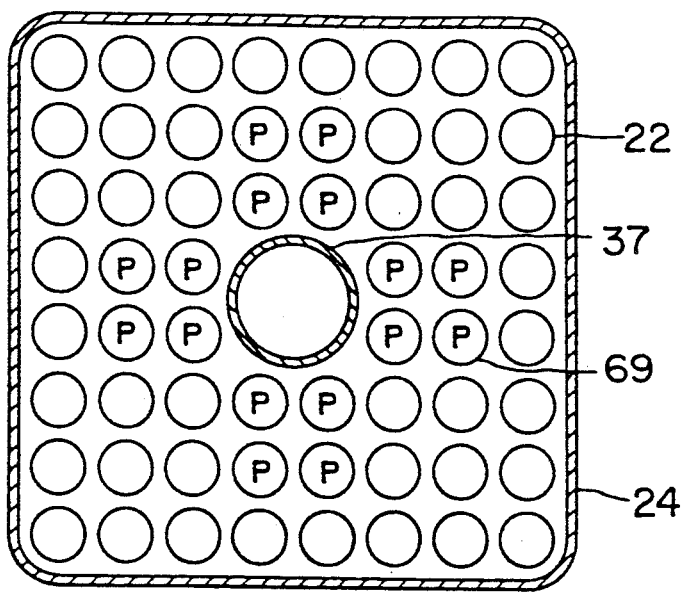

FIG. 64 is a plan view of the sixty-first embodiment according to this invention, in which a water rod 37 having a large diameter and the size corresponding to four fuel rods arranged at the central portion of the fuel assembly of the embodiment shown in FIG. 63, and in which the fuel rods P with the interposed members located on the sides of the channel box are substituted with the fuel rods 22 with the interposed members having the interposed member existing area smaller than that of the fuel rods P. The fuel assembly of this embodiment thus includes sixteen fuel rods P and the forty-four fuel rods 22.

Figure 65:
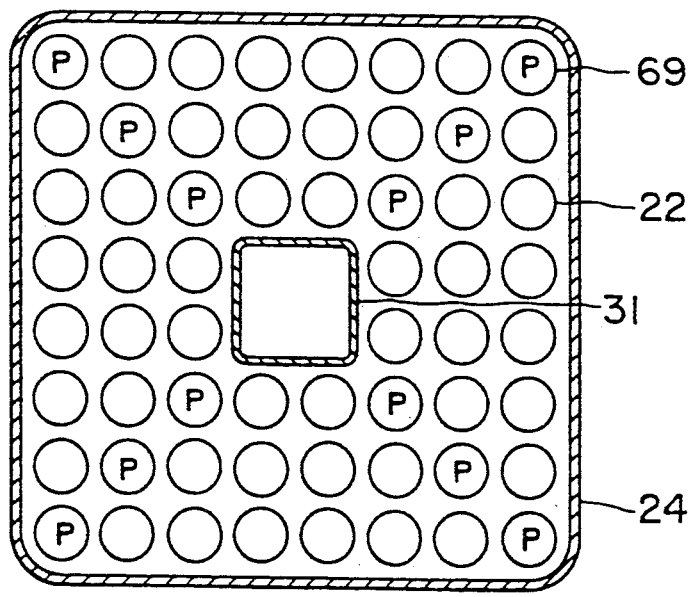

FIG. 65 is a plan view of the sixty-second embodiment according to this invention, in which a square water rod 31 having the size corresponding to four fuel rods is arranged at the central portion of the fuel assembly This fuel assembly includes twelve fuel rods P arranged in cruciform in the diagonal directions and forty-eight fuel rods 22 having the interposed member existing area smaller than that of the fuel rods P.

FIG. 66 is a plan view of the sixty-third embodiment according to this invention, in which a large water rod 36 substantially square in cross section is arranged at the central portion of the fuel bundle in an inclined manner by 45° with respect to the bundle surface. Further one fuel rod is arranged at a position facing each side surface of the water rod 36, and further one fuel rod P with the interposed member is located at each corner portion of the fuel bundle. The fuel assembly of this embodiment thus includes sixteen fuel rods P and sixty fuel rods 2 with the interposed members having the interposed member existing area smaller than that of the fuel rods P.

FIG. 67 is a plan view of the sixty-fourth embodiment according to this invention, which is a modification of the embodiment shown in FIG. 60 and in which the water gaps between the water rod 37 having a large diameter and the sub-bundles are offset with respect to the fuel bundle, and accordingly, this embodiment is effectively applicable to a reactor core in which the water gaps at the outer peripheral portions of the fuel assembly have widths different from each other (called BWR-D lattice type reactor core). According to this embodiment, the flat power distribution can be effectively obtained by arranging the wide water gaps at the leftside and upperside portions, as viewed. This fuel assembly includes fourteen fuel rods P with the interposed members and sixty-three fuel rods 22 with the interposed members having the interposed member existing area smaller than that of the fuel rods P.

FIG. 68 is a plan view of the sixty-fifth embodiment according to this invention, which is applicable to a conventional type fuel assembly. Namely, the fuel assembly of this embodiment is divided into four small channels 13 between which cross-shaped water gap 14 is located as non-boiled moderator water area. The fuel rods P with the interposed members are disposed in a bundle at the corner portions of the respective channels 13 facing the central portion of the crossed water gap in the fuel assembly. The fuel assembly of this embodiment thus includes twelve fuel rods P and fifty-two fuel rods 22 with the interposed members having the interposed member existing area smaller than that of the fuel rods P.

FIG. 69 is a plan view of the sixty-sixth embodiment according to this invention, which is also applicable to an embodiment of a conventional type fuel assembly. Namely, this fuel assembly is constructed by nine sub-bundles 15 each comprising nine fuel rods 22 and slightly wide gaps 16 are located between the respective sub-bundles. The fuel assembly of this embodiment includes nine fuel rods P with the interposed members arranged in the central sub-bundle and seventy-two fuel rods 22 with the interposed members having the interposed member existing area smaller than that of the fuel rods P.

FIGS. 70A to 70E are elevational sections of fuel rods of different types all according to this invention.

Figure 70:
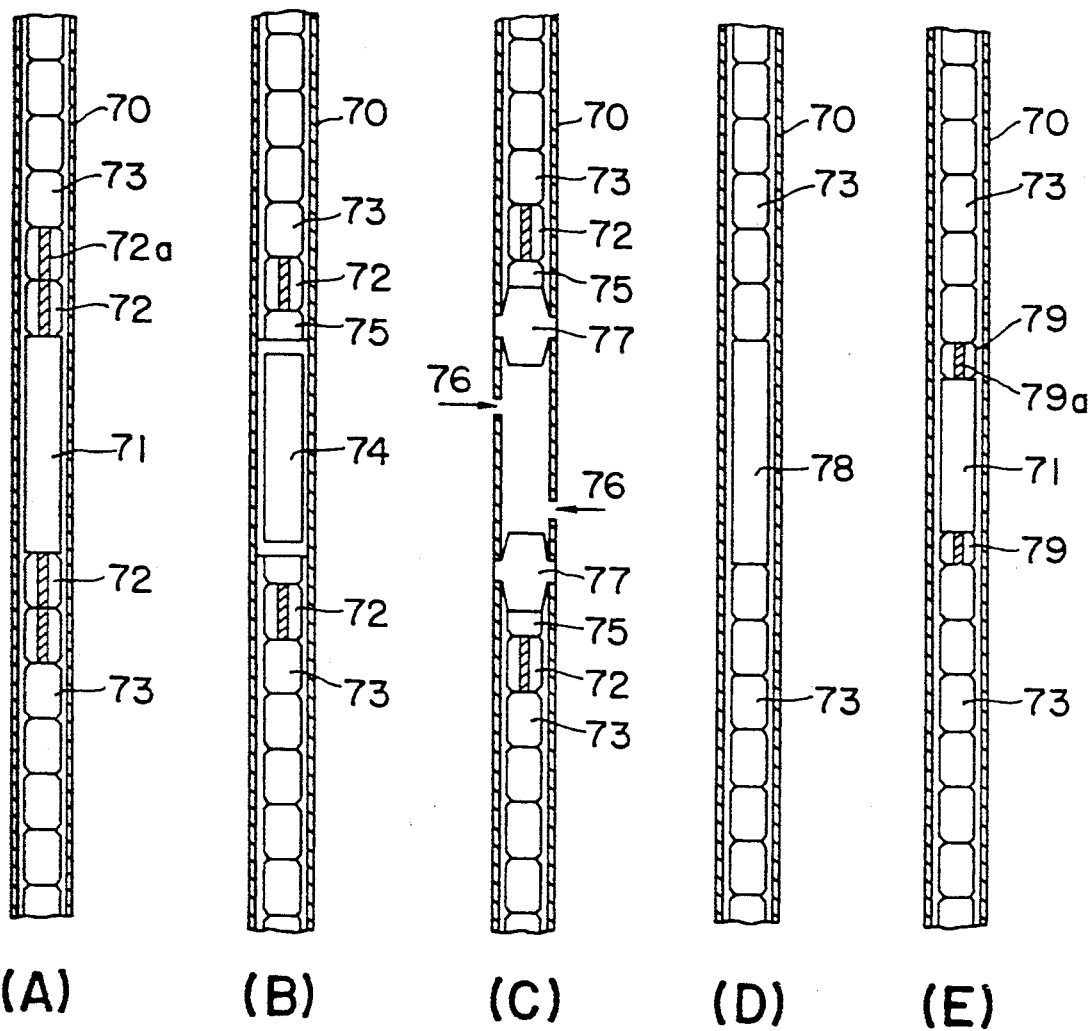
FIGS. 70A, 70B, 70C, 70D and 70E are elevational sections of fuel rods according to this invention.

A fuel rod shown in FIG. 70A has an area including no fuel material in a bundle, the area having a length of 2 to 90 cm into which a graphite 71 is charged. The interposed member charged into the vanishing area and the interior of the fuel assembly so as to separate them in a direction normal to the axial direction thereof has relatively long length of about 19 to 90 cm, and the interposed member inserted into the fuel rod so as to separate it in the axial direction has relatively short length of about 2 to 8 cm. These dimensional relationships will be applied to the other embodiments of the fuel rods described hereinafter. The graphite 71 has excellent high temperature characteristics and less absorption of the thermal neutrons as well as function as a moderator. $Al_2O_3$, $ZrO_2$ or the like as low density (i.e. porous) material has good heat-proof characteristics in spite of less moderating characteristics. Thus, such material having less neutron absorption characteristics may be utilized instead of the graphite. Hollow graphite, hollow $Al_2O_3$, hollow $ZrO_2$, hollow natural uranium and hollow depleted uranium may be also utilized instead of solid graphite, and in case such hollow material is utilized, the hollow portion will be utilized as a gas plenum.

The most important one of the characteristics required for this area is that this area has the thermal neutron absorption rate, at the final stage of the reactor operation cycle, smaller than those of the fuel areas positioned on both axial sides of this fuel area. With the fuel materials adjacent to the charged graphite 71, power peaks (spikes) are generated in a range of about 2 cm (at the uppermost, 5 cm), which is not advantageous for the soundness of the fuel. Accordingly, respective two fuel pellets 72 each having a length of about 2 cm and bearing the burnable poisons 72a are arranged only at portions near the axis thereof. These pellets 72 do not bear the burnable poisons at their outer peripheral portions, so that the power output with relatively small variation can be obtained throughout the whole reactor operation cycle, and it is desired to design the fuel rod, so that the poison absorption characteristics will be vanished when the reactor operation cycle approaches the final stage and the output power of these areas will gently increase.

The neutron interaction (binding effect) in the horizontal fuel area arranged adjacent to an interposed area (in which the concentration of the fissile nuclide is low) is reduced, and as a result, the subcriticality of the reactor during the shut-down period can be made further large.

The difference between the fuel rod shown in FIG. 70A and that shown in FIG. 70B resides in that a tube 74 made of zircaloy having a small neutron cross section is inserted in the fuel rod shown in FIG. 70B instead of the graphite 71, and in this example, many modifications will be considered, for example:

(1) When it is used as a gas plenum, the tube 74 is made as an unsealed tube.

(2) In case ZrH$_2$ (zirconium hydride) is fitted with high concentration, it is desired to seal the same in the tube, and a relatively small gap is provided in the tube for utilizing the gap as the gas plenum for H$_2$ gas slightly discharged from the ZrH$_2$.

(3) Be and BeO which are poisonous are preferably charged in the tube, and since He gas is generated in the reaction between the Be and the neutrons, a small plenum for He gas will be disposed in the tube. Between the zircaloy tube 74 and the fuel pellet 73 are inserted or charged a thermal insulation pellet 75, Al$_2$O$_3$, ZrO$_2$, depleted uranium and the like for improving the soundness of the fuel. It is preferred that the thermal insulation pellet 75 has small thermal neutron absorption characteristics at the final stage of the reactor operation cycle, and accordingly, such as burnable poison bearing Al$_2$O$_3$—Gd$_2$O$_3$ pellet or depleted uranium UO$_2$—Gd$_2$O$_3$ pellet will be preferably utilized. With the axially adjacent fuel pellets of the zircaloy tube 74, it is desired to arrange the pellets 72 each containing the burnable poison so as to have a length of about 2 cm (at the uppermost, 5 cm) from the end portion thereof. Although, in the embodiment of FIG. 70B, the pellet 72 in which the Gd pellet having a fine diameter is inserted is illustrated, the Gd may be blended entirely into the pellet 72. This matter is applicable to the fuel rods shown in FIGS. 70A and 70C.

The difference between the fuel rod shown in FIG. 70B and that shown in FIG. 70C resides in that water is introduced in the fuel rod shown in FIG. 70C. Namely, with the fuel rod of FIG. 70C, water holes 76 are formed in upper and lower portions of the clad 70 at which the zircaloy tube 74 is located, and an intermediate plug 77 and the thermal insulation pellet 75 are disposed at the upper portion and the lower portion of the respective water holes 76. The fuel pellets 72 containing the burnable poisons are disposed at the upper and lower portions of the intermediate plug 77 and the thermal insulation pellet 75, and the fuel pellets 73 are disposed at further upper and lower portions of the fuel pellets 72 in a bundle as shown in FIG. 70C.

The difference between the fuel rod shown in FIG. 70D and that shown in FIG. 70A resides in that the fuel rod shown in FIG. 70D is provided with an interposed layer 78 wherein a burnable poison is added to the graphite (or Al$_2$O$_3$, ZrO$_2$, Al$_2$O$_3$—ZrO$_2$). According to this embodiment, the burnable poison is not added to the fuel, the fuel rod is itself easily manufactured.

The difference between the fuel rod shown in FIG. 70E and the fuel rod shown in FIG. 70A resides in that the fuel pellets axially adjacent to the interposed graphite (or Al$_2$O$_3$, ZrO$_2$, Al$_2$O$_3$—ZrO$_2$) are specified so that the power spike can be hardly generated throughout the reactor operation cycle. Namely, with this embodiment, composite pellets 79, each in which is inserted a fine pellet formed by sintering a mixture oxide of depleted uranium oxide and gadolinium into an annular pellet utilizing natural uranium oxide, are arranged with an interposed member 71 therebetween. The thus prepared and arranged composite pellets 79 are enclosed in cassette shape with a thin metallic sleeve such as made of pure zirconium material.

According to this embodiment, the fuel rod can be easily and precisely assembled. Boron may be used in substitution for the gadolinium. The depleted uranium has a small heat generation after the neutron toxicity of the Gd$_2$O$_3$ at the core portion has been vanished by the sintering process, so that high temperature condition is not created, and in addition, the annular portion is filled with the natural uranium, so that high temperature condition is also not created at this portion.

Figure 71:
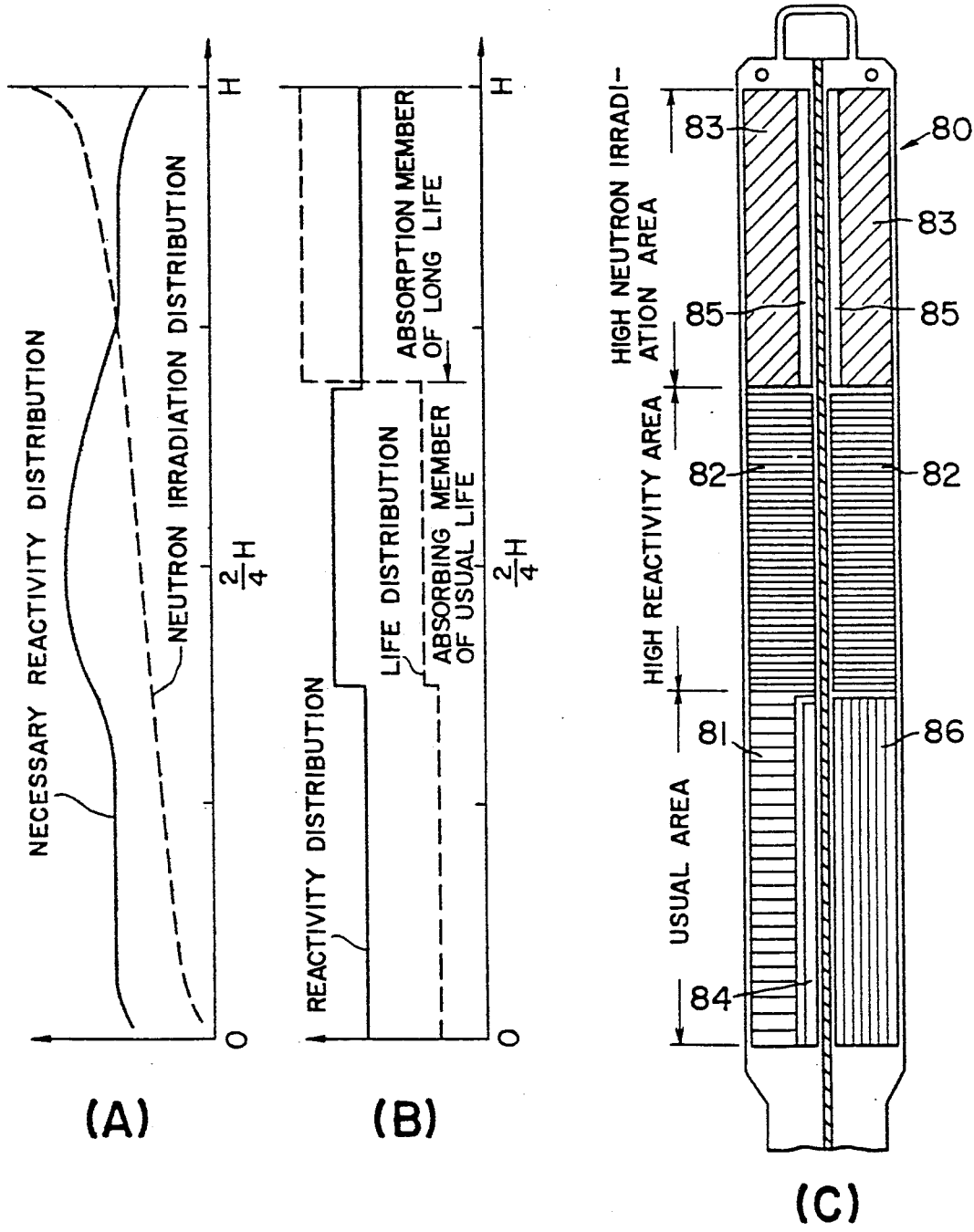

FIG. 71 shows one example of a control blade utilized in a reactor core in which the fuel assembly according to this invention is mounted, in which FIG. 71A is a graph representing characteristic curves required for the control blade, FIG. 71B shows the characteristic curves discreted on the basis of the characteristic curves shown in FIG. 71A, and FIG. 71C shows elevational sections of right half and left half of two examples of the control blades embodied on the basis of the graph shown in FIG. 71B.

As is apparent from FIG. 3B and FIG. 58B, in a nuclear reactor in which the fuel assembly according to this invention is provided, the position having a small subcriticality is shifted from a portion near the upper portion of the reactor core, as in the conventional reactor core, to a portion near the axially central portion of the reactor core. For this reason, it is preferred that the reactivity of the control blade is made maximum at substantially the central portion of the control blade (corresponding to substantially the axially central portion of the reactor core) when the control blade is entirely charged. The distribution of the neutron irradiation amount is not widely varied in comparison with the conventional technique.

Accordingly, it is desired, as shown in FIG. 71B, that, in consideration of the case of dividing the function of the control blade in the axial direction, the rear end portion of the control blade when charged into the reactor core has a reactivity substantially identical to that of the conventional control blade, at the central portion thereof, the priority is given to the reactivity, and at the top end thereof when charged into the reactor core, the priority is given to the long life and the reactivity is made substantially identical to that of the conventional control blade.

Taking above matters into consideration, with the embodiment of the left half control blade shown in FIG. 71C, a control blade 80 is substantially equally divided into axial three portions. The rear end portion, when inserted into the reactor core, (having a length of about ⅓ to ¼ of the total length of the control blade) is constructed as an ordinary zone 81 having a reactivity substantially identical to that of a conventional control blade and this zone 81 is filled with B$_4$C utilizing natural boron.

The central portion (having a length approximately corresponding to a distance between a portion axially apart from the top end of the rear portion by a distance of ⅓ of the entire axial length of the control blade and a portion axially apart from the top end thereof by a distance of ⅔ of the entire length) is constructed as a high reactivity zone 82 which is filled with $^{10}$B$_4$C having a high reactivity.

The front end portion (having a length of about ⅓ of the entire axial length of the control blade from the top end of the front portion) is constructed as a high neutron irradiation zone 83 utilizing an Hf plate as neutron absorption member.

Air gape 84 and 85, which are filled with reactor water in the reactor are formed in the ordinary zone 81 and the high neutron irradiation zone 83 at the central portions thereof along the axis of the control blade.

A control rod 80 shown as a right half of the embodiment shown in FIG. 71C is also axially divided substantially equally into three portions.

The rear end portion, when inserted into the reactor core, is constructed as an ordinary zone 86 in which SUS tubes filled with B₄C powders are arranged side by side in a bundle. The central portion is constructed as a high reactivity zone 82 in which B₄C powders fill in the horizontal holes provided in SUS plates. The front end portion is constructed by inserting Hf plates having a trap-shape into the SUS plates.

Accordingly, as described hereinabove, in a nuclear reactor utilizing the fuel assembly according to this invention in which the portion at which the subcriticality is made small is shifted from the axially upper portion of the reactor core to the central portion thereof in comparison with the conventional fuel assembly, the reactor operation can be most suitably controlled by axially dividing the control blade substantially equally into axial three portions thereby to vary the neutron absorption characteristics.

Figure 72:
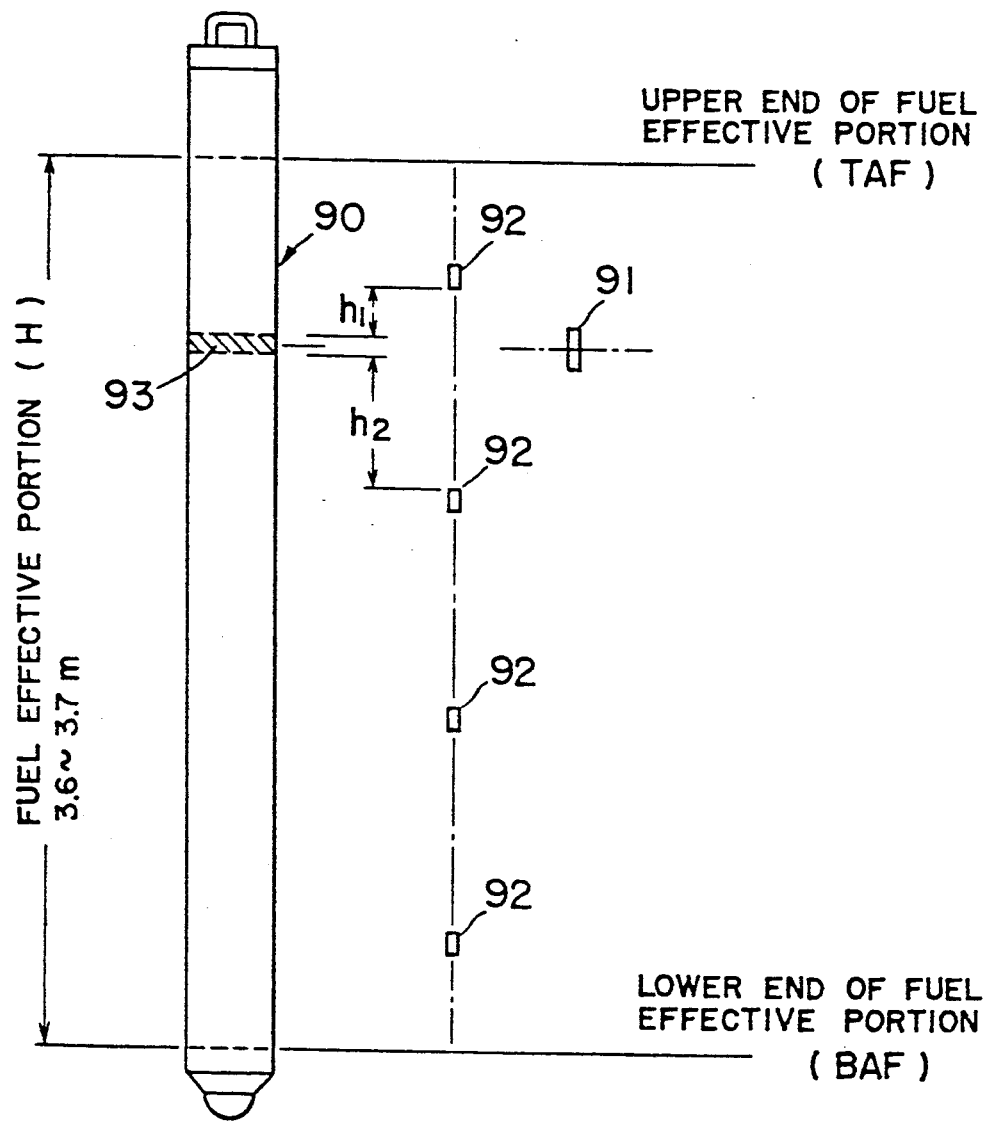
FIG. 72 is an illustration for explanation of the core instrumentation arranged in the reactor core in which the fuel assembly according to this invention is arranged.
Figure 74:
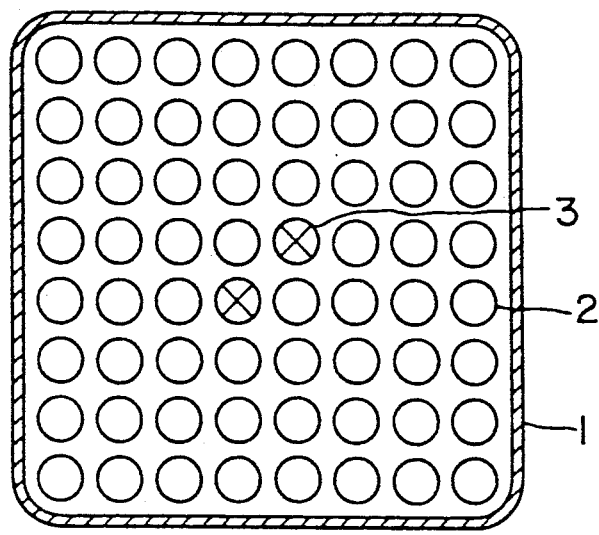

FIG. 72 is an illustration of an in-pile instrumentation to be arranged inside the nuclear reactor constructed by the fuel assembly according to this invention. The in-pile instrumentation includes a neutron source range monitor (SRM) 91 and a local power range monitor (LPRM) 92. The neutron source range monitor 91 is located at an interposed area 93 of a fuel assembly 90 in which a large neutron flux peak exists for increasing the neutron counting rate at the low neutron flux level.

The four local power range monitors 92 are located in a fuel effective area of the fuel assembly with substantially equal intervals in the axial direction thereof, and as shown in FIG. 72, the local power range monitors 92 arranged near the interposed area 93 are separated therefrom by distances of $h_1$ and $h_2$, being more than 10 cm, to obviate the occurrence of errors caused by the thermal neutron flux peak.

What is claimed is:

1. A fuel assembly for a nuclear reactor of the type in which a number of fuel rods, each constructed by filling a clad with a fuel material, are arranged in a bundle, comprising:
    a plurality of first fuel rods having a partial effective fuel area filled with a fuel material and having a portion in which enrichment of a fissile nuclide in the clad of the fuel rod is significantly reduced, or the fissile nuclide does not exist at all, positioned on an axial level including a portion at which subcriticality becomes small at a period in which maintenance of reactor shut-down margin is small during a reactor operation period; and
    a plurality of second fuel rods having a total effective fuel area filled with a fuel material throughout an entire axial length of the clad of the fuel rod, wherein said first fuel rods are disposed in straight lines inside the bundle so as to horizontally separate said second fuel rods into a plurality of sub-bundles.

2. The fuel assembly according to claim 1, wherein said portion in which enrichment of a fissile nuclide in the clad of the fuel rod is significantly reduced, or the fissile nuclide does not exist at all, comprises an interposed zone in which enrichment of the fissile nuclide is significantly reduced or the fissile nuclide does not exist at all.

3. The fuel assembly according to claim 2 wherein said interposed zone has an axial length substantially equal to or longer than a thermal neutron diffusion length during a reactor power operation period.

4. The fuel assembly according to claim 3 wherein the axial length of said interposed zone is shorter than one-third of an axial length of the effective fuel area of said second fuel rod.

5. The fuel assembly according to claim 2, wherein said interposed zone is located at a position on an axial level so that at least a portion of said interposed zone is at distance between two-thirds and five-sixths of the length of said total effective fuel area measured from the lower end of said total effective fuel area.

6. The fuel assembly according to claim 2 wherein said interposed zone is occupied with a solid moderating material.

7. The fuel assembly according to claim 2 wherein said interposed zone is occupied with a liquid moderating material.

8. The fuel assembly according to claim 7 wherein said liquid material is water.

9. The fuel assembly according to claim 2 wherein a gas plenum is formed in said interposed zone.

10. The fuel assembly according to claim 2 wherein a depleted uranium is charged in said interposed zone.

11. The fuel assembly according to claim 2 wherein a natural uranium is charged into said interposed zone.

12. The fuel assembly according to claim 2 wherein a ceramic material suppressing neutron absorption characteristics at a final stage of a reactor operation cycle is inserted into said interposed zone.

13. The fuel assembly according to claim 12 wherein said ceramic material is a porous heat-proof ceramic.

14. The fuel assembly according to claim 2, wherein a burnable poison having a concentration of an extent such that said burnable poison will vanish at a final stage of a reactor operation cycle is contained in said interposed zone.

15. The fuel assembly according to claim 2 wherein fuel materials disposed adjacent to said interposed zone contain a burnable poison having a concentration to an extent such that said burnable poison will vanish at the final stage of the reactor operation cycle.

16. The fuel assembly according to claim 2, wherein said first fuel rods having the interposed zone are arranged in a linearly crossing pattern.

17. The fuel assembly according to claim 1 wherein said first fuel rod comprises a short fuel rod having an axial length shorter than that of said second fuel rod, said short fuel rod being constructed by removing a portion of the fuel rod existing on an axial level including a portion at which subcriticality becomes small at a period in which maintenance of reactor shut-down margin is small during a reactor operation period.

18. The fuel assembly according to claim 17 wherein a plural number of said short fuel rods are provided with an effective fuel area having an axial length ranging between one-half to five-sixth of the length of said total effective fuel area said second fuel rod.

19. The fuel assembly according to claim 17 wherein a plural number of said short fuel rods are arranged in a linearly crossing pattern.

20. The fuel assembly according to claim 17 wherein the lower end portion of said short fuel rods are arranged substantially in the same plane as the lower end portion of said second fuel rod is arranged.

21. The fuel assembly according to claim 17 wherein a power spike suppressing material is disposed above the fuel material filled in said short fuel rod.

22. The fuel assembly according to claim 1 wherein a plurality of tubes through which a moderator passes are disposed in the fuel assembly and at least one of said first fuel rods is located at an area positioned between said tubes.

23. The fuel assembly according to claim 22 wherein said lubes comprise water rods.

24. A fuel assembly for a nuclear reactor of the type in which a number of fuel rods, each constructed by filling a clad with a fuel material, are arranged in a bundle, comprising:
   a plurality of first fuel rods having a partial effective fuel area filled with a fuel material and having a portion in which enrichment of a fissile nuclide in the clad of the fuel rod is significantly reduced, or the fissile nuclide does not exist at all, positioned on an axial level including a first section at which subcriticality becomes small at a period in which maintenance of reactor shut-down margin is small during a reactor operation period and a second section located between said first section and a lower end of the effective fuel area; and
   a plurality of second fuel rods having at least one partial interposed zone in which enrichment of a fissile nuclide in the clad of the fuel rod is significantly reduced, or the fissile nuclide does not exist at all, positioned at said second section, wherein said first fuel rods are disposed inside the bundle so as to horizontally separate said second fuel rods into a plurality of sub-bundles.

25. The fuel assembly according to claim 24 wherein said first section exists in an area including at least a portion ranging between two-thirds and five-sixth of the length of the effective fuel area measured upwardly from the lower end portion of the effective fuel area.

26. The fuel assembly according to claim 24 wherein an interposed member made of a material which has a significantly reduced enrichment of a fissile nuclide or in which the fissile nuclide does not exist at all is inserted into said first fuel rod at the portion in which enrichment of a fissile nuclide is significantly reduced or the fissile nuclide does not exist at all.

27. The fuel assembly according to claim 26 wherein said interposed member has an axial length substantially equal to or longer than a thermal neutron diffusion length during a reactor output power operation period.

28. The fuel assembly according to claim 27 wherein the axial length of said interposed member is shorter than one-third of an axial length of the effective fuel area of said second fuel rod.

29. The fuel assembly according to claim 26 wherein said interposed member is occupied with a solid moderator.

30. The fuel assembly according to claim 26 wherein said interposed member is occupied with a liquid moderator.

31. The fuel assembly according to claim 30 wherein said liquid moderator is water.

32. The fuel assembly according to claim 26 wherein a gas plenum is formed in said interposed member.

33. The fuel assembly according to claim 26 wherein said interposed member is occupied with a depleted uranium.

34. The fuel assembly according to claim 26 wherein said interposed member is occupied with a natural uranium.

35. The fuel assembly according to claim 26 wherein said interposed member is occupied with a ceramic material suppressing neutron absorption characteristics at a final stage of a reactor operation cycle.

36. The fuel assembly according to claim 35 wherein said ceramic material is a porous heat-proof ceramic.

37. The fuel assembly according to claim 26 wherein a burnable poison having a concentration to an extent such that said burnable poison will vanish at a final stage of a reactor operation cycle is contained in said interposed member.

38. The fuel assembly according to claim 26 wherein fuel materials disposed adjacent to said interposed member contained a burnable poison having a concentration to an extent such that said burnable poison will vanish at the final stage of the reactor operation cycle.

39. The fuel assembly according to claim 26 wherein a plural number of said first fuel rods provided with the interposed member are arranged linearly.

40. The fuel assembly according to claim 26 wherein a plural number of said first fuel rods provided with the interposed member are arranged in a linearly crossing pattern.

41. The fuel assembly according to claim 24 wherein said first fuel rod is a short fuel rod having an axial length shorter than said second of the fuel rod provided with the interposed zone and comprises a fuel rod which is provided with a removed portion on an axial level including a portion at which subcriticality is made small at a period in which maintenance of reactor shut-down margin is made difficult during the reactor operation period.

42. The fuel assembly according to claim 41 wherein a plural number of said short fuel rods are arranged linearly.

43. The fuel assembly according to claim 41 wherein a plural number of said short fuel rods are arranged in a linearly crossing pattern.

44. The fuel assembly according to claim 41 wherein the lower end of said short fuel rod lies substantially in the same plane as the lower end of said second fuel rod provided with the interposed zone lies.

45. The fuel assembly according to claim 41 wherein a power spike suppressing member is disposed above a top portion of a fuel material filled in said short fuel rod.

46. The fuel assembly according to claim 2, wherein said interposed zone comprises an output power spike suppressing member comprising at least one of depleted uranium, natural uranium, a burnable poison, and a non-burnable oxide material.

47. The fuel assembly according to claim 46, wherein said interposed zone comprises a burnable poison.

48. The fuel assembly according to claim 46, wherein said interposed zone comprises a non-burnable oxide material.

49. The fuel assembly according to claim 24, wherein said interposed zone comprises an output power spike suppressing member selected from the group consisting of depleted uranium, natural uranium, a burnable poison, and a non-burnable oxide material.

50. The fuel assembly according to claim 49, wherein said interposed zone comprises a burnable poison.

51. The fuel assembly according to claim 49, wherein said interposed zone comprises a non-burnable oxide material.

52. A fuel assembly for a nuclear reactor of the type in which a number of fuel rods, each constructed by filling a clad with a fuel material, are arranged in a bundle, comprising:

a plurality of first fuel rods having a partial effective fuel area filled with a fuel material and having a portion in which enrichment of a fissile nuclide in the clad of the fuel rod is significantly reduced, or the fissile nuclide does not exist at all, positioned on an axial level including a first section at which subcriticality becomes small at a period in which maintenance of reactor shut-down margin is small during a reactor operation period and a second section located between said first portion and a lower end of the effective fuel area;

a plurality of second fuel rods having at least one partial interposed zone in which enrichment of a fissile nuclide in the clad of the fuel rod is significantly reduced, or the fissile nuclide does not exist at all, positioned at said second section; and a tube through which a moderator passes disposed in the fuel assembly, wherein said second fuel rods are arranged adjacent to the tube.

53. The fuel assembly according to claim 1, further comprising a tube through which a moderator passes, said tube disposed in a center portion of the bundle.

54. The fuel assembly according to claim 16, further comprising a tube through which a moderator passes, said tube disposed at the intersection of said linearly crossing shape.

55. The fuel assembly according to claim 24, further comprising a tube through which a moderator passes, said tube disposed in a center portion of the bundle.

56. The fuel assembly according to claim 40, further comprising a tube through which a moderator passes, said tube disposed at the intersection of said linearly crossing shape.

57. The fuel assembly according to claim 55, wherein said tube comprises a water rod.

58. The fuel assembly according to claim 52, wherein said tube comprises a water rod.

59. The fuel assembly according to claim 2, wherein the central portion of said interposed zone is located at a distance of about three-fourths of the length of said total effective fuel area from the lower end of said total effective fuel area.

* * * * *